US011828960B2

(12) United States Patent
Sasata et al.

(10) Patent No.: US 11,828,960 B2
(45) Date of Patent: Nov. 28, 2023

(54) CHOLESTERIC LIQUID CRYSTAL LAYER, METHOD OF FORMING CHOLESTERIC LIQUID CRYSTAL LAYER, LAMINATE, LIGHT GUIDE ELEMENT, AND IMAGE DISPLAY DEVICE

(71) Applicant: FUJIFILM Corporation, Tokyo (JP)

(72) Inventors: Katsumi Sasata, Minami-ashigara (JP); Hiroshi Sato, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 265 days.

(21) Appl. No.: 17/344,424

(22) Filed: Jun. 10, 2021

(65) Prior Publication Data

US 2022/0099872 A1     Mar. 31, 2022

Related U.S. Application Data

(63) Continuation of application No. PCT/JP2019/048506, filed on Dec. 11, 2019.

(30) Foreign Application Priority Data

Dec. 11, 2018 (JP) .................................. 2018-232002
Mar. 27, 2019 (JP) .................................. 2019-061214

(Continued)

(51) Int. Cl.
*G02B 5/18*     (2006.01)
*F21V 8/00*     (2006.01)
*G02B 27/01*    (2006.01)

(52) U.S. Cl.
CPC .........  *G02B 5/1861* (2013.01); *G02B 5/1833* (2013.01); *G02B 6/005* (2013.01);
(Continued)

(58) Field of Classification Search
CPC .... G02B 5/1861; G02B 5/1833; G02B 6/005; G02B 27/0101; G02B 27/0172;
(Continued)

(56) References Cited

U.S. PATENT DOCUMENTS

2016/0033698 A1   2/2016   Escuti et al.
2017/0373459 A1  12/2017   Weng et al.
(Continued)

FOREIGN PATENT DOCUMENTS

JP   2006-78617 A    3/2006
JP   2006-293099 A  10/2006
(Continued)

OTHER PUBLICATIONS

Japanese Notice of Reasons for Refusal for Japanese Application No. 2020-559290, dated Jul. 5, 2022, with an English translation.

(Continued)

*Primary Examiner* — Arnel C Lavarias
(74) *Attorney, Agent, or Firm* — Birch, Stewart, Kolasch & Birch, LLP

(57) ABSTRACT

Provided are a cholesteric liquid crystal layer having a high diffraction efficiency, and a laminate, a light guide element, and an image display device that include the same. The cholesteric liquid crystal layer is obtained by immobilizing a cholesteric liquid crystalline phase, in which the cholesteric liquid crystal layer has a liquid crystal alignment pattern in which a direction of an optical axis derived from a liquid crystal compound changes while continuously rotating in at least one in-plane direction, in a case where a tilt angle of a direction in which an in-plane retardation is minimum with respect to a normal line in a slow axis plane or a fast axis plane is represented by $\theta_2$, an absolute value of an optical axis tilt angle $\varphi$ represented by "sin $\theta_2$=n·sin (Continued)

φ (n represents an average refractive index of the cholesteric liquid crystal layer)" is 5° or more.

17 Claims, 8 Drawing Sheets

(30) Foreign Application Priority Data

May 10, 2019 (JP) ................................ 2019-090101
Nov. 8, 2019 (JP) ................................ 2019-203386

(52) U.S. Cl.
CPC ........ *G02B 6/0026* (2013.01); *G02B 27/0101* (2013.01); *G02B 27/0172* (2013.01)

(58) Field of Classification Search
CPC .......... G02B 5/18; G02B 5/30; G02B 5/3016; G02B 5/3025; G02B 5/3033; G02B 5/3083; G02F 1/13; G02F 1/133; G02F 1/1333; G02F 1/1334; G02F 1/1335; G02F 1/1337; G02F 1/133746; G02F 1/133749; G02F 1/13378; G02F 2201/34; G02F 2201/343; G02F 1/133543
USPC ............ 359/489.01, 483.01, 486.01, 487.01, 359/487.02, 487.06, 489.08, 489.11, 359/489.12, 489.13; 349/56, 84, 86, 87, 349/88, 92, 94, 122, 123, 175, 176, 182, 349/183, 185, 193, 194, 201, 202

See application file for complete search history.

(56) References Cited

U.S. PATENT DOCUMENTS

| | | | |
|---|---|---|---|
| 2020/0409202 A1 | 12/2020 | Kodama et al. | |
| 2021/0116615 A1 | 4/2021 | Kodama et al. | |
| 2021/0311259 A1* | 10/2021 | Sato | .................... G02B 5/1866 |

FOREIGN PATENT DOCUMENTS

| | | | | |
|---|---|---|---|---|
| JP | 2009-292871 A | 12/2009 | | |
| JP | 2014-211637 A | 11/2014 | | |
| JP | 2017-522601 A | 8/2017 | | |
| WO | WO 2016/066219 A1 | 5/2016 | | |
| WO | WO 2018/154576 A1 | 8/2018 | | |
| WO | WO 2019/181247 A1 | 9/2019 | | |
| WO | WO 2019/182052 A1 | 9/2019 | | |
| WO | WO-2020075740 A1 * | 4/2020 | ......... | G02B 27/0172 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2019/048506, dated Jun. 24, 2021, with English translation of the Written Opinion.
International Search Report (Form PCT/ISA/210) for International Application No. PCT/JP2019/048506, dated Mar. 17, 2020, with English translation.

* cited by examiner

CHOLESTERIC LIQUID CRYSTAL LAYER, METHOD OF FORMING CHOLESTERIC LIQUID CRYSTAL LAYER, LAMINATE, LIGHT GUIDE ELEMENT, AND IMAGE DISPLAY DEVICE

CROSS-REFERENCE TO RELATED APPLICATIONS

This application is a Continuation of PCT International Application No. PCT/JP2019/048506 filed on Dec. 11, 2019, which claims priority under 35 U.S.C. § 119(a) to Japanese Patent Application No. 2018-232002 filed on Dec. 11, 2018, Japanese Patent Application No. 2019-061214 filed on Mar. 27, 2019, Japanese Patent Application No. 2019-090101 filed on May 10 2019 and Japanese Patent Application No. 2019-203386 filed on Nov. 8, 2019. Each of the above applications is hereby expressly incorporated by reference, in its entirety, into the present application.

BACKGROUND OF THE INVENTION

1. Field of the Invention

The present invention relates to a cholesteric liquid crystal layer, a method of forming a cholesteric liquid crystal layer in which the cholesteric liquid crystal layer can be suitably formed, a laminate and a light guide element that include the cholesteric liquid crystal layer, and an image display device that includes the light guide element.

2. Description of the Related Art

Augmented Reality (AR) glasses have been put into practice. The AR glasses are also called, for example, smart glasses or a head-mounted display (HMD).

In AR glasses, for example, light (projection light) projected from a display is diffracted (refracted) using a diffraction element to be incident into one end portion of a light guide plate. As a result, the light is introduced into the light guide plate at an angle such that the light is totally reflected and propagates in the light guide plate. The light propagated in the light guide plate is also diffracted by the diffraction element in the other end portion of the light guide plate and is emitted from the light guide plate to an observation position by the user.

As an example of a diffraction element that is used for AR glasses and allows light to be incident into a light guide plate at an angle, a reflective structure described in WO2016/066219A including a cholesteric liquid crystal layer that is obtained by immobilizing a cholesteric liquid crystalline phase can be used.

This reflective structure includes a plurality of helical structures each of which extends in a predetermined direction. In addition, this reflective structure includes: a first incidence surface that intersects the predetermined direction and into which light is incident; and a reflecting surface that intersects the predetermined direction and reflects the light incident from the first incidence surface, in which the first incidence surface includes one of two end portions in each of the plurality of helical structures. In addition, each of the plurality of helical structures includes a plurality of structural units that lies in the predetermined direction, and each of the plurality of structural units includes a plurality of elements that are helically turned and laminated. In addition, each of the plurality of structural units includes a first end portion and a second end portion, the second end portion of one structural unit among structural units adjacent to each other in the predetermined direction forms the first end portion of the other structural unit, and alignment directions of the elements positioned in the plurality of first end portions included in the plurality of helical structures are aligned. Further, the reflecting surface includes at least one first end portion included in each of the plurality of helical structures and is not parallel to the first incidence surface.

A reflective structure (cholesteric liquid crystal layer) described in WO2016/066219A has a liquid crystal alignment pattern in which a direction of an optical axis derived from the liquid crystal compound changes while continuously rotating in at least one in-plane direction. The cholesteric liquid crystal layer described in WO2016/066219A has the above-described liquid crystal alignment pattern to include the reflecting surface that is not parallel to the first incidence surface.

A general cholesteric liquid crystal layer reflects incident light by specular reflection.

On the other hand, the reflective structure described in WO2016/066219A reflects incident light with an angle in the predetermined direction with respect to specular reflection instead of specular reflection. For example, in the cholesteric liquid crystal layer described in WO2016/066219A, light incident from the normal direction is reflected with an angle with respect to the normal direction instead of being reflected in the normal direction.

Accordingly, by using this optical element, an image formed by a display is diffracted, light is introduced into a light guide plate at an angle, and the light can be guided in the light guide plate.

SUMMARY OF THE INVENTION

In the reflective structure including the cholesteric liquid crystal layer described in WO2016/066219A, incident circularly polarized light is diffracted by the cholesteric liquid crystal layer such that the circularly polarized light can be reflected in a state where it is tilted with respect to an incidence direction.

However, in the cholesteric liquid crystal layer described in WO2016/066219A, the diffraction efficiency is not sufficient, and there is a problem in that, for example, the amount of reflected light with respect to incidence light decreases.

An object of the present invention is to provide the problems in the related art and to provide a cholesteric liquid crystal layer that can diffract incident light with a high diffraction efficiency and a method of forming a cholesteric liquid crystal layer in which the cholesteric liquid crystal layer can be suitably formed.

In order to achieve the object, the present invention has the following configurations.

[1] A cholesteric liquid crystal layer that is obtained by immobilizing a cholesteric liquid crystalline phase,
  in which the cholesteric liquid crystal layer has a liquid crystal alignment pattern in which a direction of an optical axis derived from a liquid crystal compound changes while continuously rotating in at least one in-plane direction,
  in a cross-section of the cholesteric liquid crystal layer observed with a scanning electron microscope, bright portions and dark portions derived from the cholesteric liquid crystalline phase are tilted with respect to a main surface of the cholesteric liquid crystal layer,
  in a case where an in-plane retardation is measured from a direction tilted with respect to a normal direction and a normal line, a measured angle as an angle of a direction in which the in-plane retardation is minimum in any one of a slow axis plane or a fast axis plane with respect to the normal line is represented by θ2, an absolute value of an optical axis tilt angle φ represented by sin θ2=n·sin φ (n represents an average refractive index of the cholesteric liquid crystal layer) is 5° or more.

[2] The cholesteric liquid crystal layer according to [1], in which the optical axis tilt angle φ is 15° or more.

[3] The cholesteric liquid crystal layer according to [1] or [2], in which in a case where an angle between the main surface of the cholesteric liquid crystal layer and the bright portions and the dark portions in the cross-section of the cholesteric liquid crystal layer is represented by a tilt angle θ1, an absolute value of a value obtained by subtracting the tilt angle θ1 from the optical axis tilt angle φ is 5° or less.

[4] The cholesteric liquid crystal layer according to any one of [1] to [3], in which in a case where a thickness of the cholesteric liquid crystal layer is represented by d and a minimum value of the in-plane retardation is represented by Re[φ], a refractive index anisotropy Δn'(φ) represented by the following expression Δn'(φ)=Re[φ]/(d·cos φ) is 0.003 or more.

[5] The cholesteric liquid crystal layer according to any one of [1] to [4], in which in a case where a length over which the direction of the optical axis derived from the liquid crystal compound in the liquid crystal alignment pattern rotates by 180° in an in-plane direction is set as a single period Λ, the single period Λ is 1.6 μm or less.

[6] The cholesteric liquid crystal layer according to any one of [1] to [5], in which a region where a formation period of the bright portions and the dark portions in the cross-section of the cholesteric liquid crystal layer varies depending on positions in a thickness direction is provided.

[7] The cholesteric liquid crystal layer according to any one of [3] to [6], in which a region where the tilt angle θ1 varies depending on positions in a thickness direction is provided.

[8] The cholesteric liquid crystal layer according to [7], in which a region where the tilt angle θ1 continuously increases in one direction of the thickness direction is provided.

[9] The cholesteric liquid crystal layer according to [7] or [8], in which a difference between a maximum value and a minimum value of the tilt angle θ1 in the thickness direction is 10° or more.

[10] The cholesteric liquid crystal layer according to any one of [7] to [9], in which a region where the tilt angle θ1 continuously increases in one direction of the thickness direction and a region where the tilt angle θ1 continuously decreases in the one thickness direction are provided.

[11] A method of forming a cholesteric liquid crystal layer comprising:

applying a liquid crystal composition including a liquid crystal compound and a chiral agent to an alignment film having an alignment pattern in which a direction of an optical axis derived from the liquid crystal compound changes while continuously rotating in at least one in-plane direction;

performing a heating step of heating the liquid crystal composition at a temperature T1 in a temperature range of a crystal-nematic phase transition temperature to a nematic-isotropic phase transition temperature of the liquid crystal compound; and performing an exposure step of exposing the liquid crystal composition while maintaining the temperature of the liquid crystal composition at a temperature of "T1−20° C." or higher.

[12] The method of forming a cholesteric liquid crystal layer according to [11], in which in a case where a length over which the direction of the optical axis derived from the liquid crystal compound in the alignment pattern of the alignment film rotates by 180° is set as a single period Λ and a thickness of a coating film of the liquid crystal composition applied to the alignment film is represented by dc, "dc>Λ/2" is satisfied.

[13] The method of forming a cholesteric liquid crystal layer according to [11] or [12], in which in the exposure step, a first exposure step is performed after the heating step, and subsequently a second exposure step of emitting light having a wavelength different from a wavelength of the first exposure step is performed.

[14] The method of forming a cholesteric liquid crystal layer according to any one of [11] to [13], in which the chiral agent is a chiral agent in which a helical twisting power decreases due to light irradiation.

[15] The method of forming a cholesteric liquid crystal layer according to any one of [11] to [14], in which the chiral agent has an isosorbide structure.

[16] The method of forming a cholesteric liquid crystal layer according to any one of [11] to [14], in which the chiral agent has a binaphthyl structure.

[17] A laminate comprising:

a plurality of cholesteric liquid crystal layers according to any one of [1] to [10], in which in the cross-sections of the plurality of cholesteric liquid crystal layers observed with a scanning electron microscope, the formation periods of the bright portions and the dark portions are different from each other.

[18] A laminate comprising:

a plurality of cholesteric liquid crystal layers according to any one of [1] to [10], in which in the plurality of cholesteric liquid crystal layers, the single periods Λ as lengths over which the direction of the optical axis in the liquid crystal alignment pattern rotates by 180° in the one in-plane direction are different from each other.

[19] A laminate comprising:

a plurality of cholesteric liquid crystal layers according to any one of [1] to [10], in which in the plurality of cholesteric liquid crystal layers, the formation periods of the bright portions and the dark portions in the cross-sections of the cholesteric liquid crystal layers are different from each other, the single periods of the liquid crystal alignment patterns in the one in-plane direction are different from each other, and a permutation of lengths of the formation periods of the bright portions and the dark portions in the cross-sections and a permutation of lengths of the single periods in the one in-plane direction match each other.

[20] A light guide element comprising:
a light guide plate; and
at least one of the cholesteric liquid crystal layer according to any one of [1] to [10] or the laminate according to any one of [17] to [19] that is provided on the light guide plate.

[21] A light guide element comprising:
a light guide plate; and
a first cholesteric liquid crystal layer, a second cholesteric liquid crystal layer, and a third cholesteric liquid crystal layer according to any one of [1] to [10] that are provided on the light guide plate,
in a case where the single period of the liquid crystal alignment pattern of the first cholesteric liquid crystal layer in the one in-plane direction is represented by Λ1, the single period of the liquid crystal alignment pattern of the second cholesteric liquid crystal layer in the one in-plane direction is represented by Λ2, and the single period of the liquid crystal alignment pattern of the third cholesteric liquid crystal layer in the one in-plane direction is represented by Λ3, $$Λ1<Λ2<Λ3$$

is satisfied.

[22] A light guide element comprising:
a first light guide plate and a second light guide plate;
a first light guide element including a first cholesteric liquid crystal layer and a third cholesteric liquid crystal layer according to any one of [1] to [10] that are provided on the first light guide plate; and
a second light guide element including a second cholesteric liquid crystal layer according to any one of [1] to [10] that is provided on the second light guide plate,
in which in a case where the single period of the liquid crystal alignment pattern of the first cholesteric liquid crystal layer in the one in-plane direction is represented by Λ1, the single period of the liquid crystal alignment pattern of the second cholesteric liquid crystal layer in the one in-plane direction is represented by Λ2, and the single period of the liquid crystal alignment pattern of the third cholesteric liquid crystal layer in the one in-plane direction is represented by Λ3, $$Λ1<Λ2<Λ3$$

is satisfied.

[23] The light guide element according to [21] or [22],
in which in a case where a formation period of the bright portions and the dark portions in the cross-section of the first cholesteric liquid crystal layer is represented by P1, a formation period of the bright portions and the dark portions in the cross-section of the second cholesteric liquid crystal layer is represented by P2, and a formation period of the bright portions and the dark portions in the cross-section of the third cholesteric liquid crystal layer is represented by P3, $$P1<P2<P3$$

is satisfied.

[24] The light guide element according to any one of [20] to [23], in which the cholesteric liquid crystal layers provided on the light guide plate are disposed to function as an incidence diffraction element and an emission diffraction element, respectively.

[25] The light guide element according to any one of claims 20 to 23,
in which the cholesteric liquid crystal layers provided on the light guide plate are disposed to function as an incidence diffraction element, an intermediate diffraction element, and an emission diffraction element, respectively.

[26] An image display device comprising:
the light guide element according to any one of [20] to [25]; and
a display element that emits an image to the cholesteric liquid crystal layer of the light guide element.

[27] The image display device according to [26],
in which the display element emits circularly polarized light.

The cholesteric liquid crystal layer according to an aspect of the present invention can refract incident light with a high diffraction efficiency to be incident into a light guide plate or the like. In addition, in the method of forming a cholesteric liquid crystal layer according to an aspect of the pre, the cholesteric liquid crystal layer according to the aspect of the present invention can be suitably formed.

DESCRIPTION OF THE PREFERRED EMBODIMENTS

Figure 1:
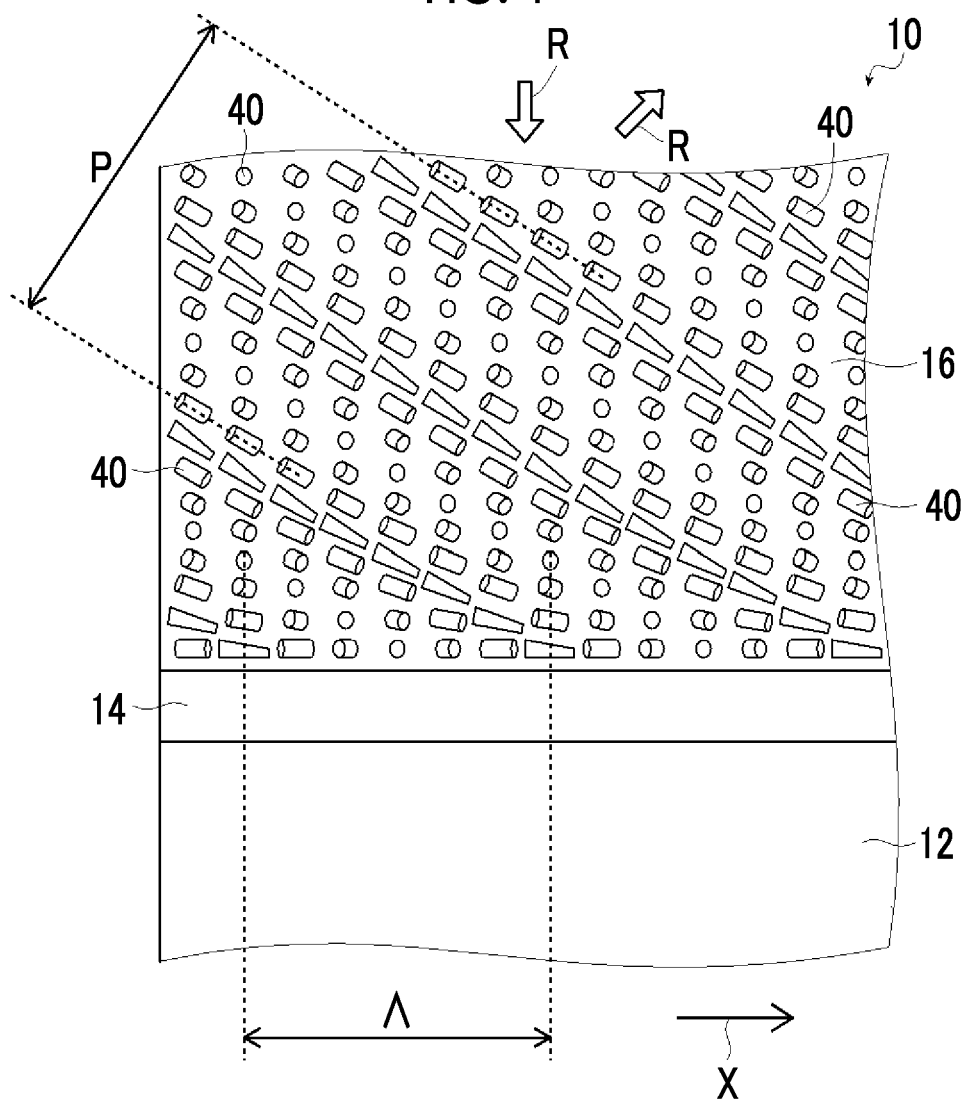
FIG. 1 is a diagram conceptually showing an example of a liquid crystal diffraction element including a cholesteric liquid crystal layer according to the present invention.

Hereinafter, a cholesteric liquid crystal layer and a method of forming a cholesteric liquid crystal layer according to an embodiment of the present invention will be described in detail based on a preferred example shown in the accompanying drawings.

In the present invention, numerical ranges represented by "to" include numerical values before and after "to" as lower limit values and upper limit values.

In the present invention, "(meth)acrylate" represents "either or both of acrylate and methacrylate".

In the present invention, $Re(\lambda)$ represents an in-plane retardation at a wavelength $\lambda$. Unless specified otherwise, the wavelength $\lambda$ refers to 550 nm.

In the present invention, $Re(\lambda)$ is a value measured at the wavelength $\lambda$ using a polarization phase difference analysis device AxoScan (manufactured by Axometrics, Inc.). By inputting an average refractive index $((nx+ny+nz)/3)$ and a thickness (d (μm)) to AxoScan, the following expressions can be calculated.

Slow Axis Direction)(°)

$Re(\lambda)=R0(\lambda)$ $R0(\lambda)$ is expressed as a numerical value calculated by AxoScan and represents $Re(\lambda)$.

In the present invention, the refractive indices nx, ny, and nz are measured using an Abbe refractometer (NAR-4T, manufactured by Atago Co., Ltd.), and a sodium lamp ($\lambda$=589 nm) is used as a light source. In addition, the wavelength dependence can be measured using a combination of a multi-wavelength Abbe refractometer (DR-M2, manufactured by Atago Co., Ltd.) and an interference filter.

In addition, as the refractive index, values described in "Polymer Handbook" (John Wiley & Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

FIG. 1 is a diagram conceptually showing an example of a liquid crystal diffraction element including a cholesteric liquid crystal layer according to the embodiment the present invention.

A liquid crystal diffraction element 10 shown in FIG. 1 includes a support 12, an alignment film 14, and a cholesteric liquid crystal layer 16.

A cholesteric liquid crystal layer 16 is obtained by immobilizing a cholesteric liquid crystalline phase, and is the cholesteric liquid crystal layer according to the embodiment of the present invention. In the present invention, the cholesteric liquid crystal layer 16 has a liquid crystal alignment pattern in which a direction of an optical axis 40A derived from a liquid crystal compound 40 changes while continuously rotating in at least one in-plane direction (refer to FIG. 2).

Figure 3:
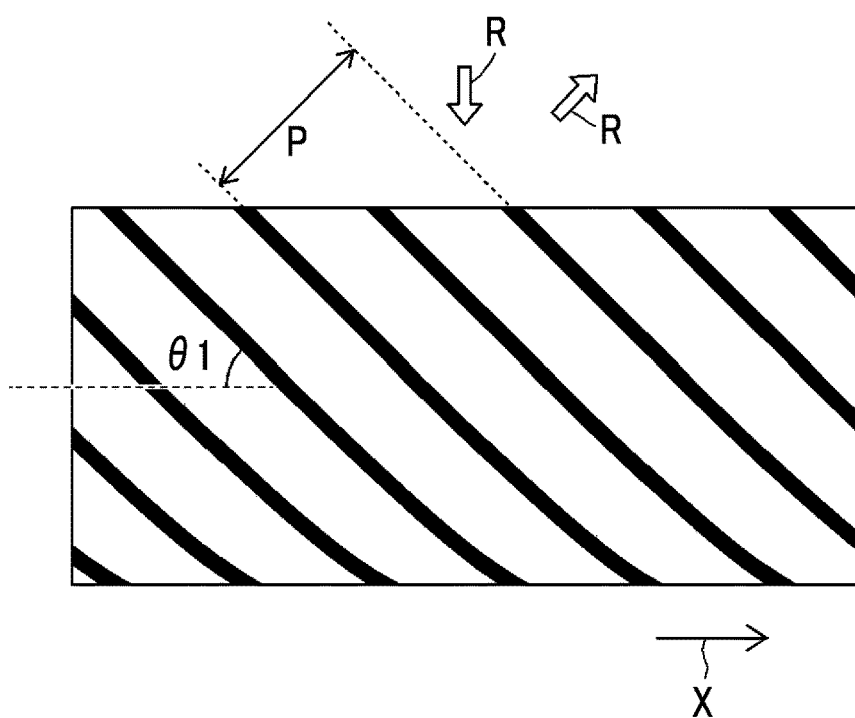
FIG. 3 is a diagram conceptually showing a cross-sectional SEM image of the cholesteric liquid crystal layer shown in FIG. 1.

In addition, in a cross-section of the cholesteric liquid crystal layer 16 observed with a scanning electron microscope (SEM), bright portions and dark portions derived from a cholesteric liquid crystalline phase are tilted with respect to a main surface (refer to FIG. 3). The main surface is the maximum surface of a sheet-shaped material (for example, a film or a plate-shaped material).

Further, in a case where an in-plane retardation Re of the cholesteric liquid crystal layer 16 is measured from a direction tilted with respect to a normal direction and a normal line, an absolute value of a measured angle θ2 of a direction in which the in-plane retardation Re is minimum in any one of a slow axis plane or a fast axis plane with respect to the normal line is 5° or more. The normal direction is a direction perpendicular to the main surface.

The cholesteric liquid crystal layer according to the embodiment of the present invention has the above-described configuration such that light can be reflected with a higher diffraction efficiency than that of a cholesteric liquid crystal layer in the related art.

[Support]

In the liquid crystal diffraction element 10, the support 12 supports the alignment film 14 and the cholesteric liquid crystal layer 16.

As the support 12, various sheet-shaped materials can be used as long as they can support the alignment film 14 and the cholesteric liquid crystal layer 16.

A transmittance of the support 12 with respect to corresponding light is preferably 50% or higher, more preferably 70% or higher, and still more preferably 85% or higher.

The thickness of the support 12 is not particularly limited and may be appropriately set depending on the use of the liquid crystal diffraction element 10, flexibility or rigidity required for the liquid crystal diffraction element 10, a difference in thickness required for the liquid crystal diffraction element 10, a material for forming the support 12, and the like in a range where the alignment film 14 and the cholesteric liquid crystal layer can be supported.

The thickness of the support 12 is preferably 1 to 1000 μm, more preferably 3 to 250 μm, and still more preferably 5 to 150 μm.

The support 12 may have a single-layer structure or a multi-layer structure.

In a case where the support 12 has a single-layer structure, examples thereof include supports 12 formed of glass, triacetyl cellulose (TAC), polyethylene terephthalate (PET), polycarbonates, polyvinyl chloride, acryl, polyolefin, and the like. In a case where the support 12 has a multi-layer structure, examples thereof include a support including: one of the above-described supports having a single-layer structure that is provided as a substrate; and another layer that is provided on a surface of the substrate.

<Alignment Film>

In the liquid crystal diffraction element 10, the alignment film 14 is formed on a surface of the support 12.

The alignment film 14 is an alignment film for aligning the liquid crystal compound 40 to a predetermined liquid crystal alignment pattern during the formation of the cholesteric liquid crystal layer 16.

Although described below, the cholesteric liquid crystal layer 16 according to the embodiment of the present invention has a liquid crystal alignment pattern in which a direction of an optical axis 40A (refer to FIG. 2) derived from the liquid crystal compound 40 changes while continuously rotating in one in-plane direction. Accordingly, the alignment film 14 is formed such that the cholesteric liquid crystal layer 16 can form the liquid crystal alignment pattern.

In the following description, "the direction of the optical axis 40A rotates" will also be simply referred to as "the optical axis 40A rotates".

As the alignment film 14, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as co-tricosanoic acid, dioctadecylmethylammonium chloride, or methyl stearate.

The alignment film 14 formed by a rubbing treatment can be formed by rubbing a surface of a polymer layer with paper or fabric in a given direction multiple times.

As the material used for the alignment film 14, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

The alignment film 14 for forming the cholesteric liquid crystal layer 16 according to the embodiment of the present invention can be suitably used as a so-called photo-alignment film obtained by irradiating a photo-alignable material with polarized light or non-polarized light. That is, in the present invention, a photo-alignment film that is formed by applying a photo-alignable material to the support 12 is suitably used as the alignment film 14.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film 14 is not particularly limited. The thickness with which a required alignment function can be obtained may be appropriately set depending on the material for forming the alignment film 14.

The thickness of the alignment film 14 is preferably 0.01 to 5 μm and more preferably 0.05 to 2 μm.

A method of forming the alignment film 14 is not limited. Any one of various well-known methods corresponding to a material for forming the alignment film 14 can be used. For example, a method including: applying the alignment film 14 to a surface of the support 12; drying the applied alignment film 14; and exposing the alignment film 14 to laser light to form an alignment pattern can be used.

Figure 7:
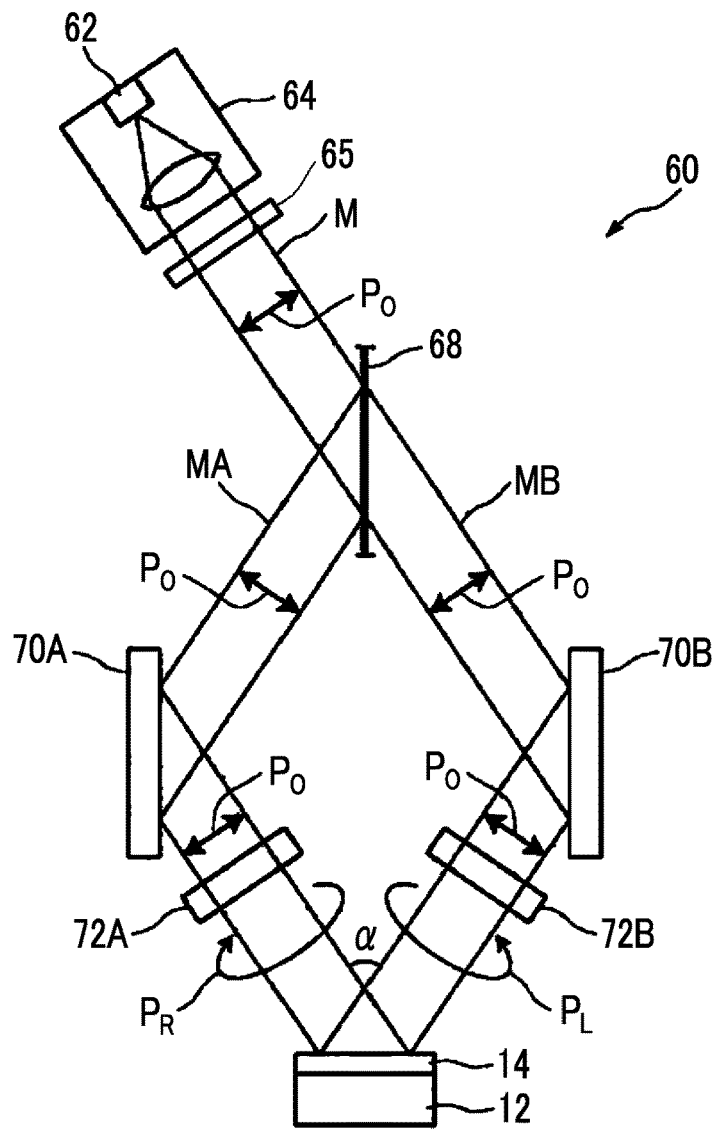
FIG. 7 is a conceptual diagram showing an example of an exposure device that exposes an alignment film.

FIG. 7 conceptually shows an example of an exposure device that exposes the alignment film 14 to form an alignment pattern.

An exposure device 60 shown in FIG. 7 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plates 72A and 72B have optical axes parallel to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 12 including the alignment film 14 on which the alignment pattern is not yet formed is disposed at an exposed portion, the two beams MA and MB intersect and interfere each other on the alignment film 14, and the alignment film 14 is irradiated with and exposed to the interference light.

Due to the interference at this time, the polarization state of light with which the alignment film 14 is irradiated periodically changes according to interference fringes. As a result, in the alignment film 14, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 14 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

In the light guide element according to the embodiment of the present invention, the alignment film 14 is provided as a preferable aspect and is not an essential component.

For example, the following configuration can also be adopted, in which, by forming the alignment pattern on the support 12 using a method of rubbing the support 12, a method of processing the support 12 with laser light or the like, or the like, the cholesteric liquid crystal layer or the like has the liquid crystal alignment pattern in which the direction of the optical axis 40A derived from the liquid crystal compound 40 changes while continuously rotating in at least one in-plane direction. That is, in the present invention, the support 12 can be made to function as the alignment film.

<Cholesteric Liquid Crystal Layer>

In the liquid crystal diffraction element 10, the cholesteric liquid crystal layer 16 is formed on a surface of the alignment film 14.

A cholesteric liquid crystal layer 16 is obtained by immobilizing a cholesteric liquid crystalline phase. That is, the cholesteric liquid crystal layer 16 is a layer formed of the liquid crystal compound 40 (liquid crystal material) having a cholesteric structure.

The cholesteric liquid crystal layer 16 is the cholesteric liquid crystal layer according to the embodiment of the present invention.

The cholesteric liquid crystalline phase has a helical structure in which the liquid crystal compound 40 is helically turned and laminated obtained by immobilizing a typical cholesteric liquid crystalline phase. In the helical structure, a configuration in which the liquid crystal compound 40 is helically turned once (rotated by 360) and laminated is set as one helical pitch, and plural pitches of the helically turned liquid crystal compound 40 are laminated. That is, one helical pitch is a pitch P shown in FIG. 1.

In other words, one helical pitch refers to the length of one helical winding, that is, the length in a helical axis direction in which a director of the liquid crystal compound constituting the cholesteric liquid crystalline phase rotates by 360°. For example, in the case of rod-shaped liquid crystal, the director of the liquid crystal compound matches a major axis direction.

Here, in a cross-section of the cholesteric liquid crystal layer observed with a SEM, a stripe pattern including bright portions (bright lines) and dark portions (dark lines) derived from the cholesteric liquid crystalline phase is observed. That is, in the cross-section of the cholesteric liquid crystal layer, a layered structure in which the bright portions and the dark portions are alternately laminated in the thickness direction is observed.

In the cholesteric liquid crystalline phase, a structure in which the bright portion and the dark portion are repeated twice corresponds to one helical pitch. The structure in which the bright portion B and the dark portion D are repeated twice includes three dark portions (bright portions) and two bright portions (dark portions) (refer to FIG. 3). Therefore, one helical pitch (pitch P) of the cholesteric liquid crystal layer, that is, the reflective layer can be measured from a SEM cross-sectional view.

<<Cholesteric Liquid Crystalline Phase>>

It is known that the cholesteric liquid crystalline phase exhibits selective reflection properties at a specific wavelength.

A center wavelength of selective reflection (selective reflection center wavelength) λ of a general cholesteric liquid crystalline phase depends on the length of one helical pitch in the cholesteric liquid crystalline phase and complies with a relationship of $\lambda=n\times P$ with an average refractive index n of the cholesteric liquid crystalline phase. Therefore, the selective reflection center wavelength can be adjusted by adjusting the helical pitch. The length of one helical pitch in the cholesteric liquid crystalline phase is the pitch P in FIGS. 1 and 3.

The selective reflection center wavelength of the cholesteric liquid crystalline phase increases as the pitch P increases.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

The cholesteric liquid crystal layer 16 shown in FIG. 1 has a right helical twisted direction, and thus reflects right circularly polarized light in a selective wavelength range.

A turing direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection wavelength range (circularly polarized light reflection wavelength range) where selective reflection is exhibited depends on Δn of the cholesteric liquid crystalline phase and the helical pitch P and complies with a relationship of $\Delta\lambda=\Delta n\times P$. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical laminate and may be, for example, 10 to 500 nm and is preferably 20 to 300 nm and more preferably 30 to 100 nm.

<<Liquid Crystal Alignment Pattern of Cholesteric Liquid Crystal Layer>>

The cholesteric liquid crystal layer 16 according to the embodiment of the present invention has the liquid crystal alignment pattern in which the direction of the optical axis 40A derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-shaped liquid crystal compound, the optical axis 40A is along a rod-shaped major axis direction. In the following description, the optical axis 40A derived from the liquid crystal compound 40 will also be referred to as "the optical axis 40A of the liquid crystal compound 40" or "the optical axis 40A"

Figure 2:
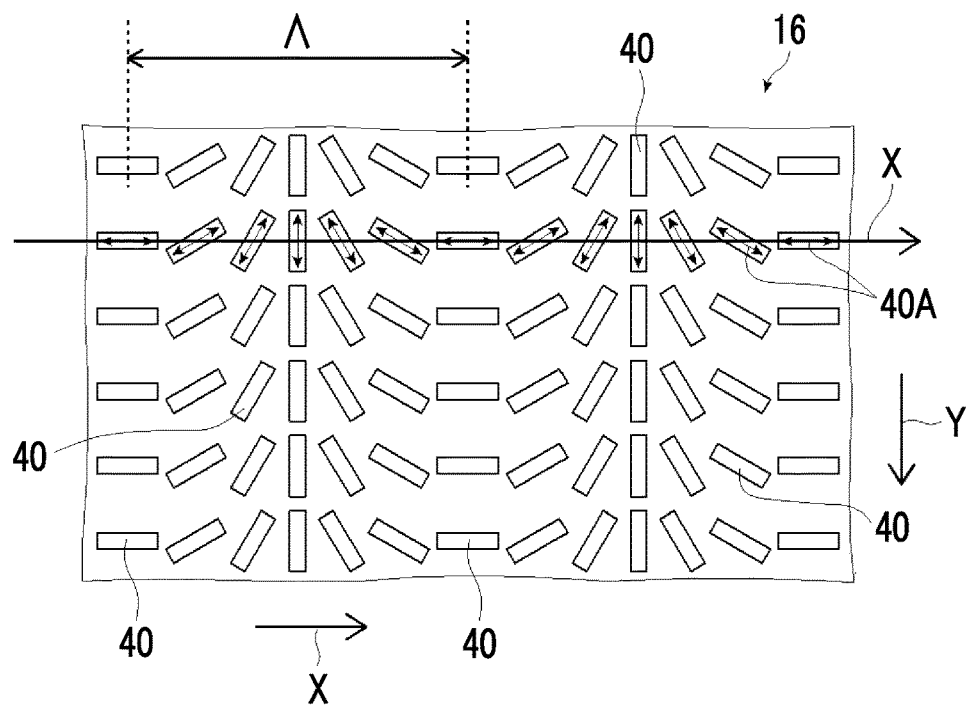
FIG. 2 is a plan view showing the cholesteric liquid crystal layer shown in FIG. 1.

FIG. 2 conceptually shows a plan view of the cholesteric liquid crystal layer 16.

The plan view is a view in a case where the cholesteric liquid crystal layer 16 (liquid crystal diffraction element 10) is seen from the top in FIG. 1, that is a view in a case where the liquid crystal diffraction element 10 is seen from the thickness direction. In other words, the thickness direction of the liquid crystal diffraction element 10 is a laminating direction of the respective layers (films).

In addition, in FIG. 2, in order to clarify the configuration of the cholesteric liquid crystal layer 16 according to the embodiment of the present invention, only the liquid crystal compound 40 on the surface of the alignment film 14 is shown.

As shown in FIG. 2, on the surface of the alignment film 14, the liquid crystal compound 40 forming the cholesteric liquid crystal layer 16 is two-dimensionally arranged according to the alignment pattern formed on the alignment film 14 as the lower layer in a predetermined one in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 1 and 2 and FIG. 4 described below, the Y direction is a direction perpendicular to the paper plane.

In addition, the liquid crystal compound 40 forming the cholesteric liquid crystal layer 16 has the liquid crystal alignment pattern in which the direction of the optical axis 40A changes while continuously rotating in the arrow X direction in a plane of the cholesteric liquid crystal layer 16. In the example shown in the drawing, the liquid crystal compound 40 has the liquid crystal alignment pattern in which the optical axis 40A of the liquid crystal compound 40 changes while continuously rotating counterclockwise in the arrow X direction.

Specifically, "the direction of the optical axis 40A of the liquid crystal compound 40 changes while continuously rotating in the arrow X direction (the predetermined one in-plane direction)" represents that an angle between the optical axis 40A of the liquid crystal compound 40, which is arranged in the arrow X direction, and the arrow X direction varies depending on positions in the arrow X direction, and the angle between the optical axis 40A and the arrow X direction sequentially changes from θ to θ+180° or θ−180° in the arrow X direction.

A difference between the angles of the optical axes 40A of the liquid crystal compound 40 adjacent to each other in the arrow X direction is preferably 45° or less, more preferably 15° or less, and still more preferably less than 15°.

On the other hand, in the liquid crystal compound 40 forming the cholesteric liquid crystal layer 16, the directions of the optical axes 40A are the same in the Y direction perpendicular to the arrow X direction, that is, the Y direction perpendicular to the one in-plane direction in which the optical axis 40A continuously rotates.

In other words, in the liquid crystal compound 40 forming the cholesteric liquid crystal layer 16, angles between the optical axes 40A of the liquid crystal compound 40 and the arrow X direction are the same in the Y direction.

In the liquid crystal diffraction element 10 according to the embodiment of the present invention, in the liquid crystal alignment pattern of the liquid crystal compound 40, the length (distance) over which the optical axis 40A of the liquid crystal compound 40 rotates by 180° in the arrow X direction in which the optical axis 40A changes while continuously rotating in a plane is the length Λ of the single period in the liquid crystal alignment pattern. That is, a distance between centers of two liquid crystal compounds 40 in the arrow X direction is the length Λ of the single period, the two liquid crystal compounds having the same angle in the arrow X direction.

Specifically, as shown in FIGS. 1 and 2, a distance of centers in the arrow X direction of two liquid crystal compounds 40 in which the arrow X direction and the direction of the optical axis 40A match each other is the length Λ of the single period. In the following description, the length Λ of the single period will also be referred to as "single period Λ".

In the liquid crystal diffraction element 10 according to the embodiment of the present invention, in the liquid crystal alignment pattern of the cholesteric liquid crystal layer, the single period Λ is repeated in the arrow X direction, that is, in the one in-plane direction in which the direction of the optical axis 40A changes while continuously rotating.

The cholesteric liquid crystal layer obtained by immobilizing a cholesteric liquid crystalline phase typically reflects incident light (circularly polarized light) by specular reflection.

On the other hand, the cholesteric liquid crystal layer 16 reflects incidence light in a direction having an angle in the arrow X direction with respect to the incidence light. The cholesteric liquid crystal layer 16 has the liquid crystal alignment pattern in which the optical axis 40A changes while continuously rotating in the arrow X direction in a plane (the predetermined one in-plane direction).

As described above, the cholesteric liquid crystal layer 16 reflects right circularly polarized light R in a selective wavelength range.

Accordingly, in a case where light is incident into the cholesteric liquid crystal layer 16, the cholesteric liquid crystal layer 16 reflects only right circularly polarized light R in the selective wavelength range and allows transmission of the other light.

A typical cholesteric liquid crystal layer not having the liquid crystal alignment pattern in a plane reflects incident circularly polarized light by specular reflection.

On the other hand, the cholesteric liquid crystal layer 16 that has the liquid crystal alignment pattern in which the optical axis 40A changes while continuously rotating in the arrow X direction in a plane reflects incident circularly polarized light in a direction tilted in the arrow X direction with respect to specular reflection.

Hereinafter, this point will be described.

In a case where the right circularly polarized light R incident into the cholesteric liquid crystal layer 16 is reflected from the cholesteric liquid crystal layer, the absolute phase changes depending on the directions of the optical axes 40A of the respective liquid crystal compounds 40.

Here, in the cholesteric liquid crystal layer 16, the optical axis 40A of the liquid crystal compound 40 changes while rotating in the arrow X direction (the one in-plane direction). Therefore, the amount of change in the absolute phase of the incident right circularly polarized light R varies depending on the direction of the optical axis 40A.

Further, the liquid crystal alignment pattern formed in the cholesteric liquid crystal layer 16 is a pattern that is periodic in the arrow X direction. Therefore, an absolute phase that is periodic in the arrow X direction corresponding to the direction of the optical axis 40A is assigned to the right circularly polarized light R incident into the cholesteric liquid crystal layer 16.

In addition, the direction of the optical axis 40A of the liquid crystal compound 40 with respect to the arrow X direction is uniform in the arrangement of the liquid crystal compound 40 in the Y direction perpendicular to the arrow X direction.

As a result, in the cholesteric liquid crystal layer 16, an equiphase surface that is tilted to fall in the arrow X direction with respect to an XY plane is formed for the right circularly polarized light R. The equiphase surface is formed to connect the liquid crystal compounds 40 that are helically turned and in which the directions of the optical axes 40A match each other in the turning direction.

In the cholesteric liquid crystal layer 16, the equiphase surface functions as a reflecting surface.

In a cross-section of the cholesteric liquid crystalline phase observed with a SEM, a stripe pattern including bright portions and dark portions derived from the cholesteric liquid crystalline phase is observed.

As is well known, the bright portions and the dark portions of the cholesteric liquid crystalline phase are formed to connect the liquid crystal compounds 40 that are helically turned and in which the directions of the optical axes 40A match each other in the turning direction. That is, the bright portions and the dark portions match the above-described equiphase surface.

Here, bright portions and dark portions of a typical cholesteric liquid crystal layer are parallel to the main surface, that is, the alignment surface that is the formation surface.

On the other hand, the cholesteric liquid crystal layer 16 has the liquid crystal alignment pattern in which the optical axis 40A changes while continuously rotating in the arrow X direction in a plane. Accordingly, as conceptually shown in FIG. 3, bright portions B and dark portions D of the cholesteric liquid crystal layer 16 are tilted to fall in the arrow X direction with respect to the main surface, that is, the alignment film 14 according to the arrangement of the liquid crystal compounds 40 in which the helical turning directions of the optical axes 40A match each other.

Therefore, the incident right circularly polarized light R are reflected in the normal direction of the bright portions B and the dark portions D, that is, the equiphase surface and are reflected in a direction tilted in the arrow X direction with respect to the XY plane. The XY plane is a main surface of the cholesteric liquid crystal layer.

By reversing the rotation direction of the optical axis 40A of the liquid crystal compound 40 toward the arrow X direction, a reflection direction of the right circularly polarized light R can be reversed. That is, in FIGS. 1 and 2, the rotation direction of the optical axis 40A toward the arrow X direction is counterclockwise, and the right circularly polarized light R is reflected in a state where it is tilted in the arrow X direction. By setting the rotation direction of the optical axis 40A to be clockwise, the tilt direction of the bright portions B and the dark portions D is reversed, and the right circularly polarized light R is reflected in a state where it is tilted in a direction opposite to the arrow X direction. In other words, this aspect is the same as a case where the arrow X direction in which the optical axis 40A rotates counterclockwise is reversed.

Further, as described above, in the cholesteric liquid crystal layer 16 that reflects right circularly polarized light and the cholesteric liquid crystal layer that reflects left circularly polarized light, the helical turning directions of the liquid crystal compounds 40 are opposite to each other. Accordingly, in the cholesteric liquid crystal layer that reflects left circularly polarized light and have the liquid crystal alignment pattern in which the optical axis 40A rotates counterclockwise in the arrow X direction as in the example shown in the drawing, the tilt direction of the bright portions B and the dark portions D is opposite, and thus the left circularly polarized light is reflected in a state where it is tilted in a direction opposite to the arrow X direction.

In the cholesteric liquid crystal layer 16, as the single period Λ of the liquid crystal alignment pattern in which the optical axis 40A continuously rotates in a plane decreases, the above-described tilt angle of reflected light with respect to incidence light increases. That is, as the single period Λ decreases, reflected light can be reflected in a state where it is largely tilted with respect to the incidence direction.

Accordingly, in the cholesteric liquid crystal layer 16, the reflection angle of reflected light of incident light can be adjusted by adjusting the single period Λ.

The single period Λ of the liquid crystal alignment pattern is not particularly limited. From the viewpoint that reflected light can be reflected in a state where it is largely tilted with respect to the incidence direction, the single period Λ of the liquid crystal alignment pattern is preferably 1.6 µm or less, more preferably 1.0 µm or less, and still more preferably 0.6 µm or less.

<<Properties of Cholesteric Liquid Crystal Layer>>

In a case where an in-plane retardation Re of the cholesteric liquid crystal layer 16 according to the embodiment of the present invention is measured from a direction tilted with respect to a normal direction and a normal line, an absolute value of an optical axis tilt angle φ that is calculated using the measured angle θ2 of the direction in which the in-plane retardation Re is minimum in any one of a slow axis plane or a fast axis plane with respect to the normal line is 5° or more.

Figure 4:
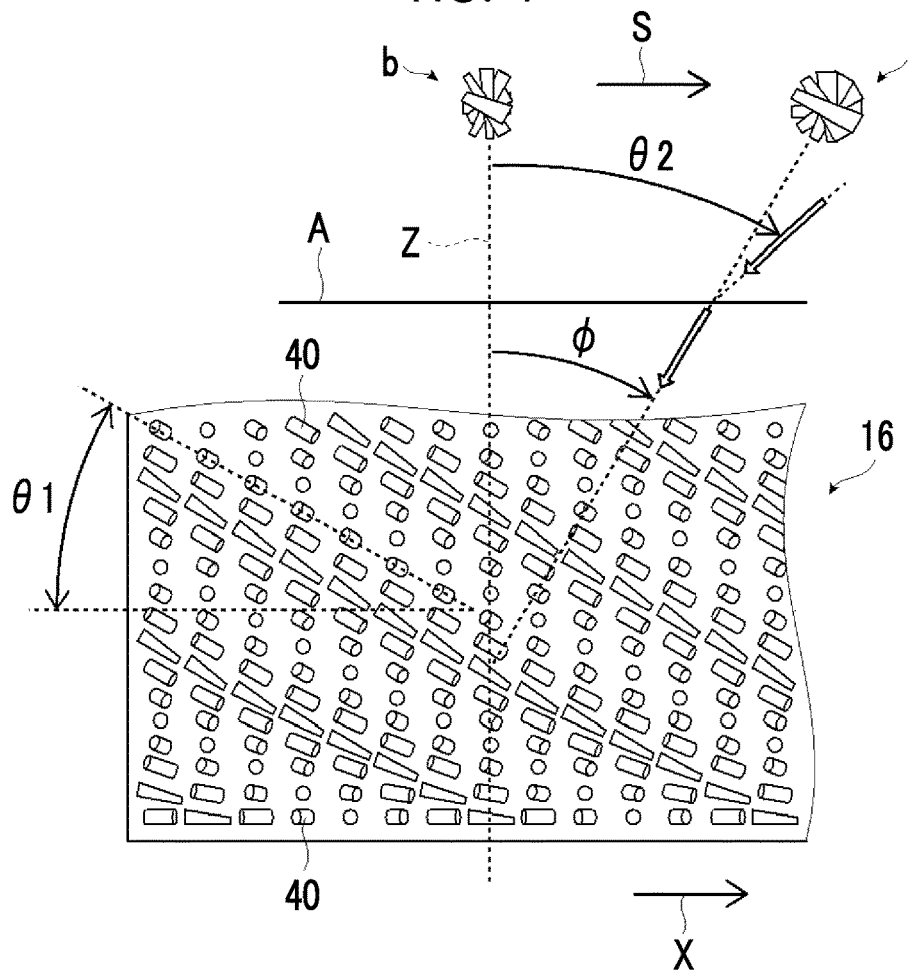
FIG. 4 is a conceptual diagram showing a method of measuring an in-plane retardation.

Specifically, in a case where light to be measured is incident from a normal line Z direction a conceptually shown in FIG. 4, the in-plane retardation Re of the cholesteric liquid crystal layer 16 is measured. Further, while sequentially changing the incidence direction of the light to be measured in a fast axis plane as indicated by arrow S, the in-plane retardation Re of the cholesteric liquid crystal layer 16 is measured. The same measurement is also performed in a slow axis plane. The incidence direction of the light to be measured is an incidence angle with respect to the normal line of the cholesteric liquid crystal layer 16.

In the cholesteric liquid crystal layer 16 according to the embodiment of the present invention, the absolute value of the optical axis tilt angle φ is 5° or more, the optical axis tilt angle φ being calculated from the following expression using the absolute value of the measured angle θ2 as an angle of the direction in which the in-plane retardation Re is minimum in any one of a slow axis plane or a fast axis plane with respect to the normal line in the above-described measurement of the in-plane retardation Re. That is, in the cholesteric liquid crystal layer 16 according to the embodiment of the present invention, the absolute value of the optical axis tilt angle φ is 5° or more, the optical axis tilt angle φ being calculated from the following expression using the measured angle θ2 of the incidence direction of the light to be measured in which the in-plane retardation Re is minimum with respect to the normal line Z.

$\sin θ2 = n·\sin φ$ ($n$ represents an average refractive index of the cholesteric liquid crystal layer)

As shown in FIG. 4, the measured angle θ2 is an angle of the incidence direction of the light to be measured in which the in-plane retardation Re is minimum with respect to the normal line Z before the light to be measured transmits through an air side interface A of the cholesteric liquid crystalline phase 16.

The slow axis plane and the fast axis plane of the cholesteric liquid crystal layer 16 may be detected, for example, using Axoscan described above. In addition, it is preferable that the measurement of the in-plane retardation is performed with light having a wavelength other than the selective reflection wavelength range of the cholesteric liquid crystal layer 16, for example, is performed with infrared light as invisible light.

In the cholesteric liquid crystal layer 16 according to the embodiment of the present invention, typically, the fast axis plane matches the direction (arrow X direction) in which the optical axis 40A continuously rotates in the one in-plane direction, and the slow axis direction matches a direction perpendicular to the direction in which the optical axis 40A continuously rotates, that is, the arrow Y direction.

Figure 5:
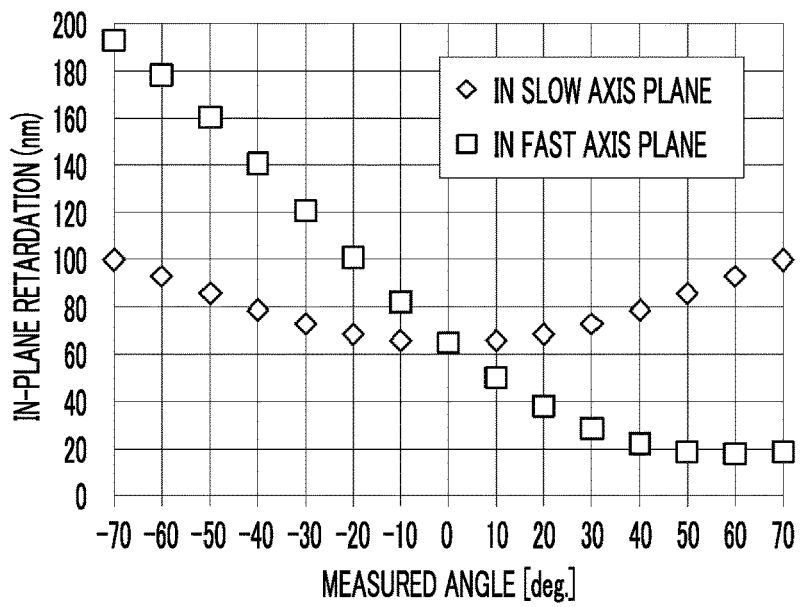
FIG. 5 is a graph showing an example of a relationship between a measured angle and an in-plane retardation.

FIG. 5 shows an example of the result of measuring the in-plane retardation Re in the above-described cholesteric liquid crystal layer.

As shown in FIG. 5, in the fast axis plane of the cholesteric liquid crystal layer, as the incidence angle with respect to the normal line increases, the in-plane retardation Re decreases and is minimum at an incidence angle of about −60°.

On the other hand, in the slow axis plane, the in-plane retardation Re obtained in the measurement from the normal direction, that is, at the incidence angle of 0° is minimum, and as the absolute value of the incidence angle increases, the in-plane retardation Re increases. In addition, in the slow axis plane, a change in in-plane retardation Re is symmetrical with respect to the incidence angle of 0°.

That is, in this case, the measured angle θ2 in which the in-plane retardation Re is minimum is present in the fast axis plane, the absolute value of the measured angle θ2 of the direction (the incidence direction of the light to be measured) in which the in-plane retardation Re with respect to the normal line Z is 60°, and the optical axis tilt angle φ is 35° assuming that the average refractive index of the cholesteric liquid crystal layer 16 is 1.5.

In the liquid crystal diffraction element 10 according to the embodiment of the present invention in which the cholesteric liquid crystal layer 16 has the above-described properties, it is presumed that, in the cholesteric liquid crystal layer 16, as shown in FIG. 1, the liquid crystal compound 40 (the director of the liquid crystal compound) is tilted with respect to the main surface, and the tilt direction substantially matches the bright lines B and the dark lines D of the above-described cholesteric liquid crystalline phase.

Figure 6:
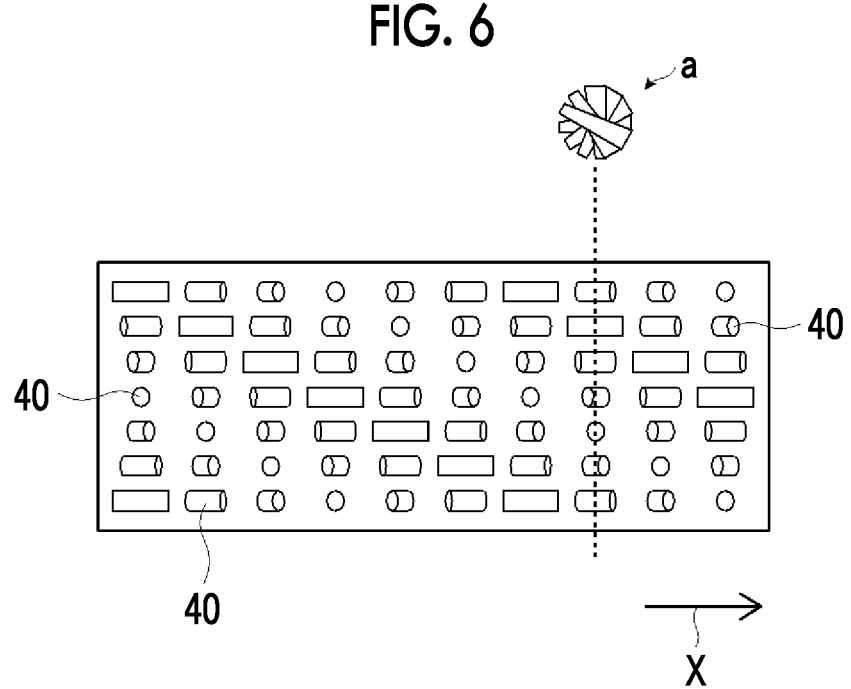
FIG. 6 is a diagram conceptually showing a cholesteric liquid crystal layer in the related art.

In the typical cholesteric liquid crystal layer shown in WO2016/066219A or the like having the same liquid crystal alignment pattern as that of the embodiment of the present invention the liquid crystal compound 40 (the director of the liquid crystal compound) is parallel to the main surface as shown in FIG. 6. In a case where the cholesteric liquid crystal layer is seen from the normal direction (chain line), as indicated by arrow a in FIG. 6, the helically turned liquid crystal compound 40 can be approximated to a disk parallel to the main surface.

Therefore, in a case where the in-plane retardation Re of the typical cholesteric liquid crystal layer is measured as shown in FIG. 4, the in-plane retardation Re measured in the normal direction, that is, at the incidence angle of 0° is substantially 0 nm (minimum) in both a slow axis plane and a fast axis plane, and as the absolute value of the incidence angle of the light to be measured increases, the incidence direction of the light to be measured into the disk is tilted. Therefore, the in-plane retardation Re increases, in a symmetrical shape with respect to the incidence angle of 0°.

On the other hand, in the cholesteric liquid crystal layer 16 in the example shown in the drawing, as shown in FIG. 5, in a fast axis plane, the in-plane retardation Re is present in the normal direction, that is, at the incidence angle of 0°, and as the incidence angle increases, the in-plane retardation Re decreases. That is, the in-plane retardation Re in the fast axis plane is tilted in one in-plane direction according to the incidence angle.

In addition, the in-plane retardation Re is minimum at any incidence angle in the fast axis plane.

As described above, in the typical cholesteric liquid crystal layer in which the liquid crystal compound is parallel to the main surface, the in-plane retardation is minimum in the normal direction, that is, at the incidence angle of 0° where the liquid crystal compound 40 can be approximated to a disk parallel to the main surface, and as the absolute value of the incidence angle increases, the incidence of the light to be measured into the disk becomes more oblique, and thus the in-plane retardation Re increases.

On the other hand, in the cholesteric liquid crystal layer 16 of the liquid crystal diffraction element 10 according to the embodiment of the present invention, the in-plane retardation Re is present in the normal direction, that is, at the incidence angle of 0°. This shows that the disk of the liquid crystal compound 40 is tilted in the fast axis direction with respect to the main surface as indicated by arrow b in FIG. 4.

In addition, in the cholesteric liquid crystal layer 16 of the liquid crystal diffraction element 10 according to the embodiment of the present invention, the value of the in-plane retardation Re (the optical axis tilt angle φ) is minimum at any incidence angle (measured angle θ2) in the fast axis plane. This shows that the disk of the liquid crystal compound 40 is perpendicular to the incidence direction of the light to be measured at the incidence angle as indicated by arrow a in FIG. 4. That is, the measurement at the measured angle θ2 corresponds to the measurement from the normal direction in the typical cholesteric liquid crystal layer in which the main surface and the disk are parallel to each other.

In consideration of this point, it can be presumed that, in the cholesteric liquid crystal layer 16 including the liquid crystal diffraction element 10 according to the embodiment of the present invention in which, in a case where the in-plane retardation Re is measured from the direction tilted from the normal direction and the normal line, the absolute value of the optical axis tilt angle φ is 5° or more in a slow axis plane or a fast axis plane, the liquid crystal compound 40 is tilted with respect to the main surface as shown in FIG. 1, and the tilt direction substantially matches the bright lines B and the dark lines D of the above-described cholesteric liquid crystalline phase.

In addition, in the cholesteric liquid crystal layer 16 in the example shown in the drawing, the in-plane retardation Re is the same as that of the typical cholesteric liquid crystal layer in a slow axis plane. Therefore, it is presumed that the liquid crystal compound 40 is parallel to the main surface in the slow axis plane.

In the cholesteric liquid crystal layer 16 according to the embodiment of the present invention, circularly polarized light can be diffracted with a higher diffraction efficiency than that of the typical cholesteric liquid crystal layer having the same liquid crystal alignment pattern as that of the present invention where the liquid crystal compound 40 is parallel to the main surface as disclosed in WO2016/066219A or the like.

As described above, in the cholesteric liquid crystal layer disclosed in WO2016/066219A or the like having the same liquid crystal alignment pattern as that of the present invention where the optical axis 40A rotates in the one in-plane direction (arrow X direction), the liquid crystal compound 40 is parallel to the main surface. Accordingly, in the cholesteric liquid crystal layer, the liquid crystal compound has an angle with respect to bright portions and dark portions derived from the cholesteric liquid crystalline phase corresponding to a reflecting surface.

On the other hand, in the liquid crystal diffraction element 10 according to the embodiment of the present invention where the liquid crystal compound 40 is tilted with respect to the main surface and the tilt direction substantially matches the bright lines 13 and the dark lines D of the cholesteric liquid crystalline phase, bright portions and dark portions corresponding to a reflecting surface match the liquid crystal compound 40. Therefore, in the liquid crystal diffraction element 10 according to the embodiment of the present invention, the action of the liquid crystal compound 40 on light reflection (diffraction) increases, the diffraction efficiency can be improved. As a result, in the liquid crystal diffraction element according to the embodiment of the present invention, for example, the amount of reflected light with respect to incidence light can be further improved as compared to that in the related art.

In the present invention, in a fast axis plane or a slow axis plane, the absolute value of the optical axis tilt angle φ of the cholesteric liquid crystal layer 16 is 5° or more, preferably 15° or more, and more preferably 20° or more.

It is preferable that the absolute value of the optical axis tilt angle φ is 15° or more from the viewpoint that the direction of the liquid crystal compound 40 matches the bright portions B and the dark portions D more suitably such that the diffraction efficiency can be improved.

In the liquid crystal diffraction element 10 according to the embodiment of the present invention, in a case where a thickness of the cholesteric liquid crystal layer 16 is represented by d and a minimum value of the in-plane retardation Re is represented by Re[φ], a refractive index anisotropy Δn'(φ) represented by the following expression is preferably 0.003 or more and more preferably 0.005 or more.

$$\Delta n'(\varphi) = Re[\varphi]/(d \cdot \cos \varphi)$$

The minimum value Re[φ] of the in-plane retardation Re is the in-plane retardation Re measured at the measured angle θ2 at which the in-plane retardation Re is minimum value.

As shown in FIG. 3, in the cholesteric liquid crystal layer 16 of the liquid crystal diffraction element 10 according to the embodiment of the present invention, the bright portions and the dark portions derived from the cholesteric liquid crystalline phase are tilted with respect to the main surface. The refractive index anisotropy Δn'(φ) being 0.003 or more represents that the bright portions and the dark portions are not straight lines and the angle thereof with respect to the main surface changes in the thickness direction as shown in FIG. 3.

Specifically, as shown in FIG. 3, the bright portions B and the dark portions D are linear in an upper region in the thickness direction, that is, in a region spaced from the alignment film 14, and an angle θ1 thereof with respect to the main surface in a lower region in the thickness direction, that is, in the vicinity of the alignment film 14 gradually decreases toward the alignment film 14.

The above-described configuration is preferable from the viewpoint that the alignment of the liquid crystal compound 40 is more stable.

In the present invention, the minimum value of the in-plane retardation Re of the cholesteric liquid crystal layer 16, that is, the in-plane retardation Re at the measured angle θ2 is preferably more than 0 nm and more preferably 5 to 20 nm.

In addition, in the cholesteric liquid crystal layer 16 according to the embodiment of the present invention, a value obtained by dividing the in-plane retardation Re[0°] measured in the normal direction, that is, at the incidence angle 0° by the thickness d of the cholesteric liquid crystal layer 16 is preferably 0.005 or more. That is, it is preferable that the cholesteric liquid crystal layer 16 satisfies "Re[0°]/d≥0.005".

In the cholesteric liquid crystal layer 16 according to the embodiment of the present invention, the tilt angle of the bright portions B and the dark portions D with respect to the main surface corresponds to the single period Λ in the above-described liquid crystal alignment pattern, and as the single period Λ decreases, the angle with respect to the main surface increases. Accordingly, as in the single period Λ, the tilt angle of the bright portions B and the dark portions D is not limited.

Here, in the present invention, in a case where an angle of the bright portions B and the dark portions D with respect to the main surface of the cholesteric liquid crystal layer 16 is represented by a tilt angle θ1, an absolute value of a value obtained by subtracting the tilt angle θ1 from the measured angle θ2 is preferably 5° or less and more preferably 3° or less. That is, it is preferable that the cholesteric liquid crystal layer 16 satisfies "|θ2-θ1|≤5°". In this case, the bright portions B and the dark portions D the above-described straight line region. In addition, the tilt angle θ1 is the same as θ1 shown in FIG. 4.

It is preferable that the cholesteric liquid crystal layer 16 satisfies "|θ2-θ1|≤5°" from the viewpoint of obtaining a high diffraction efficiency.

As described above, in a slow axis plane, the in-plane retardation Re obtained in the measurement from the normal direction, that is, at the incidence angle of 0° is minimum, and as the absolute value of the incidence angle increases, the in-plane retardation Re increases. In addition, in the slow axis plane, a change in in-plane retardation Re is symmetrical with respect to the incidence angle of 0°.

This shows that, in the slow axis plane, the liquid crystal compound 40 is substantially parallel to the main surface of the cholesteric liquid crystal layer 16.

The diffraction efficiency is affected not only by the single period Λ of the liquid crystal alignment pattern but also by a critical angle at an interface in a case where reflected light is emitted.

As the optical axis tilt angle φ increases, the angle of reflected light on the air interface side changes, and the diffraction angle exceeds a critical angle with the air interface. As a result, incidence light is totally reflected and guided into a medium.

By exhibiting the above-described properties, the cholesteric liquid crystal layer can be suitably used for a light guide plate display used in AR glasses or the like.

<<Method of Forming Cholesteric Liquid Crystal Layer>>

The cholesteric liquid crystal layer 16 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, it is preferable that the structure in which a cholesteric liquid crystalline phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

A method of forming the cholesteric liquid crystal layer 16 is not limited, and various well-known forming methods can be used.

In particular, in the following method of forming the cholesteric liquid crystal layer according to the embodiment of the present invention, the cholesteric liquid crystal layer 16 according to the embodiment of the present invention can be stably and suitably formed, which is preferable.

<<<Liquid Crystal Composition>>>

Examples of a material used for forming the cholesteric liquid crystal layer 16 obtained by immobilizing a cholesteric liquid crystalline phase include a liquid crystal composition including a liquid crystal compound and a chiral agent. It is preferable that the liquid crystal compound is a polymerizable liquid crystal compound.

In addition, the liquid crystal composition used for forming the cholesteric liquid crystal layer may further include a surfactant or the like.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Alignment Controller)

In a case where the liquid crystal composition according to the embodiment of the present invention is applied to the alignment film, it is preferable that at least one additive (alignment controller) for providing the region having a pretilt angle is added to at least one of an alignment film side or an air interface side. By adding the above-described additive to the composition, the region having a pretilt angle can be provided in the optical element.

In a case where the composition according to the embodiment of the present invention is applied to the alignment film, it is preferable that an air interface alignment agent is added in addition to the liquid crystal compound in order to provide a pretilt angle to the air interface side. As a result, the region having a pretilt angle can be formed in at least one of upper and lower interfaces of the optically-anisotropic layer. The air interface alignment agent is a composition including: a fluoropolymer (X) including a constitutional unit represented by Formula (A) described below; and a fluoropolymer (Y) having a polar group without having the constitutional unit represented by Formula (A) described below. The air interface alignment agent is suitably used for forming an optically-anisotropic layer included in a phase difference plate according to the embodiment of the present invention described below.

In the present invention, as described above, by mixing the fluoropolymer (X) and the fluoropolymer (Y) with the air interface alignment agent, thickness unevenness of the formed optically-anisotropic layer can be suppressed, and the pretilt angle can be controlled.

Although the details are not clear, it is presumed that, by inserting the rod-shaped liquid crystal compound between fluoropolymers (X) arranged at a regular interval, the pretilt angle of the optically-anisotropic layer after polymerization can be controlled to be in a low tilt range. In addition, it is presumed that the fluoropolymer (Y) holds the arrangement of the fluoropolymers (X) such that thickness unevenness of the formed optically-anisotropic layer can be suppressed.

It is preferable that the air interface alignment agent in the composition according to the embodiment of the present invention includes at least: a fluoropolymer (X) including a constitutional unit represented by Formula (A) described below; and a fluoropolymer (Y) having a polar group without having the constitutional unit represented by Formula (A) described below.

<Fluoropolymer (X)>

The fluoropolymer (X) includes a constitutional unit represented by Formula (A) described below.

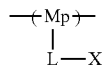

(A)

(In Formula (A), Mp represents a trivalent group forming a part of a polymer main chain, L represents a single bond or a divalent linking group, and X represents a substituted or unsubstituted fused ring functional group.)

In Formula (A), Mp represents a trivalent group forming a part of a polymer main chain.

Preferable examples of Mp include a substituted or unsubstituted long-chain or branched alkylene group having 2 to 20 carbon atoms (not including the number of carbon atoms in a substituent; hereinafter, the same can be applied to the groups in Mp) (for example, an ethylene group, a propylene group, a methyl ethylene group, a butylene group, or a hexylene group), a substituted or unsubstituted cyclic alkylene group having 3 to 10 carbon atoms (for example, a cyclopropylene group, a cyclobutylene group, or a cyclohexylene group), a substituted or unsubstituted vinylene group, a substituted or unsubstituted cyclic vinylene group, a substituted or unsubstituted phenylene group, a group having an oxygen atom (for example, a group having an ether group, an acetal group, an ester group, a carbonate group, or the like), a group having a nitrogen atom (for example, group having an amino group, an imino group, an amide group, a urethane group, a ureido group, an imide group, an imidazole group, an oxazole group, a pyrrole group, an anilide group, a maleinimide group, or the like), a group having a sulfur atom (for example, a group having a sulfide group, a sulfone group, a thiophene group, or the like), a group having a phosphorus atom (for example, a group having a phosphine group, a phosphate group, or the like), a group having a silicon atom (for example, a group having a siloxane group), a group obtained by linking two or more of the above-described groups, and a group obtained by substituting one hydrogen atom in each of the above-described groups with a -L-X group.

Among these, a substituted or unsubstituted ethylene group, a substituted or unsubstituted methylethylene group, a substituted or unsubstituted cyclohexylene group, or a substituted or unsubstituted vinylene group where one hydrogen atom is substituted with a -L-X group is preferable, a substituted or unsubstituted ethylene group, a substituted or unsubstituted methylethylene group, or a substituted or unsubstituted vinylene group where one hydrogen atom is substituted with a -L-X group is more preferable, and a substituted or unsubstituted ethylene group or a substituted or unsubstituted methylethylene group where one hydrogen atom is substituted with a -L-X group is still more preferable. Specifically, Mp-1 or Mp-2 described below is preferable.

Hereinafter, specific preferable example of Mp will be shown, but Mp is not limited to these examples. In addition, a portion represented by * in Mp represents a portion linked to L.

(Mp-1)

(Mp-2)

(Mp-3)

(Mp-4)

(Mp-5)

(Mp-6)

(Mp-7)

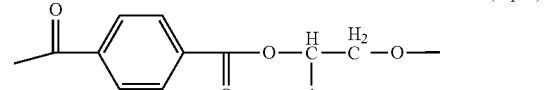

(Mp-8)

(Mp-9)

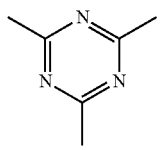

(Mp-19)

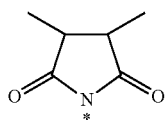

(Mp-10)

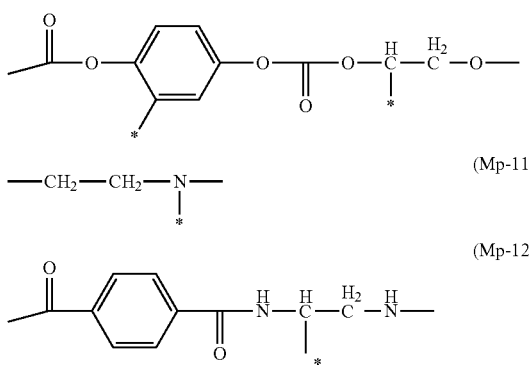

(Mp-11)

—CH₂—CH₂—N—
              |
              *

(Mp-12)

(Mp-13)

(Mp-14)

(Mp-15)

(Mp-16)

(Mp-17)

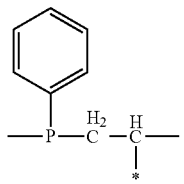

(Mp-18)

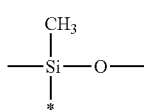

In a case where L (a single bond or a divalent linking group) in Formula (A) represents a divalent linking group, it is preferable that the divalent linking group is a divalent linking group represented by *-L1-L2-(* represents a linking site to a main chain) where L1 represents *—COO—, *—CONH—, *—OCO—, or *—NHCO— and L2 represents an alkylene group having 2 to 20 carbon atoms, a polyoxyalkylene group having 2 to 20 carbon atoms, or a divalent linking group including a combination thereof.

In particular, a linking group where L1 represents *—COO— and L2 represents a polyoxyalkylene group having 2 to 20 carbon atoms is preferable.

The number of rings in the substituted or unsubstituted fused ring functional group represented by X in Formula (A) is not limited and is preferably 2 to 5. The substituted or unsubstituted fused ring functional group may be a hydrocarbon aromatic fused ring consisting of only carbon atoms as atoms forming the ring, or may be an aromatic fused ring in which heterocycles including heteroatoms as ring-constituting atoms are fused.

In addition, for example, X represents a substituted or unsubstituted indenyl group having 5 to 30 carbon atoms, a substituted or unsubstituted naphthyl group having 6 to 30 carbon atoms, a substituted or unsubstituted fluorenyl group having 12 to 30 carbon atoms, an anthryl group, a pyrenyl group, a perylenyl group, or a phenanthrenyl group.

Among these, X represents preferably a substituted or unsubstituted indenyl group having 5 to 30 carbon atoms or a substituted or unsubstituted naphthyl group having 6 to 30 carbon atoms, more preferably a substituted or unsubstituted naphthyl group having 10 to 30 carbon atoms, and still more preferably a substituted or unsubstituted naphthyl group having 10 to 20 carbon atoms.

Hereinafter, preferable specific examples of the constitutional unit represented by Formula (A) will be shown, but the present invention is not limited thereto.

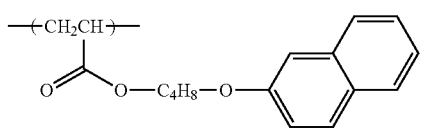

A-1

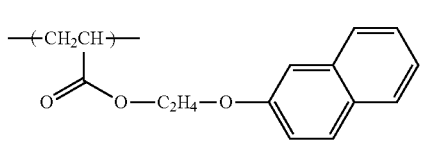

A-2

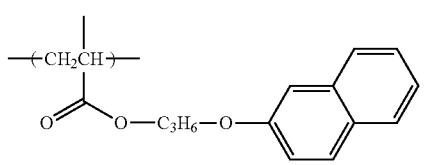

A-3

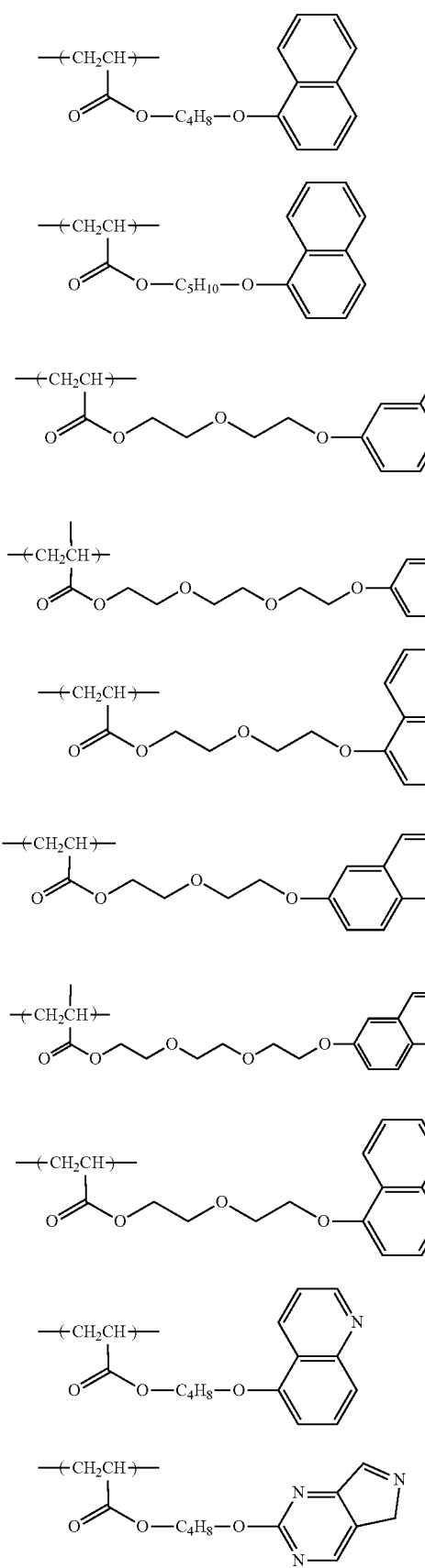
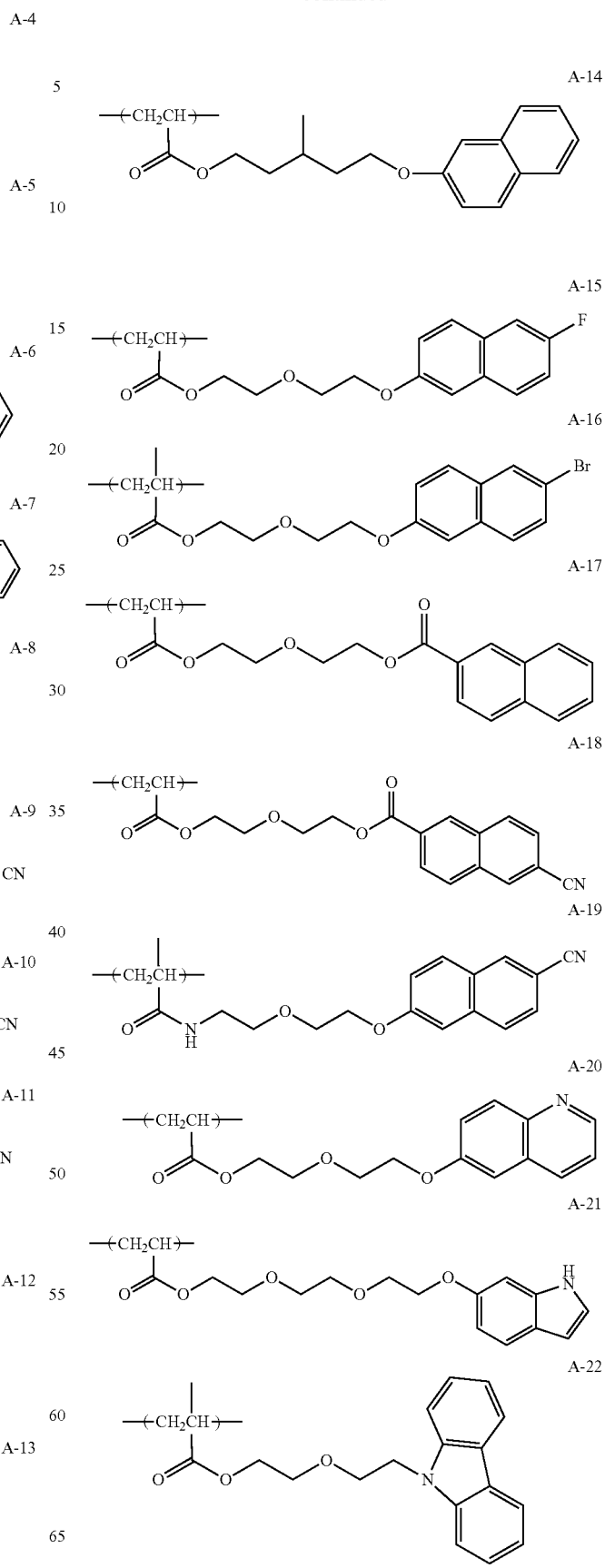

A-23
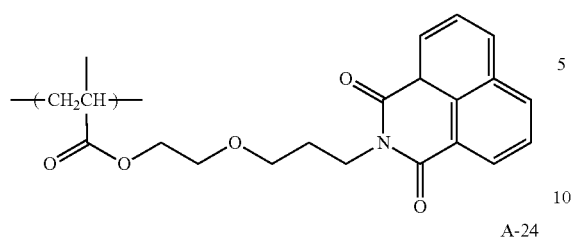

A-24
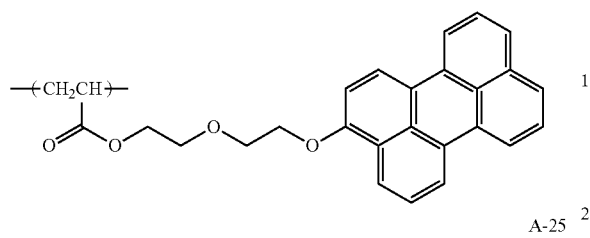

A-25
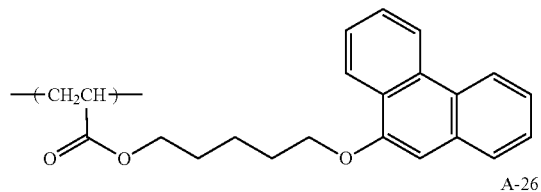

A-26
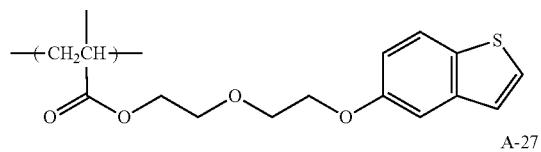

A-27
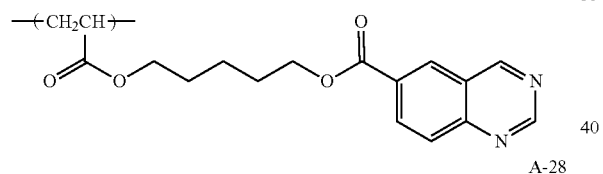

A-28
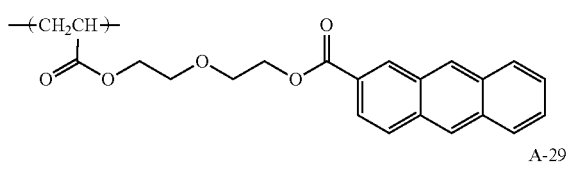

A-29
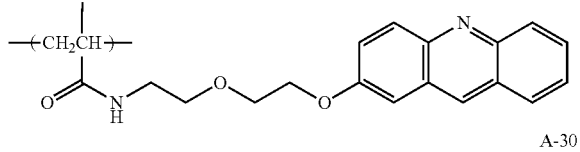

A-30
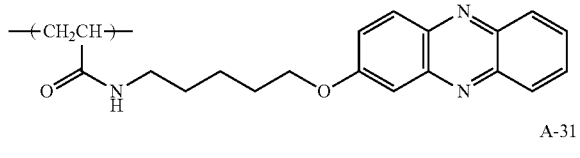

A-31
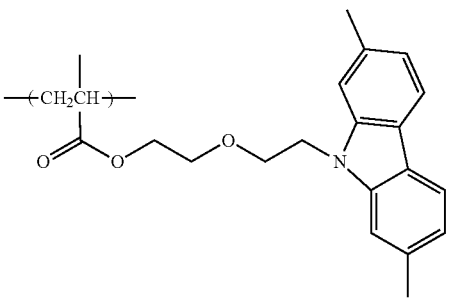

A-32
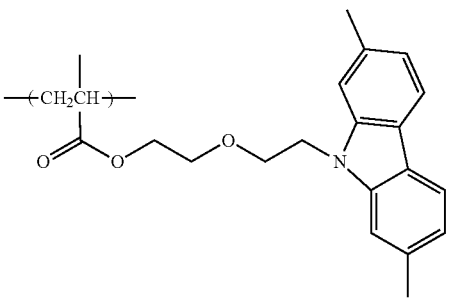

A-33
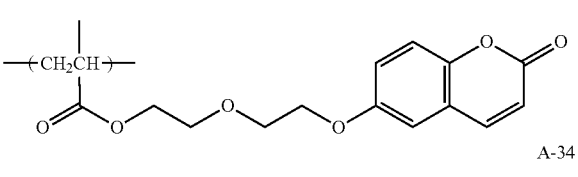

A-34
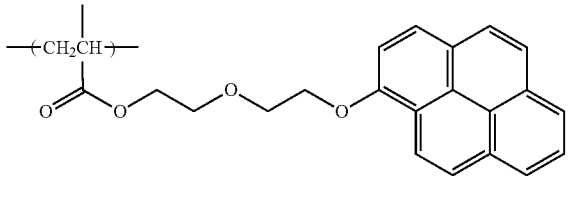

In addition, in addition to the constitutional unit represented by Formula (A), it is preferable that the fluoropolymer (X) includes, for example, a constitutional unit derived from a fluoroaliphatic group-containing monomer, and it is more preferable that the fluoropolymer (X) includes a constitutional unit represented by the following Formula (B).

(B)

(In Formula (B), Mp represents a trivalent group forming a part of a polymer main chain, L' represents a single bond or a divalent linking group, and Rf represents a substituent having at least one fluorine atom).

Mp in Formula (B) has the same definition and the same preferable range as Mp in Formula (A).

In a case where U (a single bond or a divalent linking group) represents a divalent linking group, the divalent linking group is preferably —O—, —NRa11-(where Ra11 represents a hydrogen atom, an aliphatic hydrocarbon group having 1 to 10 carbon atoms, or an aryl group having 6 to 20 carbon atoms), —S—, —C(=O)—, —S(=O)$_2$—, a substituted or unsubstituted alkylene group having 1 to 20 carbon atoms, or and a divalent linking group selected from groups formed by two or more of the above-described groups being linked to each other.

Examples of the divalent linking group formed by two or more of the above-described groups being linked to each other include —C(=O)O—, —OC(=O)—, —OC(=O)O—, —C(=O)NH—, —NHC(=O)—, and —C(=O)O(CH$_2$)maO— (where ma represents an integer of 1 to 20).

Further, in a case where Mp in Formula (B) represents Mp-1 or Mp-2, represents —O—, —NRa11-(Ra11 represents preferably a hydrogen atom or an aliphatic hydrocarbon group having 1 to 10 carbon atoms), —S—, —C(=O)—, —S(=O)$_2$—, a substituted or unsubstituted alkylene group having 1 to 20 carbon atoms, or a divalent linking group selected from groups formed by two or more of the above-described groups being linked to each other, and more preferably —O—, —C(=O)O—, —C(=O)NH—, or a divalent linking group consisting of one or more of the above-described groups and an alkylene group.

Preferable examples of Rf include an aliphatic hydrocarbon group having 1 to 30 carbon atoms in which at least one fluorine atom is substituted (for example, a trifluoroethyl group, a perfluorohexylethyl group, a perfluorohexylpropyl group, a perfluorobutylethyl group, or a perfluorooctylethyl group). In addition, it is preferable that Rf has a CF$_3$ group or a CF$_2$H group at a terminal, and it is more preferable Rf has a CF$_3$ group at a terminal.

It is more preferable that Rf represents an alkyl group having a CF$_3$ group at a terminal or an alkyl group having a CF$_2$H group at a terminal. The alkyl group having a CF$_3$ group at a terminal is an alkyl group in which a part or all of hydrogen atoms in the alkyl group are substituted with fluorine atoms. An alkyl group having a CF$_3$ group at a terminal in which 50% or higher of hydrogen atoms are substituted with fluorine atoms is preferable, an alkyl group having a CF$_3$ group at a terminal in which 60% or higher of hydrogen atoms are substituted with fluorine atoms is more preferable, and an alkyl group having a CF$_3$ group at a terminal in which 70% or higher of hydrogen atoms are substituted with fluorine atoms is still more preferable. The remaining hydrogen atoms may be further substituted with a substituent described below as an example of a substituent group D.

The alkyl group having a CF$_2$H group at a terminal is an alkyl group in which a part or all of hydrogen atoms in the alkyl group are substituted with fluorine atoms. An alkyl group having a CF$_2$H group at a terminal in which 50% or higher of hydrogen atoms are substituted with fluorine atoms is preferable, an alkyl group having a CF$_2$H group at a terminal in which 60% or higher of hydrogen atoms are substituted with fluorine atoms is more preferable, and an alkyl group having a CF$_2$H group at a terminal in which 70% or higher of hydrogen atoms are substituted with fluorine atoms is still more preferable. The remaining hydrogen atoms may be further substituted with a substituent described below as an example of a substituent group D.

Substituent Group D

The substituent group D include an alkyl group (an alkyl group having preferably 1 to 20 carbon atoms (which are carbon atoms in the substituent; hereinafter, the same shall be applied to the substituent group D), more preferably 1 to 12 carbon atoms, and still more preferably 1 to 8 carbon atoms; for example, a methyl group, an ethyl group, an isopropyl group, a tert-butyl group, an n-octyl group, an n-decyl group, an n-hexadecyl group, a cyclopropyl group, a cyclopentyl group, or a cyclohexyl group), an alkenyl group (an alkenyl group having preferably 2 to 20 carbon atoms, more preferably 2 to 12 carbon atoms, and still more preferably 2 to 8 carbon atoms; for example, a vinyl group, a 2-butenyl group, or a 3-pentenyl group), an alkynyl group (an alkynyl group having preferably 2 to 20 carbon atoms, more preferably 2 to 12 carbon atoms, and still more preferably 2 to 8 carbon atoms; for example, a propargyl group or a 3-pentynyl group), a substituted or unsubstituted amino group (an amino group having preferably 0 to 20 carbon atoms, more preferably 0 to 10 carbon atoms, still more preferably 0 to 6 carbon atoms; for example, a unsubstituted amino group, a methylamino group, a dimethylamino group, or a diethylamino group), an alkoxy group (an alkoxy group having preferably 1 to 20 carbon atoms, more preferably 1 to 12 carbon atoms, and still more preferably 1 to 8 carbon atoms; for example, a methoxy group, an ethoxy group, or a butoxy group), an acyl group (an acyl group having preferably 1 to 20 carbon atoms, more preferably 1 to 16 carbon atoms, and still more preferably 1 to 12 carbon atoms; for example, an acetyl group, a formyl group, or a pivaloyl group), an alkoxycarbonyl groups (an alkoxycarbonyl group having preferably 2 to 20 carbon atoms, more preferably 2 to 16 carbon atoms, and still more preferably 2 to 12 carbon atoms; for example, a methoxycarbonyl group or an ethoxycarbonyl group), an acyloxy group (an acyloxy group having preferably 2 to 20 carbon atoms, more preferably 2 to 16 carbon atoms, and still more preferably 2 to 10 carbon atoms; for example, an acetoxy group), an acylamino group (an acylamino group having preferably 2 to 20 carbon atoms, more preferably 2 to 16 carbon atoms, and still more preferably 2 to 10 carbon atoms; for example, an acetylamino group), an alkoxycarbonylamino group (an alkoxycarbonylamino group having preferably 2 to 20 carbon atoms, more preferably 2 to 16 carbon atoms, and still more preferably 2 to 12 carbon atoms; for example, a methoxycarbonylamino group), a sulfonylamino group (a sulfonylamino group having preferably 1 to 20 carbon atoms, more preferably 1 to 16 carbon atoms, and still more preferably 1 to 12 carbon atoms; for example, a methanesulfonylamino group or an ethanesulfonylamino group), a sulfamoyl group (a sulfamoyl group having preferably 0 to 20 carbon atoms, more preferably 0 to 16 carbon atoms, and still more preferably 0 to 12 carbon atoms; for example, a sulfamoyl group, a methylsulfamoyl group, or a dimethylsulfamoyl group), an alkylthio group (an alkylthio group having preferably 1 to 20 carbon atoms, more preferably from 1 to 16 carbon atoms, and still more preferably from 1 to 12 carbon atoms; for example, a methylthio group or an ethylthio group), a sulfonyl group (a sulfonyl group having preferably 1 to 20 carbon atoms, more preferably from 1 to 16 carbon atoms, and still more preferably from 1 to 12 carbon atoms; for example, a mesyl group or a tosyl group), a sulfinyl group (a sulfinyl group having preferably 1 to 20 carbon atoms, more preferably from 1 to 16 carbon atoms, and still more preferably from 1 to 12 carbon atoms; for example, a methanesulfinyl group or an ethanesulfinyl group), a ureido group (a ureido group having preferably 1 to 20 carbon atoms, more preferably 1 to 16 carbon atoms, and still more preferably 1 to 12 carbon atoms; for example, an unsubstituted ureido group or a methylureido group), a phosphoric amide group (a phosphoric amide group having preferably 1 to 20 carbon atoms, more preferably 1 to 16 carbon atoms, and still more preferably 1 to 12 carbon atoms; for example, a diethylphosphoric amide group), a hydroxy group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, and a silyl group (a silyl group having preferably from 3 to 40 carbon atoms, more preferably from 3 to 30 carbon atoms, and still more preferably from 3 to 24 carbon atoms; for example, trimethylsilyl or triphenylsilyl). The substituents may be further substituted with the substituents. In addition, in a case where two or more substituents are present, the substituents may be the same as or different from each other. In addition, if possible, the substituents may be bonded to each other to form a ring.

Examples of the alkyl group having a $CF_3$ group at a terminal or the alkyl group having a $CF_2H$ group at a terminal are as follows.

| | |
|---|---|
| $n\text{-}C_3F_{17}$— | R1 |
| $n\text{-}C_6F_{13}$— | R2 |
| $n\text{-}C_4F_9$— | R3 |
| $n\text{-}C_8F_{17}$—$(CH_2)_2$— | R4 |
| $n\text{-}C_6F_{13}$—$(CH_2)_3$— | R5 |
| $n\text{-}C_4F_9$—$(CH_2)_2$— | R6 |
| H—$(CF_2)_8$— | R7 |
| H—$(CF_2)_6$— | R8 |
| H—$(CF_2)_4$— | R9 |
| H—$(CF_2)_8$—$(CH_2)_2$— | R10 |
| H—$(CF_2)_6$—$(CH_2)_3$— | R11 |
| H—$(CF_2)_4$—$(CH_2)_2$— | R12 |
| $n\text{-}C_7F_{15}$—$(CH_2)_2$— | R13 |
| $n\text{-}C_6F_{13}$—$(CH_2)_3$— | R14 |
| $n\text{-}C_4F_9$—$(CH_2)_2$— | R15 |

Hereinafter, specific examples of the constitutional unit derived from the fluoroaliphatic group-containing monomer will be shown, but the present invention is not limited thereto.

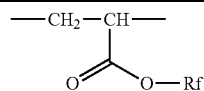

Rf =
—$CH_2CH_2C_4F_9$ (B-1)
—$CH_2CH_2CH_2C_4F_9$ (B-2)
—$CH_2CH_2C_6F_{13}$ (B-3)
—$CH_2CH_2C_8F_{17}$ (B-4)
—$CH_2CH_2OCH_2CH_2C_4F_9$ (B-5)
—$CH_2CH_2OCH_2CH_2CH_2C_4F_9$ (B-6)
—$CH_2CH_2OCH_2CH_2C_6F_{13}$ (B-7)
—$CH_2CH_2OCH_2CH_2C_8F_{17}$ (B-8)
—$CH_2CH_2C_4F_8H$ (B-9)
—$CH_2CH_2CH_2C_4F_8H$ (B-10)
—$CH_2CH_2C_6F_{12}H$ (B-11)
—$CH_2CH_2C_8F_{16}H$ (B-12)
—$CH_2CH_2OCH_2CH_2C_4F_8H$ (B-13)
—$CH_2CH_2OCH_2CH_2CH_2C_4F_8H$ (B-14)
—$CH_2CH_2OCH_2CH_2C_6F_{12}H$ (B-15)
—$CH_2CH_2OCH_2CH_2C_8F_{15}H$ (B-16)
—$CH_2CH_2OCH_2CH_2C_5F_{10}H$ (B-17)

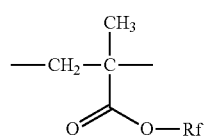

Rf =
—$CH_2CH_2C_4F_9$ (B-18)
—$CH_2CH_2CH_2C_4F_9$ (B-19)
—$CH_2CH_2C_6F_{13}$ (B-20)
—$CH_2CH_2C_8F_{17}$ (B-21)
—$CH_2CH_2OCH_2CH_2C_4F_9$ (B-22)

—$CH_2CH_2OCH_2CH_2CH_2C_4F_9$ (B-23)
—$CH_2CH_2OCH_2CH_2C_6F_{13}$ (B-24)
—$CH_2CH_2OCH_2CH_2C_8F_{17}$ (B-25)
—$CH_2CH_2C_4F_6H$ (B-26)
—$C_{l2}CH_2CH_2C_4F_8H$ (B-27)
—$CH_2CH_2C_6F_{12}H$ (B-28)
—$CH_2CH_2C_8F_{16}H$ (B-29)
—$CH_2CH_2OCH_2CH_2C_4F_8H$ (B-30)
—$CH_2CH_2OCH_2CH_2CH_2C_4F_8H$ (B-31)
—$CH_2CH_2OCH_2CH_2C_6F_{12}H$ (B-32)
—$CH_2CH_2OCH_2CH_2C_8F_{16}H$ (B-33)
—$CH_2CH_2OCH_2CH_2C_5F_{10}H$ (B-34)

In addition, in addition to the constitutional unit having the structure represented by Formula (A) and the constitutional unit derived from the fluoroaliphatic group-containing monomer that is represented by Formula (B), the fluoropolymer (X) used in the present invention may include a constitutional unit derived from a monomer that is copolymerizable with the monomer forming the constitutional unit.

The copolymerizable monomer is not particularly limited within a range not departing from the scope of the present invention. As the preferable monomer, for example, from the viewpoint of improving solubility in a solvent or preventing aggregation of a polymer, a monomer forming a hydrocarbon polymer (for example, polyethylene, polypropylene, polystyrene, polymaleimide, polyacrylic acid, polyacrylic acid ester, polyacrylamide, or polyaciyl anilide), polyether, polyester, polycarbonate, polyamide, polyamic acid, polyimide, polyurethane, or polyureide can be preferably used.

Further, as the main chain structure, a constitutional unit that is the same as the unit having the group represented by Formula (A) is preferable.

Hereinafter, specific examples of the copolymerizable constitutional unit will be shown, but the present invention is not limited to the following specific examples. In particular, C-2, C-3, C-10, C-11, C-12, or C-19 is preferable, and C-11 or C-19 is more preferable.

(C-1)

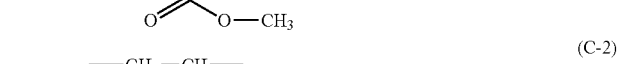

(C-2)

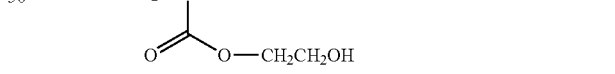

(C-3)

(C-4)

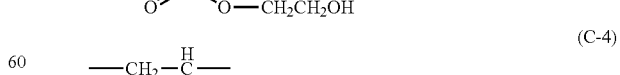

(C-5)

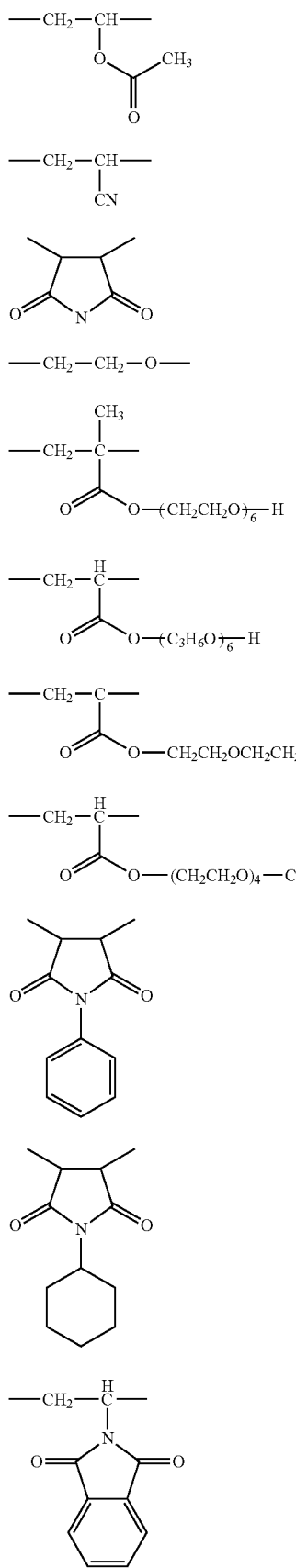
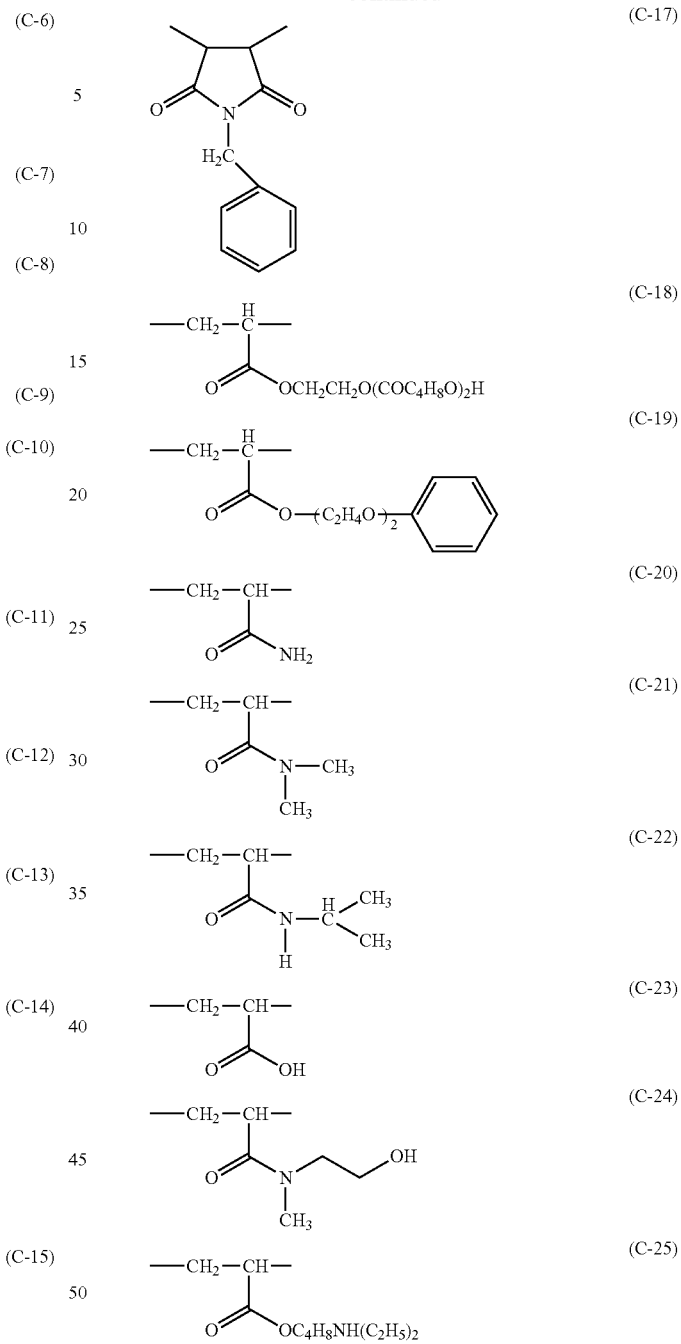

In the fluoropolymer (X), the content of the constitutional unit represented by Formula (A) is preferably 1 mass % to 90 mass % and more preferably 3 mass % to 80 mass %.

In addition, in the fluoropolymer (X), the content of the repeating unit derived from the fluoroaliphatic group-containing monomer (preferably the constitutional unit represented by Formula (B)) is preferably 5 mass % to 90 mass % and more preferably 10 mass % to 80 mass %.

The content of a constitutional unit other than the above-described two constitutional units is preferably 60 mass % or lower and more preferably 50 mass % or lower.

In addition, the fluoropolymer (X) may be a random copolymer into which the respective constitutional units are irregularly introduced or may be a block copolymer into which the respective constitutional units are regularly introduced. In a case where the fluoropolymer (X) is the block copolymer, the block copolymer may be synthesized by introducing the respective constitutional units in any introduction order or by using the same component twice or more.

In addition, as the constitutional unit represented by Formula (A), the constitutional unit represented by Formula (B), or the like, only one kind may be used, or two or more kinds may be used. In a case where two or more constitutional units represented by Formula (A) are included, it is preferable that X represents the same fused ring skeleton (a combination of a substituted group and an unsubstituted group). In a case where two or more constitutional units are included, the content refers to a total content.

Further, the range of the number-average molecular weight (Mn) of the fluoropolymer (X) is preferably 1000 to 1000000, more preferably 3000 to 200000, and still more preferably 5000 to 100000. In addition, a molecular weight distribution (Mw/Mn; Mw represents a weight-average molecular weight) of the polymer used in the present invention is preferably 1 to 4 and more preferably 1.5 to 4.

Here, the number-average molecular weight can be measured as a value in terms of polystyrene (PS) obtained by gel permeation chromatography (GPC).

<Fluoropolymer (Y)>

The fluoropolymer (Y) includes a polar group without including the constitutional unit represented by Formula (A).

Here, the polar group refers to a group having at least one heteroatom or at least one halogen atom, and specific examples thereof include a hydroxyl group, a carbonyl group, a carboxy group, an amino group, a nitro group, an ammonium group, and a cyano group. Among these, a hydroxyl group or a carboxy group is preferable.

In the present invention, it is preferable that the fluoropolymer (Y) includes a constitutional unit represented by the following Formula (C).

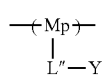

(C)

(In Formula (C), Mp represents a trivalent group forming a part of a polymer main chain, L represents a single bond or a divalent linking group, and Y represents a polar group.)

Mp in Formula (C) has the same definition and the same preferable range as Mp in Formula (A). In a case where L" (a single bond or a divalent linking group) in Formula (A) represents a divalent linking group, it is preferable that the divalent linking group is a divalent linking group represented by *-L1-L3-(* represents a linking site to a main chain) where L1 represents *—COO—, *—CONH—, *—OCO—, or *—NHCO— and L3 represents an alkylene group having 2 to 20 carbon atoms, a polyoxyalkylene group having 2 to 20 carbon atoms, —C(=O)—, —OC(=O)O—, an aryl group, or a divalent linking group including a combination thereof.

Among these, it is preferable that L" represents a single bond; a divalent linking group where L1 represents *—COO and L3 represents a divalent linking group including a combination of an alkylene group, —OC(=O)O—, and an aryl group; or a divalent linking group where L1 represents *—COO— and L3 represents a polyoxyalkylene group having 2 to 20 carbon atoms.

In addition, examples of the polar group represented by Y in Formula (C) include a hydroxyl group, a carbonyl group, a carboxy group, an amino group, a nitro group, an ammonium group, and a cyano group. Among these, a hydroxyl group, a carboxy group, or a cyano group is preferable.

In addition, as in the fluoropolymer (X), in addition to the constitutional unit represented by Formula (C), it is preferable that the fluoropolymer (Y) includes, for example, a constitutional unit derived from a fluoroaliphatic group-containing monomer, and it is more preferable that the fluoropolymer (Y) includes a constitutional unit represented by Formula (B).

Likewise, as in the fluoropolymer (X), in addition to the constitutional unit having the structure represented by Formula (C) and the constitutional unit derived from the fluoroaliphatic group-containing monomer that is represented by Formula (B), the fluoropolymer (Y) may include a constitutional unit derived from a monomer that is copolymerizable with the monomer forming the constitutional unit.

In the fluoropolymer (Y), the content of the constitutional unit represented by Formula (C) is preferably 45 mass % or lower, more preferably 1% to 20 mass %, and still more preferably 2% to 10 mass %.

In addition, in the fluoropolymer (Y), the content of the repeating unit derived from the fluoroaliphatic group-containing monomer (preferably the constitutional unit represented by Formula (B)) is preferably 55 mass % or higher, more preferably 80 mass % to 99 mass % and more preferably 90 mass % to 98 mass %. The content of a constitutional unit other than the above-described two constitutional units is preferably 60 mass % or lower and more preferably 50 mass % or lower.

In addition, the fluoropolymer (Y) may be a random copolymer into which the respective constitutional units are irregularly introduced or may be a block copolymer into which the respective constitutional units are regularly introduced. In a case where the fluoropolymer (Y) is the block copolymer, the block copolymer may be synthesized by introducing the respective constitutional units in any introduction order or by using the same component twice or more.

In addition, as the constitutional unit represented by Formula (C), the constitutional unit represented by Formula (B), or the like, only one kind may be used, or two or more kinds may be used. In a case where two or more constitutional units represented by Formula (C) are included, it is preferable that Y represents the same polar group. In a case where two or more constitutional units are included, the content refers to a total content.

Further, regarding the molecular weight range of the fluoropolymer (Y), the weight-average molecular weight (Mw) is preferably 10000 to 35000 and more preferably 15000 to 30000.

Here, the weight-average molecular weight can be measured as a value in terms of polystyrene (PS) obtained by gel permeation chromatography (GPC).

(Mass Ratio between Fluoropolymer (X) and Fluoropolymer (Y) (A:B))

The mass ratio is preferably 98:2 to 2:98, more preferably 98:2 to 55:45, and still more preferably 98:2 to 60:40.

In the present invention, the content of the air interface alignment agent including the fluoropolymer (X) and the fluoropolymer (Y) is preferably 0.2 mass % to 10 mass %, more preferably 0.2 mass % to 5 mass %, and still more preferably 0.2 mass % to 3 mass % with respect to the total solid content of the liquid crystal composition.

[Other Components]

The liquid crystal composition according to the embodiment of the present invention may include components other than the liquid crystal compound and the photo alignment compound.

For example, the liquid crystal composition may include a polymerization initiator.

As the polymerization initiator, for example, a thermal polymerization initiator or a photopolymerization initiator can be used depending on the type of the polymerization reaction. Examples of the photopolymerization initiator include an α-carbonyl compound, acyloin ether, an α-hydrocarbon-substituted aromatic acyloin compound, a polynuclear quinone compound, a combination of a triarylimidazole dimer and p-aminophenyl ketone, acridine, a phenazine compound, and an oxadiazole compound.

The amount of the polymerization initiator used is preferably 0.01% to 20 mass % and more preferably 0.5% to 5 mass % with respect to the total solid content of the composition.

In addition from the viewpoints of the uniformity of the coating film and the strength of the film, the liquid crystal composition may include a polymerizable monomer.

Examples of the polymerizable monomer include a radically polymerizable compound or a cationically polymerizable compound. The polymerizable monomer is preferably a polyfunctional radically polymerizable monomer and is preferably copolymerizable with the disk-shaped liquid crystal compound having the polymerizable group. For example, compounds described in paragraphs "0018" to "0020" in JP2002-296423A can be used.

The addition amount of the polymerizable monomer is preferably 1 to 50 parts by mass and more preferably 5 to 30 parts by mass with respect to 100 parts by mass of the liquid crystal compound.

In addition from the viewpoints of the uniformity of the coating film and the strength of the film, the liquid crystal composition may include a surfactant.

Examples of the surfactant include a well-known compound of the related art. In particular, a fluorine compound is preferable. Specific examples of the surfactant include a compound described in paragraphs "0028" to "0056" of JP2001-330725A and a compound described in paragraphs "0069" to "0126" of JP2003-295212A.

In addition, the liquid crystal composition may include a solvent and preferably an organic solvent.

Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or dichloromethane), esters (for example, methyl acetate, ethyl acetate, or butyl acetate), ketones (for example, acetone or methyl ethyl ketone), and ethers (for example, tetrahydrofuran or 1,2-dimethoxyethane). In particular, alkyl halide or ketone is preferable. Two or more organic solvents may be used in combination.

<<Onium Salt>>

In a case where the composition according to the embodiment of the present invention is applied to the alignment film, it is preferable that the composition includes at least one onium salt in order to provide the region having a pretilt angle on the alignment film side. The onium salt contributes to providing a constant pretilt angle to molecules of the rod-shaped liquid crystal compound on the aligned film interface side. Examples of the onium salt include an onium salt such as an ammonium salt, a sulfonium salt, or a phosphonium salt. A quaternary onium salt is preferable, and a quaternary ammonium salt is more preferable.

In general, the quaternary ammonium salt can be obtained by alkylation (Menschutkin reaction), alkenylation, alkynylation, or arylation of a tertiary amine (for example, trimethylamine, triethylamine, tributylamine, triethanolamine, N-methylpyrrolidine, N-methylpiperidine, N,N-dimethylpiperazine, triethylenediamine, or N,N,N',N'-tetramethylethylenediamine) or a nitrogen-containing heterocycle (for example, a pyridine ring, a picoline ring, a 2,2'-bipyridyl ring, a 4,4'-bipyridyl ring, a 1,10-phenanthroline ring, a quinoline ring, an oxazole ring, a thiazole ring, a N-methylimidazole ring, a pyrazine ring, or a tetrazole ring).

As the quaternary ammonium salt, a quaternary ammonium salt consisting of a nitrogen-containing heterocycle is preferable, and a quaternary pyridinium salt is more preferable.

More specifically, it is preferable that the quaternary ammonium salt is a quaternary pyridinium salt represented by the following Formula (3a) or Formula (3b).

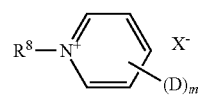

Formula(3a)

In Formula (3a), $R^8$ represents an alkyl group, an alkenyl group, an alkynyl group, an aralkyl group, an aryl group, or a heterocyclic group that is substituted or unsubstituted, D represents a hydrogen-bonding group, m represents an integer of 1 to 3, and X— represents an anion.

First, Formula (3a) will be described.

As the alkyl group represented by $R^8$, a substituted or unsubstituted alkyl group having 1 to 18 carbon atoms is preferable, and a substituted or unsubstituted alkyl group having 1 to 8 carbon atoms is more preferable. The alkyl group may be linear, branched, or cyclic. Examples of the alkyl group include methyl, ethyl, n-propyl, isopropyl, n-butyl, isobutyl, t-butyl, n-hexyl, n-octyl, neopentyl, cyclohexyl, adamantyl, and cyclopropyl.

Examples of a substituent of the alkyl group are as follows: a substituted or unsubstituted alkenyl group (for example, vinyl) having 2 to 18 carbon atoms (preferably 2 to 8 carbon atoms); a substituted or unsubstituted alkynyl group (for example, ethynyl) having 2 to 18 carbon atoms (preferably 2 to 8 carbon atoms); a substituted or unsubstituted aryl group (for example, phenyl or naphthyl) having 6 to 10 carbon atoms; a halogen atom (for example, F, Cl, or Br), a substituted or unsubstituted alkoxy group (for example, methoxy or ethoxy) having 1 to 18 carbon atoms (preferably 1 to 8 carbon atoms); a substituted or unsubstituted aryloxy group (for example, phenoxy, biphenyloxy, or p-methoxyphenoxy) having 6 to 10 carbon atoms; a substituted or unsubstituted alkylthio group (for example, methylthio or ethylthio) having 1 to 18 carbon atoms (preferably 1 to 8 carbon atoms); a substituted or unsubstituted arylthio group (for example, phenylthio) having 6 to 10 carbon atoms; a substituted or unsubstituted acyl group (for example, acetyl or propionyl) having 2 to 18 carbon atoms (preferably 2 to 8 carbon atoms);

a substituted or unsubstituted alkylsulfonyl group or arylsulfonyl group (for example, methanesulfonyl or p-toluenesulfonyl) having 1 to 18 carbon atoms (preferably 1 to 8 carbon atoms); a substituted or unsubstituted acyloxy group (for example, acetoxy or propionyloxy) having 2 to 18 carbon atoms (preferably 2 to 8 carbon atoms); a substituted or unsubstituted alkoxycarbonyl group (for example, methoxycarbonyl or ethoxycarbonyl) having 2 to 18 carbon atoms (preferably 2 to 8 carbon atoms); a substituted or unsubstituted aryloxycarbonyl group (for example, naphthoxycarbonyl) having 7 to 11 carbon atoms; an unsubstituted amino group or a substituted amino group (for example, methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, ethylthiocarbamoylamino, cyclohexylcarbonylamino, benzoylamino, chloroacetylamino, or methylsulfonylamino) having 1 to 18 carbon atoms (preferably 1 to 8 carbon atoms);

a substituted or unsubstituted carbamoyl group (for example, unsubstituted carbamoyl, methylcarbamoyl, ethylcarbamoyl, n-butylcarbamoyl, t-butylcarbamoyl, dimethylcarbamoyl, morpholinocarbamoyl, or pyrrolidinocarbamoyl) having 1 to 18 carbon atoms (preferably 1 to 8 carbon atoms); an unsubstituted sulfamoyl group or a substituted sulfamoyl group (for example, methylsulfamoyl or phenylsulfamoyl) having 1 to 18 carbon atoms (preferably 1 to 8 carbon atoms); a cyano group; a nitro group; a carboxy group; a hydroxyl group; and a heterocyclic group (for example, an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring, or a coumarin ring). As the substituent of the alkyl group, an aryloxy group, an arylthio group, an arylsulfonyl group, or an aryloxycarbonyl group is preferable.

As the alkenyl group represented by $R^8$, a substituted or unsubstituted alkenyl group having 2 to 18 carbon atoms is preferable, a substituted or unsubstituted alkenyl group having 2 to 8 carbon atoms is more preferable, and examples thereof include vinyl, aryl, 1-propenyl, and 1,3-butadienyl. As a substituent of the alkenyl group, the above-described examples of the substituent of the alkyl group are preferable.

As the alkynyl group represented by $R^8$, a substituted or unsubstituted alkynyl group having 2 to 18 carbon atoms is preferable, a substituted or unsubstituted alkynyl group having 2 to 8 carbon atoms is more preferable, and examples thereof include ethynyl and 2-propynyl. As a substituent of the alkynyl group, the above-described examples of the substituent of the alkyl group are preferable.

As the aralkyl group represented by $R^8$, a substituted or unsubstituted aralkyl group having 7 to 18 carbon atoms is preferable. For example, benzyl, methylbenzyl, biphenylmethyl, or naphthylmethyl is preferable. Examples of a substituent of the aralkyl group include the above-described examples of the substituent of the alkyl group.

As the aryl group represented by $R^8$, a substituted or unsubstituted aryl group having 6 to 18 carbon atoms is preferable, and examples thereof include phenyl, naphthyl, and fluorenyl. As a substituent of the aryl group, the above-described examples of the substituent of the alkyl group are preferable. In addition, an alkyl group (for example, methyl or ethyl), an alkynyl group, or a benzoyl group is also preferable.

The heterocyclic group represented by $R^8$ is 5- or 6-membered ring saturated or unsaturated heterocycle including a carbon atom, a nitrogen atom, an oxygen atom, or a sulfur atom, and examples thereof include an oxazole ring, a benzoxazole ring, a thiazole ring, a benzothiazole ring, an imidazole ring, a benzimidazole ring, an indolenine ring, a pyridine ring, a piperidine ring, a pyrrolidine ring, a morpholine ring, a sulfolane ring, a furan ring, a thiophene ring, a pyrazole ring, a pyrrole ring, a chroman ring, and a coumarin ring. The heterocyclic group may be substituted. In this case, as a substituent of the alkyl group, the above-described examples of the substituent of the alkyl group are preferable. As the heterocyclic group represented by $R^8$, a benzoxazole ring or a benzothiazole ring is preferable.

It is preferable that $R^8$ represents an alkyl group, an aralkyl group, an aryl group, or a heterocyclic group that is substituted or unsubstituted.

D represents a hydrogen-bonding group. A hydrogen bond is present between hydrogen atoms that form a covalent bond between an electronegative atom (for example, 0, N, F, Cl) and an electronegative atom. A theoretical explanation for a hydrogen bond is reported in, for example, H. Uneyama and K. Morokuma, Journal of American Chemical Society, Vol 99, pp. 1316 to 1332, 1977. Specific examples of the form of a hydrogen bond include a form shown in FIG. 17, p. 98, Intermolecular Force and Surface Force, J. N. Israerachiviri, translated by Kondo Tamotsu and Oshima Hiroyuki, McGraw-Hill (1991). Specific examples of the hydrogen bond include examples described in G. R. Desiraju, Angewante Chemistry International Edition English, Vol. 34, p. 2311, 1995.

Preferable examples of the hydrogen-bonding group include a mercapto group, a hydroxy group, an amino group, a carbonamide group, a sulfonamide group, an acid amide group, an ureido group, a carbamoyl group, a carboxyl group, a sulfo group, a nitrogen-containing heterocyclic group (for example, an imidazolyl group, a benzimidazolyl group, a pyrazolyl group, a pyridyl group, a 1,3,5-triazine group, a pyrimidyl group, a pyridazyl group, a quinolyl group, a benzimidazolyl group, a benzothiazolyl group, a succinimide group, a phthalimide group, a maleimide group, an uracil group, a thiouracil group, a barbituric acid group, a hydantoin group, a maleic hydrazide group, an isatin group, and an uramil group). Preferable examples of the hydrogen-bonding group include an amino group, a carbonamide group, a sulfonamide group, an ureido group, a carbamoyl group, a carboxyl group, a sulfo group, and a pyridyl group. Among these, an amino group, a carbamoyl group, or a pyridyl group is more preferable.

The anion represented by X— may be an inorganic anion or an organic anion, and examples thereof include a halogen anion (for example, a fluoride ion, a chloride ion, a bromide ion, or an iodide ion), a sulfonate ion (for example, a methanesulfonate ion, a trifluoromethanesulfonate ion, a methyl sulfate ion, a p-toluenesulfonate ion, a p-chlorobenzenesulfonate ion, a 1,3-benzenedisulfonate ion, a 1,5-naphthalenedisulfonate ion, or a 2,6-naphthalenedisulfonate ion), a sulfate ion, a thiocyanate ion, a perchlorate ion, a tetrafluoroborate ion, a picrate ion, an acetate ion, a phosphate ion (for example, a hexafluorophosphate ion), and a hydroxyl ion. It is preferable that X— represents a halogen anion, a sulfonate ion, or a hydroxyl ion. $X^-$ is not necessarily a monovalent anion and may be a divalent or higher anion. In this case, a ratio between a cation and an anion in the compound is not necessarily 1:1 and may be appropriately determined.

In Formula (3a) m represents preferably 1.

In addition, it is more preferable that the quaternary ammonium salt represented by Formula (3a) is represented by the following Formula (4).

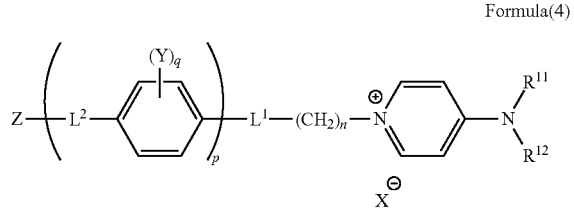

Formula(4)

In Formula (4), $L^1$ and $L^2$ each independently represent a divalent linking group or a single bond.

The divalent linking group is a substituted or unsubstituted alkylene group (for example, a methylene group, an ethylene group, or a 1,4-butylene group) having 1 to 10 carbon atoms, —O—, —C(=O)—, —C(=O)O—, —OC(=O)O—, —S—, —NR'—, —C(=O)NR"—, —S(=O)$_2$—, or a divalent linking group obtained by linking two or more of the above-described groups, and R' and R" represent a hydrogen atom or a substituted or unsubstituted alkyl group. In a case where the divalent linking group is bilaterally asymmetric (for example, —C(=O)O—), linking may be performed in any direction.

Y represents a substituent other than a hydrogen atom substituted with a phenyl group. Examples of the substituent represented by Y include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, an alkoxy group, an aryloxy group, an acyloxy group, a carbamoyloxy group, an amino group (including an anilino group), an acylamino group, a sulfamoylamino group, a mercapto group, an alkylthio group, an arylthio group, an acyl group, an aryloxycarbonyl group, an alkoxycarbonyl group, and a carbamoyl group.

$R^{11}$ and $R^{12}$ represent a hydrogen atom, an alkyl group, an aryl group, an acyl group, a carbamoyl group, a hydroxyl group, or an amino group. In addition, $R^{11}$ and $R^{12}$ may be linked to each other to form a ring.

Z represents a hydrogen atom, a substituted or unsubstituted aliphatic hydrocarbon group (for example, an alkyl group having 1 to 30 carbon atoms or an alkenyl group having 2 to 30 carbon atoms), or a substituted or unsubstituted aryl group (for example, a phenyl group having 6 to 30 carbon atoms), n and p represent an integer of 1 to 10, and q represents an integer of 0 to 4. However, in a case where p represents 2 or more, $L^2$'s, Y's, and q's included in the repeating units thereof may be the same as or different from each other.

Hereinafter, the preferable quaternary ammonium represented by Formula (4) will be described in detail.

In Formula (4), as the divalent linking group represented by $L^1$, —O— or a single bond is preferable. As the divalent linking group represented by $L^2$, —O—, —C(=O)O—, —OC(=O)O—, or a single bond is preferable.

As the substituent represented by Y in Formula (4), a halogen atom (for example, a fluorine atom, a chlorine atom, or a bromine atom) or an alkyl group (a linear, branched, or cyclic substituted or unsubstituted alkyl group is preferable, and an alkyl group (preferably an alkyl group having 1 to 30 carbon atoms, for example, methyl, ethyl, n-propyl, isopropyl, t-butyl, n-octyl, 2-chloroethyl, 2-cyanoethyl, or 2-ethylhexyl), an alkoxy group (for example, a methoxy group or an ethoxy group), or a cyano group is more preferable.

In Formula (4), $R^{11}$ and $R^{12}$ represent preferably a substituted or unsubstituted alkyl group and most preferably a methyl group.

In Formula (4), p represents preferably 1 to 5 and more preferably 2 to 4, n represents preferably 1 to 4 and more preferably 1 or 2, and q represents preferably 0 or 1. In a case where p represents 2 or more, it is more preferable that q represents 1 or more in at least one constitutional unit.

Next, Formula (3b) will be described.

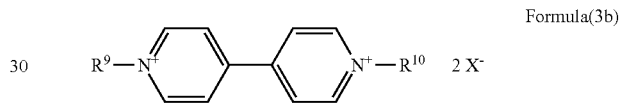

Formula(3b)

In Formula (3b), $R^9$ and $R^{10}$ each independently represents an alkyl group, an alkenyl group, an alkynyl group, an aralkyl group, an aryl group, or a heterocyclic group that is substituted or unsubstituted, and X— represents an anion. The alkyl group, the alkenyl group, the alkynyl group, the aralkyl group, the aryl group, or the heterocyclic group that is substituted or unsubstituted and is represented by each of $R^9$ and $R^{10}$ has the same definition and the same preferable range as the group represented by $R^8$ in Formula (3a). The anion represented by X— has the same definition and the same preferable range as the anion represented by X— in Formula (3a). X— is not necessarily a monovalent anion and may be a divalent or higher anion. In this case, a ratio between a cation and an anion in the compound is not necessarily 1:2 and may be appropriately determined.

Specific examples of the onium salt that can be used in the present invention will be shown below, but the onium salt used in the present invention is not limited to these examples. In the following specific examples, No. II-1 to II-12 are examples of the compound represented by Formula (3b), and No. II-13 to II-32 are examples of the compound represented by Formula (3a).

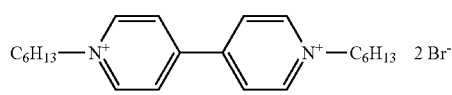

II-1

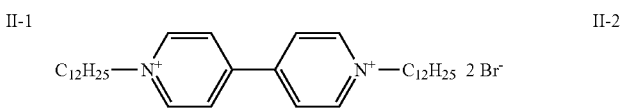

II-2

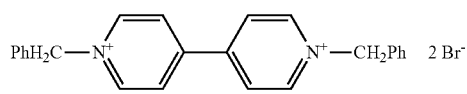

II-3

-continued
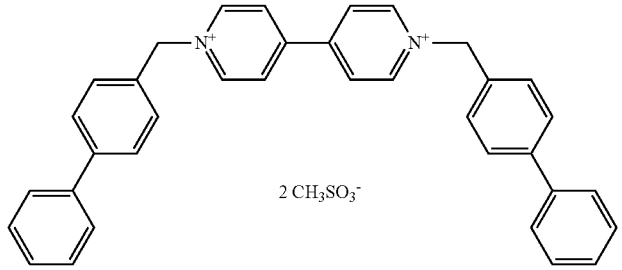
II-4
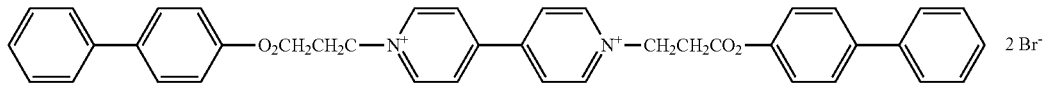
II-5
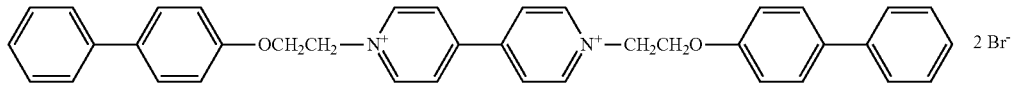
II-6
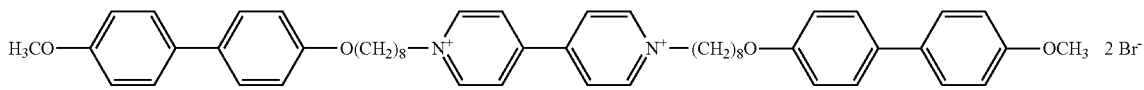
II-7
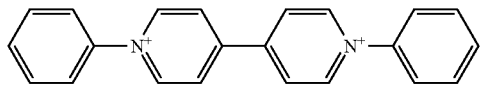
II-8
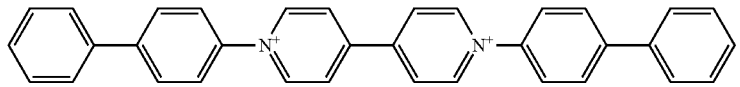
II-9
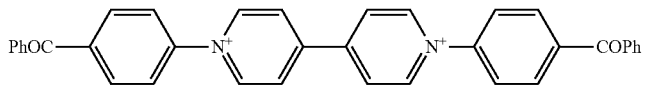
II-10
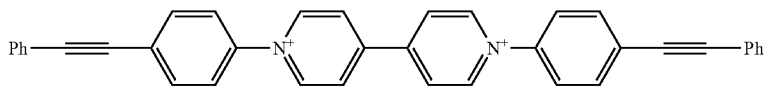
II-11
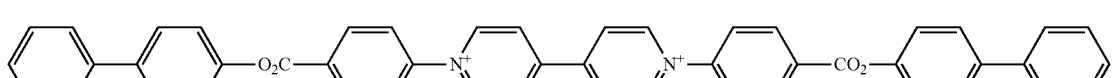
II-12
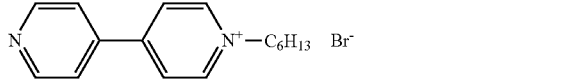
II-13
II-14

-continued
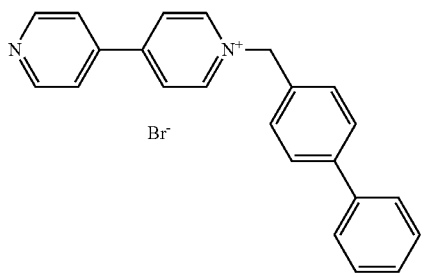
II-15
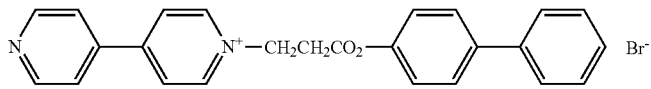
II-16
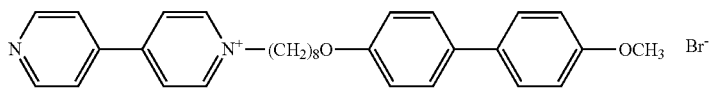
II-17
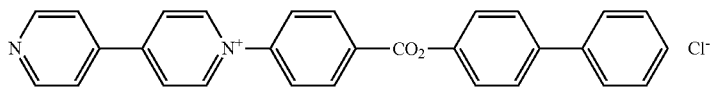
II-18
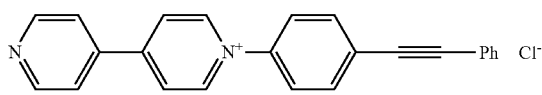
II-19
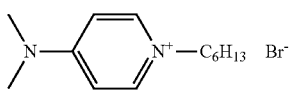
II-20
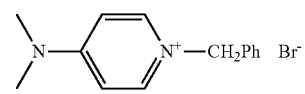
II-21
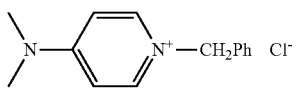
II-22
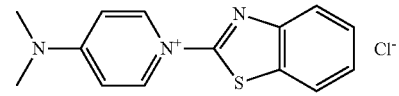
II-23
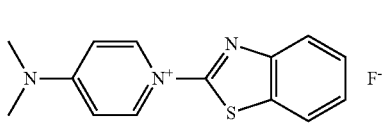
II-24
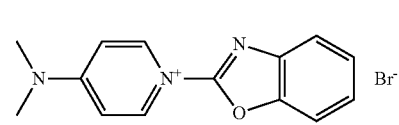
II-25
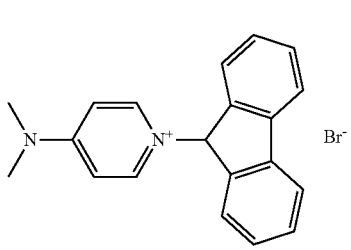
II-26
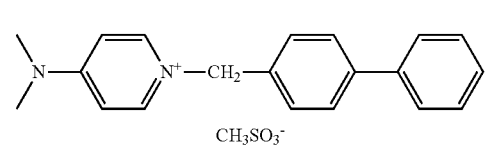
II-27
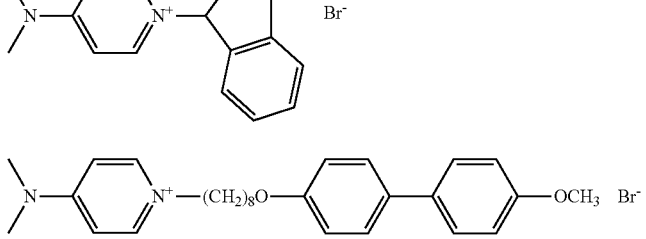
II-28
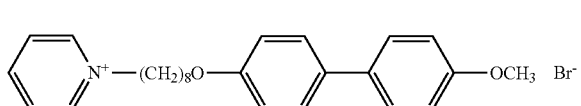
II-29
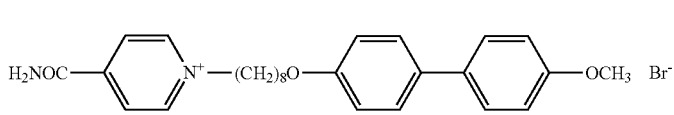
II-30

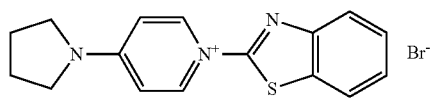 II-31
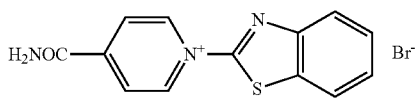 II-32
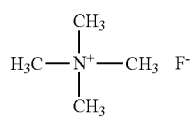 II-33
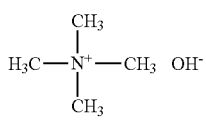 II-34
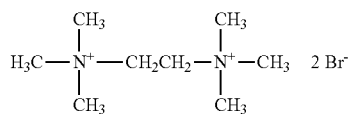 II-35
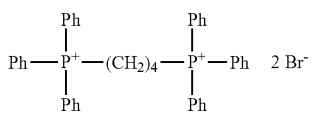 II-36
 II-37
Ph₃P⁺Me  Br⁻
 II-38
Ph₄P⁺Me  Br⁻
In addition, quaternary ammonium salts of the following (1) to (60) are also preferable.
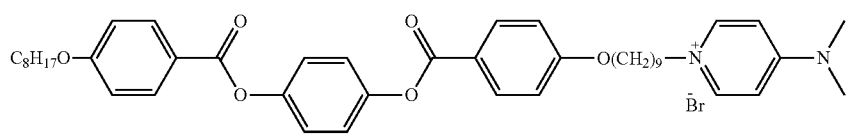
(1)
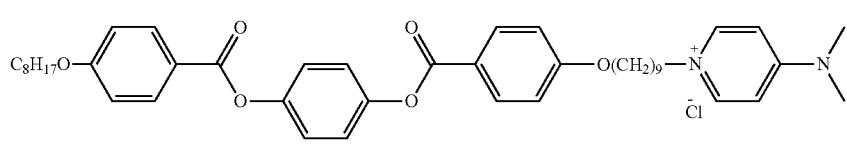
(2)
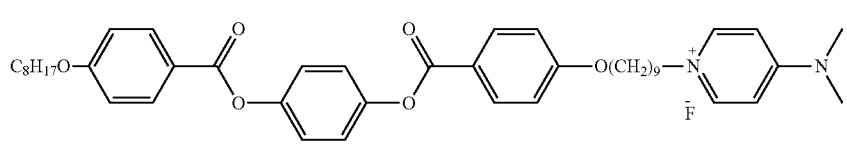
(3)
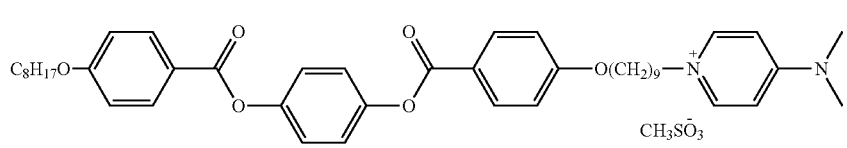
(4)
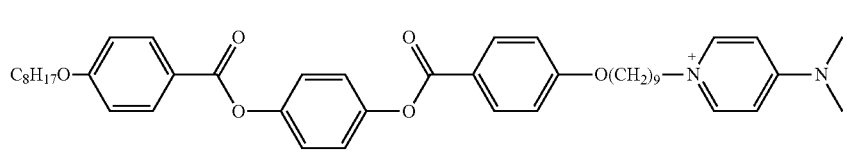
(5)
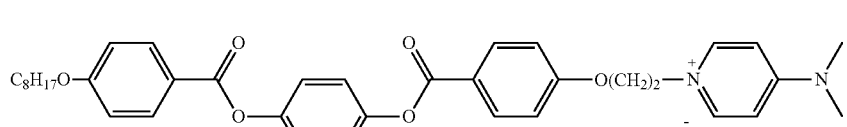
(6)
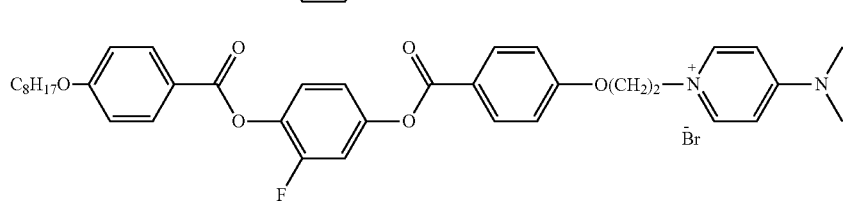
(7)

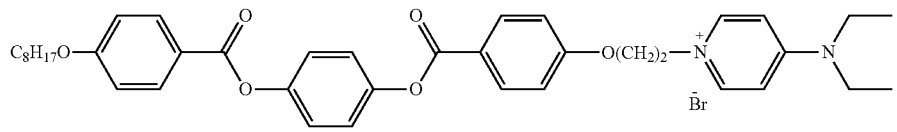
(8)
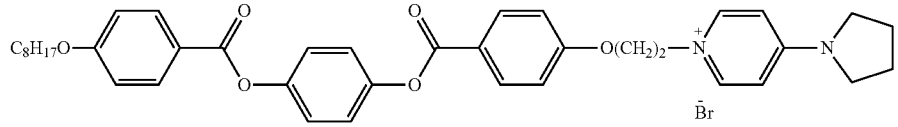
(9)
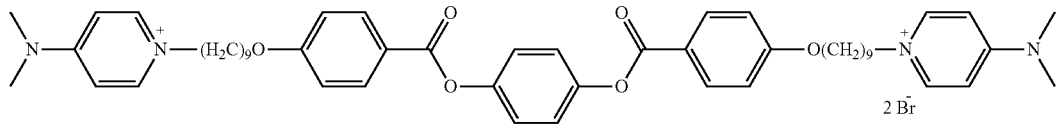
(10)
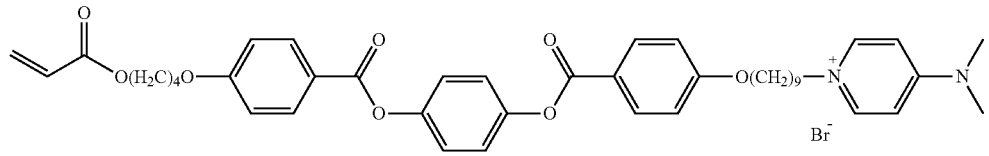
(11)
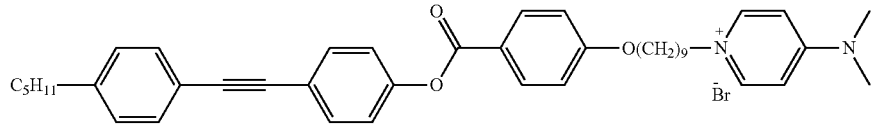
(12)
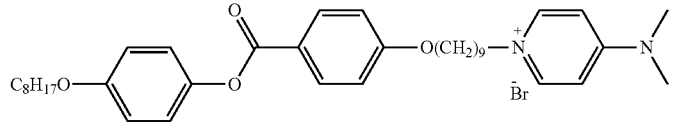
(13)
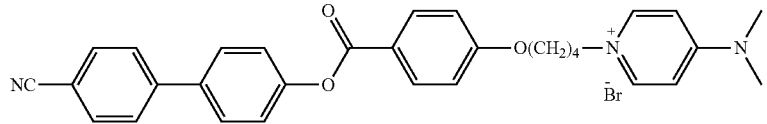
(14)
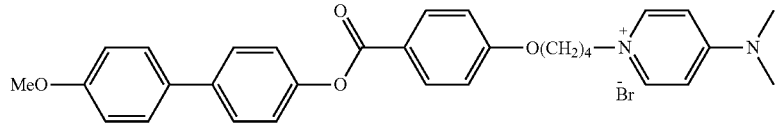
(15)
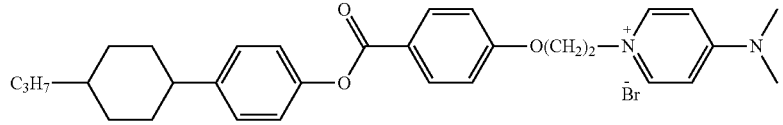
(16)
(17)    (18)
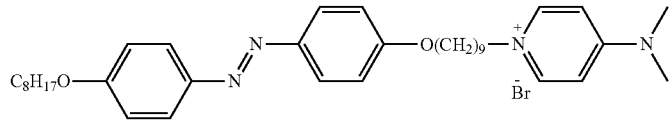
(19)

-continued
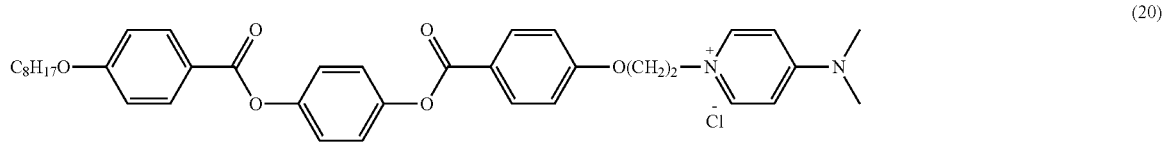
(20)
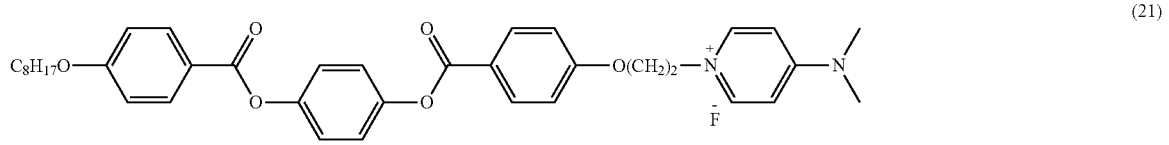
(21)
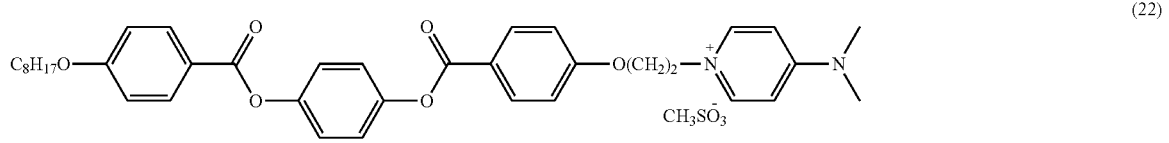
(22)
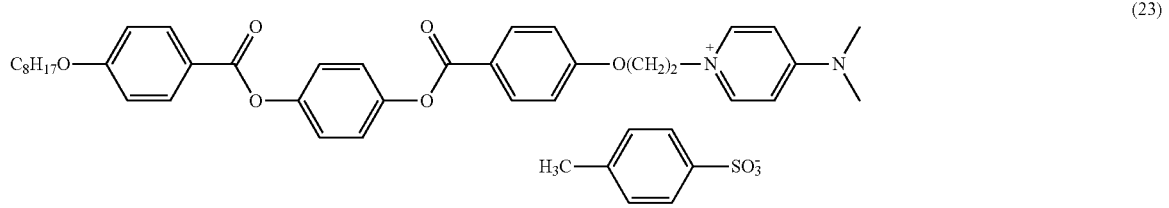
(23)
(24)
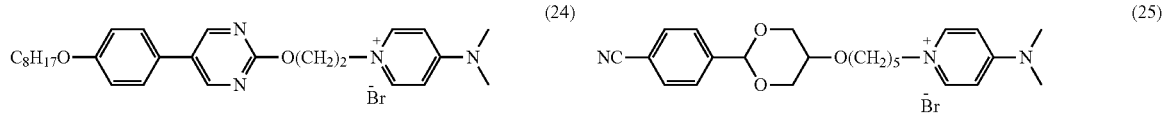
(25)
(26)
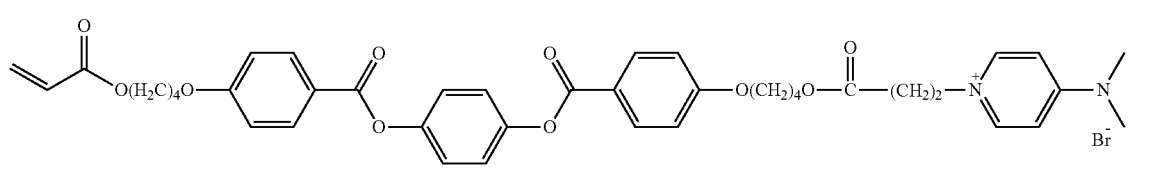
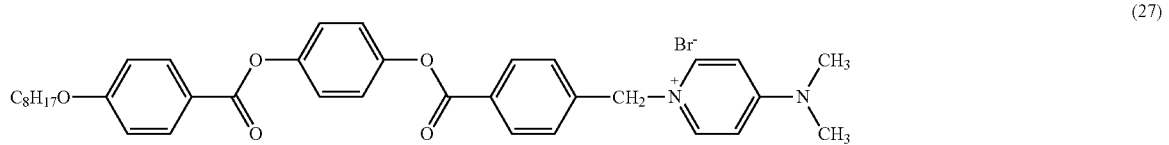
(27)
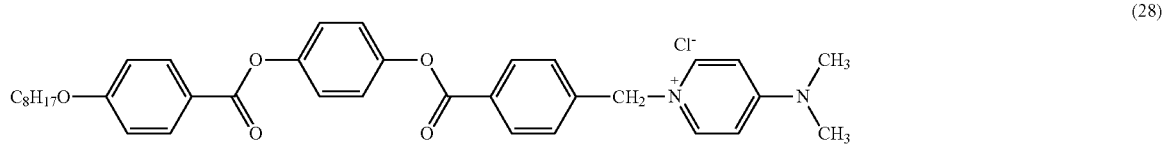
(28)
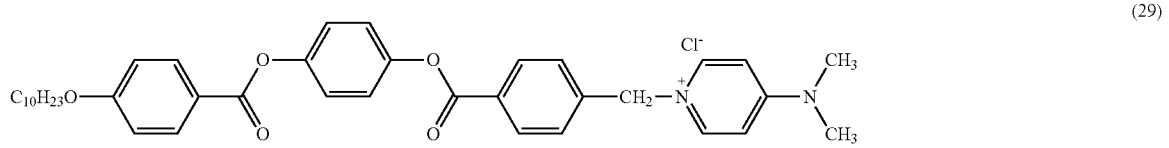
(29)
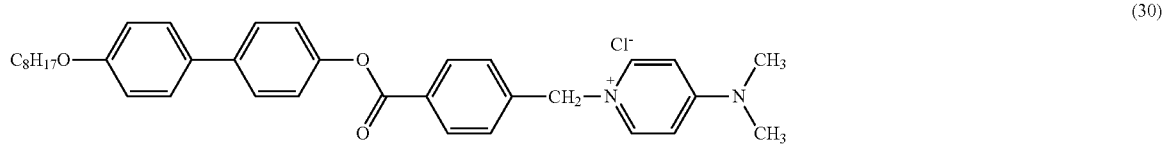
(30)

-continued
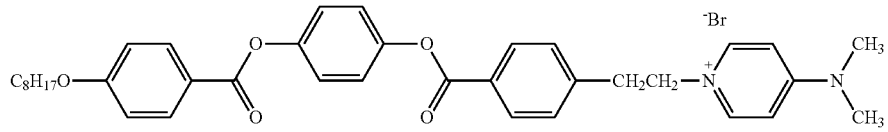
(31)
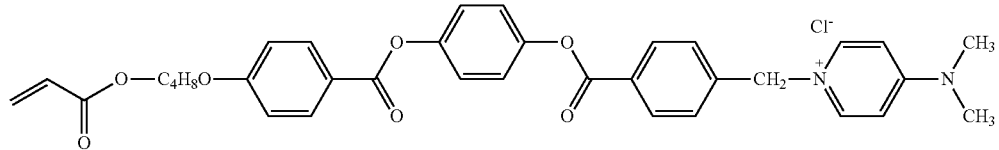
(32)
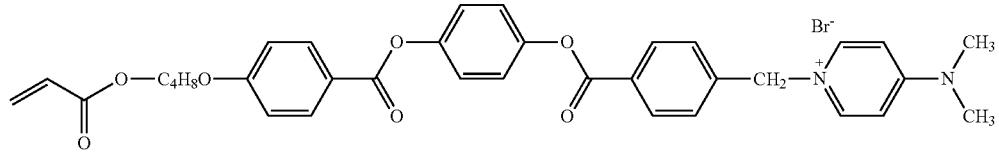
(33)
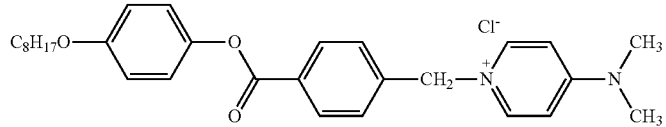
(34)
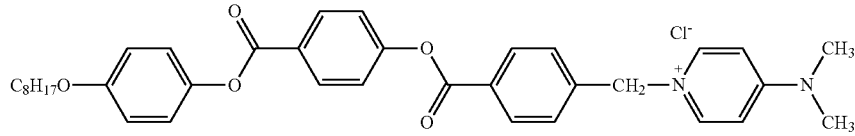
(35)
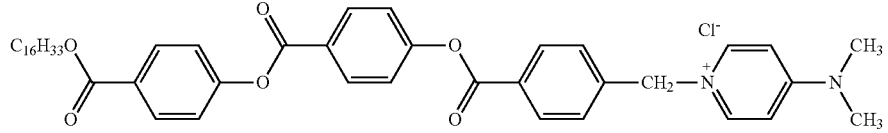
(36)
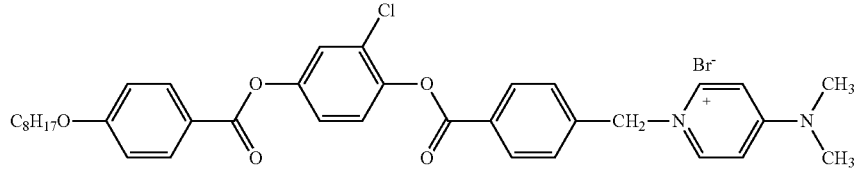
(37)
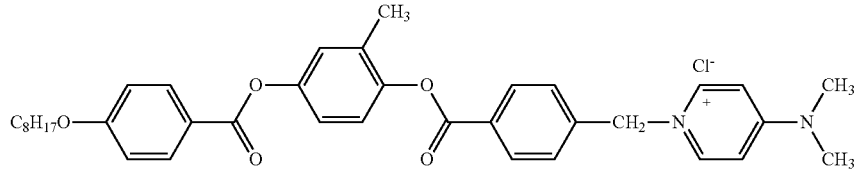
(38)
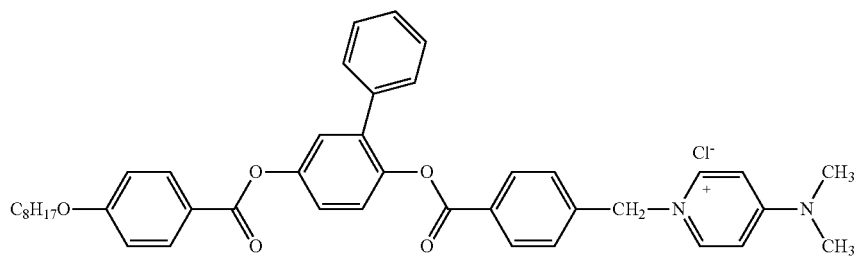
(39)

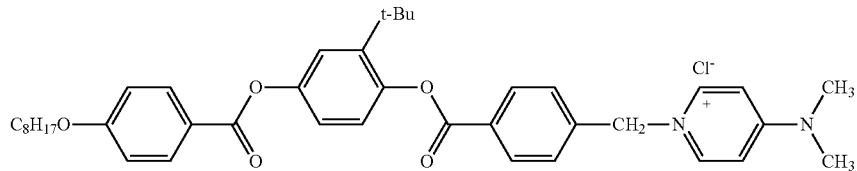
(40)
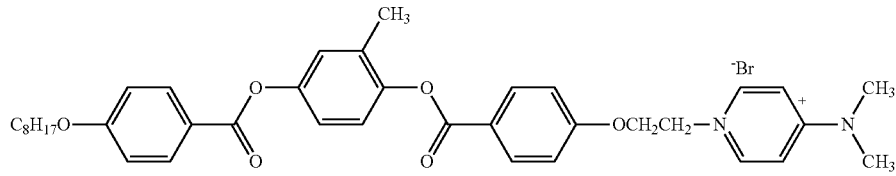
(41)
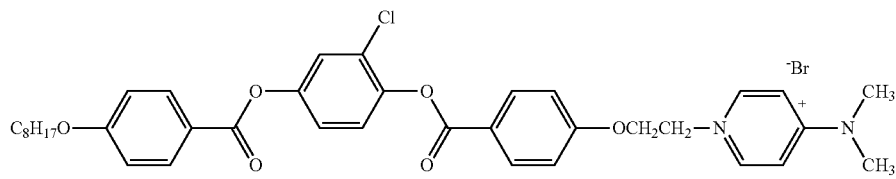
(42)
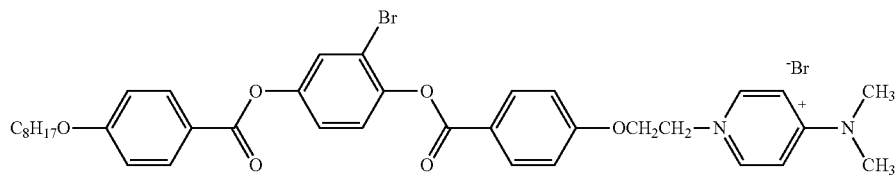
(43)
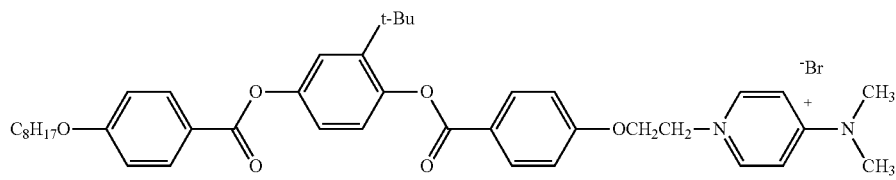
(44)
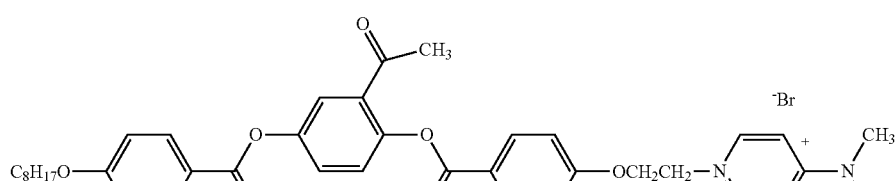
(45)
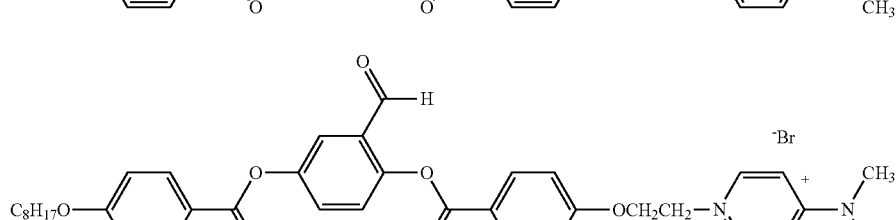
(46)
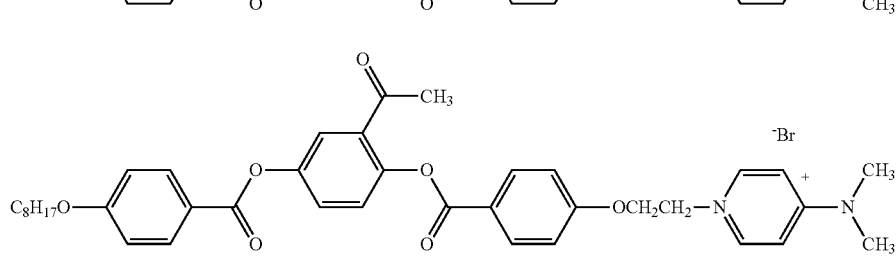
(47)

-continued
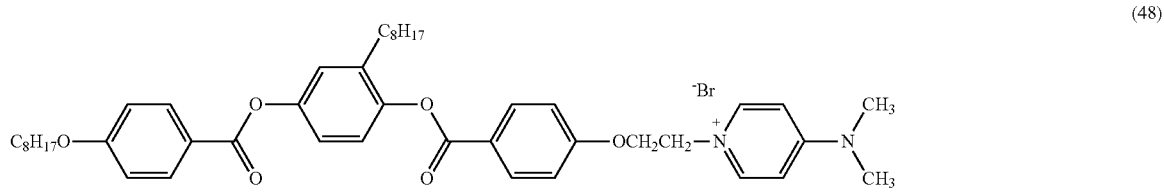
(48)
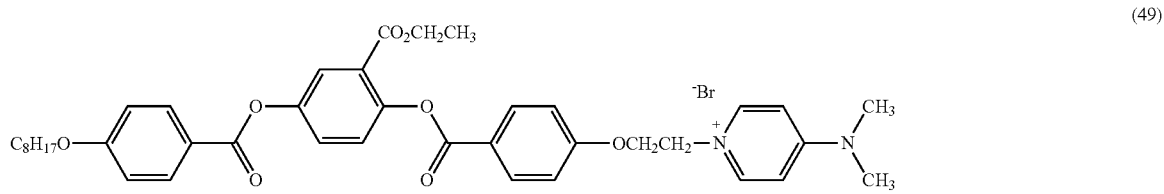
(49)
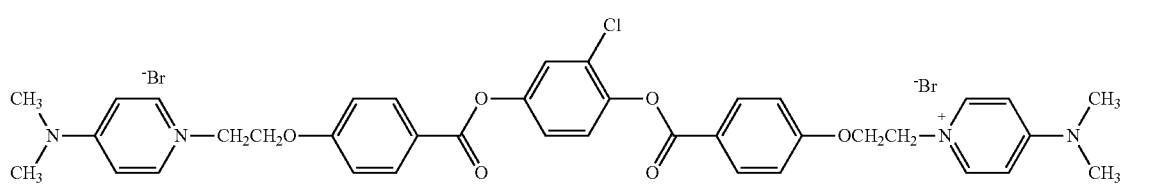
(50)
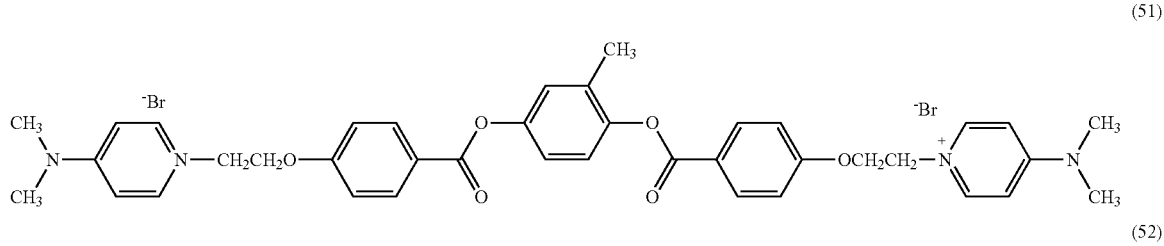
(51)
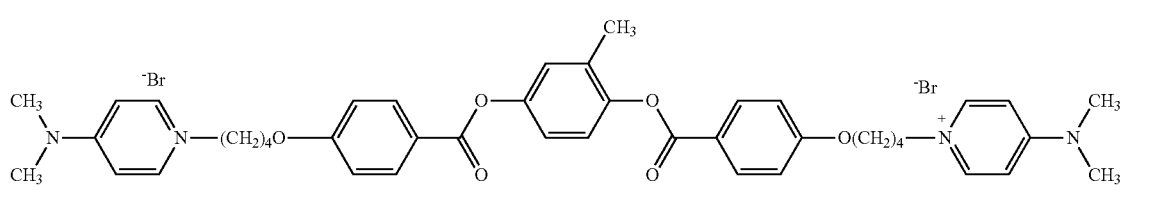
(52)
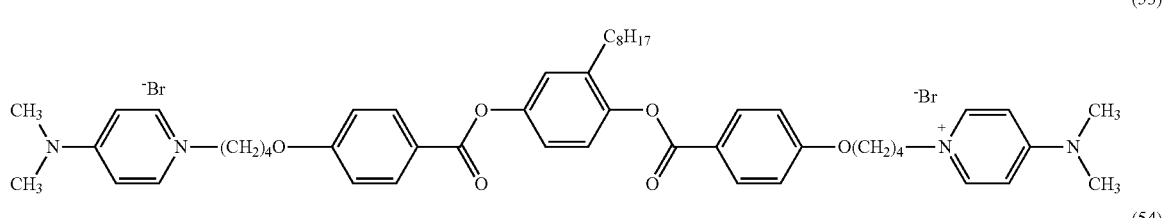
(53)
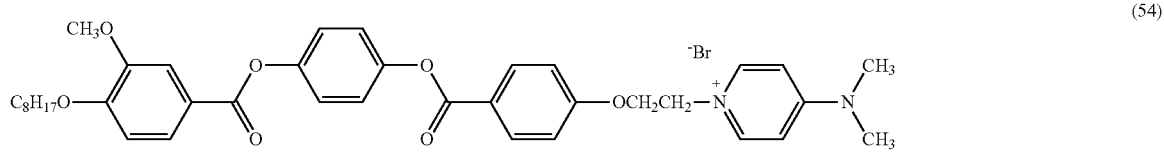
(54)
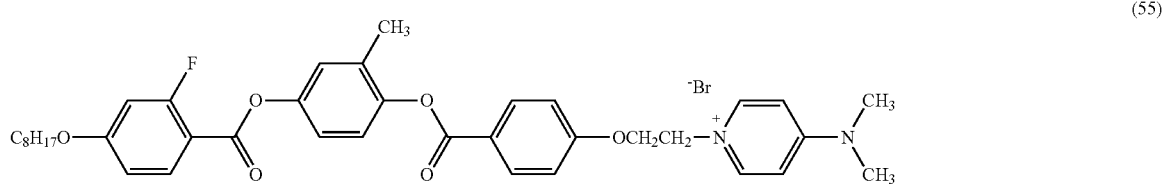
(55)

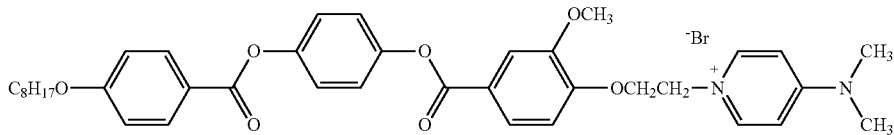
(56)

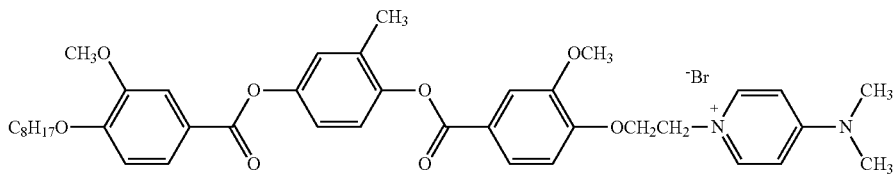
(57)

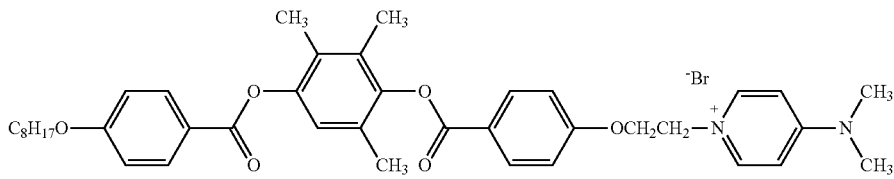
(58)

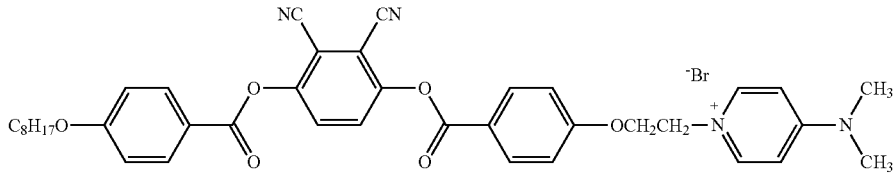
(59)

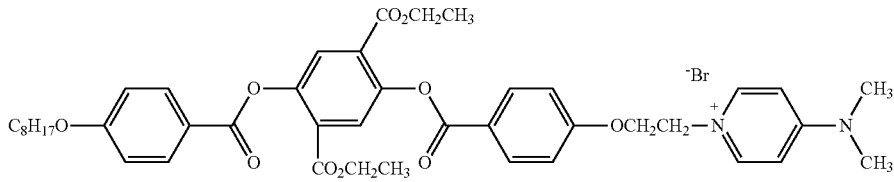
(60)

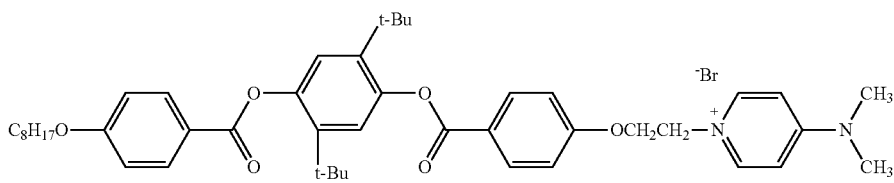
(61)

The pyridinium derivative is obtained by alkylation (Menschutkin reaction) of a pyridine ring.

The preferable content of the onium salt in the composition according to the embodiment of the present invention varies depending on the kind thereof, and typically is preferably 0.01% to 10 mass %, more preferably 0.05% to 7 mass %, and still more preferably 0.05% to 5 mass % with respect to the content of the rod-shaped liquid crystal compound used in combination. Two or more onium salts may be used. In this case, it is preferable that the total content of all the onium salts to be used is in the above-described range.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), binaphthyl (chiral agent having a binaphthyl structure), or an isomannide derivative can be used.

In addition, the chiral agent in which back isomerization, dimerization, isomerization, dimerization, or the like occurs due to light irradiation such that the helical twisting power (HTP) decreases can also be preferably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth) acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-amino ethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer (cholesteric liquid crystal layer 16) is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

<<<Formation of Cholesteric Liquid Crystal Layer>>>

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, the above-described liquid crystal composition including the liquid crystal compound and the chiral agent is applied to the alignment film 14 having an alignment pattern corresponding to the above-described liquid crystal alignment pattern in which the direction of the optical axis 40A rotates in at least one in-plane direction.

For the application of the liquid crystal composition, a printing method such as ink jet or scroll printing or a well-known method such as spin coating, bar coating, or spray coating capable of uniformly applying liquid to a sheet-shaped material can be used.

Here, it is preferable that the single period Λ of the liquid crystal alignment pattern is 1.6 μm or less. Therefore, it is preferable that the alignment film 14 also has the alignment film corresponding to the liquid crystal alignment pattern.

The thickness of the coating film of the liquid crystal composition is not particularly limited and may be appropriately set depending on the thickness of the formed cholesteric liquid crystal layer 16.

Here, in the forming method according to the embodiment of the present invention, a cholesteric liquid crystal layer having a large thickness can be formed by performing the application once. In consideration of this point, it is preferable that the thickness dc of the coating film of the liquid crystal composition exceeds half of the single period Λ of the liquid crystal alignment pattern. That is, it is preferable that the thickness dc of the coating film of the liquid crystal composition satisfies "dc>Λ/2".

After the coating film of the liquid crystal composition is formed, a heating step of heating the liquid crystal composition is performed. Through the heating treatment, the liquid crystal compound 40 is aligned as described above.

The heating treatment is performed at a temperature T1 in a temperature range of a crystal-nematic phase transition temperature (Cr—Ne phase transition temperature) to a nematic-isotropic phase transition temperature (Ne-Iso phase transition temperature) of the liquid crystal compound 40.

In a case where the heating treatment temperature is lower than the Cr—Ne phase transition temperature, there is a problem in that, for example, the liquid crystal compound 40 cannot be appropriately aligned.

In a case where the heating treatment temperature is higher than the Ne-Iso phase transition temperature, there is a problem such as an increase in alignment defects or a decrease in diffraction efficiency.

The heating treatment time is not particularly limited and is preferably 10 to 600 seconds, more preferably 15 to 300 seconds, and still more preferably 30 to 200 seconds.

In order to stably tilt the liquid crystal compound 40 with respect to the main surface in the upper region, that is, in the region spaced from the alignment film 14, it is preferable that one helical pitch, that is, the pitch P is small in a state where the heating treatment ends.

Specifically, with respect to the single period Λ of the liquid crystal alignment pattern, it is preferable that the pitch P satisfies "P/Λ≤1.5" and it is more preferable that the pitch P satisfies "P/Λ≤1.2".

By performing an exposure step of exposing the liquid crystal composition after the end of the heating step, the liquid crystal composition is cured to form the cholesteric liquid crystal layer 16.

Here, in the forming method according to the embodiment of the present invention, in the exposure step, the liquid crystal composition is exposed while maintaining the temperature of the liquid crystal composition at a temperature of "T1−20° C." or higher. As a result, the cholesteric liquid crystal layer 16 according to the embodiment of the present invention having the above-described liquid crystal alignment pattern in which the liquid crystal compound 40 is tilted with respect to the main surface can be formed.

In a case where the temperature of the liquid crystal composition during exposure is lower than "T1−20° C.", there is a problem in that, for example, the cholesteric liquid crystal layer 16 in which the liquid crystal compound 40 is tilted with respect to the main surface cannot be stably formed or the alignment defects increase.

It is preferable that the temperature of the liquid crystal composition during exposure is the Ne-Iso phase transition temperature or lower.

In the exposure step, the exposure may be performed once. However, it is preferable that a first exposure step is performed after the heating treatment, and subsequently a second exposure step of emitting light having a wavelength different from that of the first exposure step is performed.

By performing the two-step exposure using the chiral agent in which the HTP decreases due to light irradiation, one helical pitch (pitch P) is extended in the first exposure step, and the liquid crystal composition is cured in the second exposure step. As a result, the cholesteric liquid crystal layer 16 having one helical pitch exceeding "P/Λ≤1.5" can be formed, and even in the cholesteric liquid crystal layer 16 having one helical pitch exceeding "P/Λ≤1.5", the liquid crystal compound 40 can be stably tilted with respect to the main surface in the upper region, that is, in the region spaced from the alignment film 14.

By performing the exposure step twice, the cholesteric liquid crystal layer 16 can be controlled to have a configuration where, in a cross-section observed with a SEM, a region where the formation period of the bright portions and the dark portions, that is, the pitch P varies depending on positions in the thickness direction is provided (refer to FIG. 3).

In addition, by performing the exposure step twice, the cholesteric liquid crystal layer 16 can be controlled to have a configuration where, in a cross-section observed with a SEM, a region where the tilt angle θ1 varies depending on positions in the thickness direction is provided. The tilt angle θ1 refers to an angle of the bright portions and the dark portions with respect to the main surface of the cholesteric liquid crystal layer 16 as shown in FIG. 3.

It is preferable that the cholesteric liquid crystal layer 16 has a region where the tilt angle θ1 continuously increases in one direction of the thickness direction. In the example shown in the drawing, it is preferable that the cholesteric liquid crystal layer 16 has a region where the tilt angle θ1 continuously increases from the alignment film 14 side to the side (air side interface A) away from the alignment film 14.

It is more preferable that the cholesteric liquid crystal layer 16 has a region where the tilt angle θ1 continuously increases in one direction of the thickness direction and a region where the tilt angle θ1 continuously decreases in the one thickness direction. In the example shown in the drawing, it is more preferable that the cholesteric liquid crystal layer 16 has a region where the tilt angle θ1 continuously increases from the alignment film 14 side to the side away from the alignment film 14 and a region where the tilt angle θ1 continuously decreases from the alignment film 14 side to the side away from the alignment film 14. In particular, it is preferable that the cholesteric liquid crystal layer 16 has a region that is closest to the alignment film 14 side in the thickness direction and where the increase of the tilt angle θ1 is the smallest, an intermediate region where the increase of the tilt angle θ1 is large, and a region that is the farthest from the alignment film 14 and where the tilt angle θ1 continuously decreases with respect to the intermediate region.

In the cholesteric liquid crystal layer 16 having the structure in which the pitch P and/or the tilt angle θ continuously changes in the thickness direction, the performance in which the incidence angle dependence of the transmittance is wide can be obtained. An angle range where the transmittance decreases corresponds to an angle range where incidence light is diffracted. Accordingly, by using the diffraction element in which the incidence angle dependence of the transmittance is wide, for example, for an element for incidence or emission of a light guide plate of AR glasses, AR glasses having a wide field of view can be obtained.

A difference between the maximum value and the longest value of the tilt angle θ1 is not particularly limited and is preferably 10° or more.

The light used for the exposure is not particularly limited, and it is preferable to use ultraviolet light. The wavelength of irradiated ultraviolet light is preferably 250 to 430 nm.

The total irradiation energy is preferably 2 mJ/cm$^2$ to 50 J/cm$^2$ and more preferably 5 to 1500 mJ/cm$^2$. In order to promote a photopolymerization reaction, the exposure may be performed under heating conditions or in a nitrogen atmosphere.

In a method of forming a cholesteric liquid crystal layer in the related art, with a single formation process, the cholesteric liquid crystal layer having the liquid crystal alignment pattern in which the direction of the optical axis 40A rotates in at least one in-plane direction cannot be formed with a sufficient thickness.

Therefore, in the related art, in a case where the cholesteric liquid crystal layer having the liquid crystal alignment pattern is formed, so-called multiple coating of repeating the formation of the cholesteric liquid crystal layer multiple times is performed. As a result, in a cross-section of the cholesteric liquid crystal layer observed with a SEM, a boundary line caused by multiple coating may also be observed.

On the other hand, in the forming method according to the embodiment of the present invention, the cholesteric liquid crystal layer 16 can be formed with a sufficient thickness by applying the liquid crystal composition once, having the liquid crystal alignment pattern in which the direction of the optical axis 40A rotates in at least one in-plane direction and having the configuration in which the liquid crystal compound is tilted with respect to the main surface and the tilt direction substantially matches the bright lines B and the dark lines D.

Accordingly, in this case, in a cross-section of the cholesteric liquid crystal layer 16 observed with a SEM, a boundary line caused by multiple coating is not observed.

The thickness of the cholesteric liquid crystal layer 16 formed using the forming method according to the embodiment of the present invention is not particularly limited and may be appropriately set depending on the selective reflection center wavelength of the cholesteric liquid crystal layer 16, the reflectivity (diffraction efficiency) required for the cholesteric liquid crystal layer 16, and the like.

The thickness of the cholesteric liquid crystal layer 16 formed using the forming method according to the embodiment of the present invention is preferably 1.0 µm or more and more preferably 2.0 µm or more. The upper limit of the thickness of the cholesteric liquid crystal layer 16 formed using the forming method according to the embodiment of the present invention is about 20 µm.

The forming method according to the embodiment of the present invention is suitably applicable to the formation of the cholesteric liquid crystal layer using the multiple coating of repeating the formation of the cholesteric liquid crystal layer.

Here, it is preferable that the cholesteric liquid crystal layer is formed of a single birefringent layer. That is, in the cholesteric liquid crystal layer, the period Λ in the one in-plane direction and the helical pitch P have a uniform period.

The above-described liquid crystal diffraction element 10 includes only one cholesteric liquid crystal layer 16 according to the embodiment of the present invention, but the present invention is not limited thereto. That is, the liquid crystal diffraction element including the cholesteric liquid crystal layer according to the embodiment of the present invention may include two or more cholesteric liquid crystal layers. That is, the liquid crystal diffraction element may be a laminate including a plurality of cholesteric liquid crystal layers.

In a case where the liquid crystal diffraction element is a laminate including a plurality of cholesteric liquid crystal layers, a configuration can be adopted in which, in the cross-sections of the plurality of cholesteric liquid crystal layers observed with a scanning electron microscope, the formation periods of bright portions and dark portions are different from each other. That is, the liquid crystal diffraction element may have a configuration in which the plurality of cholesteric liquid crystal layers selectively reflect light components having different wavelengths, respectively.

For example, the liquid crystal diffraction element including the cholesteric liquid crystal layer according to the embodiment of the present invention may include two cholesteric liquid crystal layers including a cholesteric liquid crystal layer that selectively reflects red light and a cholesteric liquid crystal layer that selectively reflects green light, and may include three cholesteric liquid crystal layers including a cholesteric liquid crystal layer that selectively reflects red light, a cholesteric liquid crystal layer that selectively reflects green light, and a cholesteric liquid crystal layer that selectively reflects blue light.

In a case where the liquid crystal diffraction element is a laminate including a plurality of cholesteric liquid crystal layers, as described below in detail, it is preferable that, in the plurality of cholesteric liquid crystal layers, the single periods Λ as lengths over which the direction of the optical axis in the liquid crystal alignment pattern rotates by 180° in the one in-plane direction are different from each other. In addition, it is preferable that, in the plurality of cholesteric liquid crystal layers, the formation periods of the bright portions and the dark portions in the cross-sections of the cholesteric liquid crystal layers are different from each other, the single periods of the liquid crystal alignment patterns in the one in-plane direction are different from each other, and a permutation of lengths of the formation periods in the cross-sections and a permutation of lengths of the single periods in the one in-plane direction match each other.

In a case where the liquid crystal diffraction element including the cholesteric liquid crystal layer according to the embodiment of the present invention includes a plurality of cholesteric liquid crystal layers, it is preferable that all the cholesteric liquid crystal layers are the cholesteric liquid crystal layers 16 according to the embodiment of the present invention, and a typical cholesteric liquid crystal layer other than the cholesteric liquid crystal layer 16 according to the embodiment of the present invention having only the liquid crystal alignment pattern may be included.

By using the cholesteric liquid crystal layer according to the embodiment of the present invention or the laminate including a plurality of cholesteric liquid crystal layers according to the embodiment of the present invention as an optical element, the optical element can be used for various uses where light is reflected at an angle other than the angle of specular reflection, for example, an optical path changing member, a light collecting element, a light diffusing element to a predetermined direction, a diffraction element, or the like in an optical device.

Figure 9:
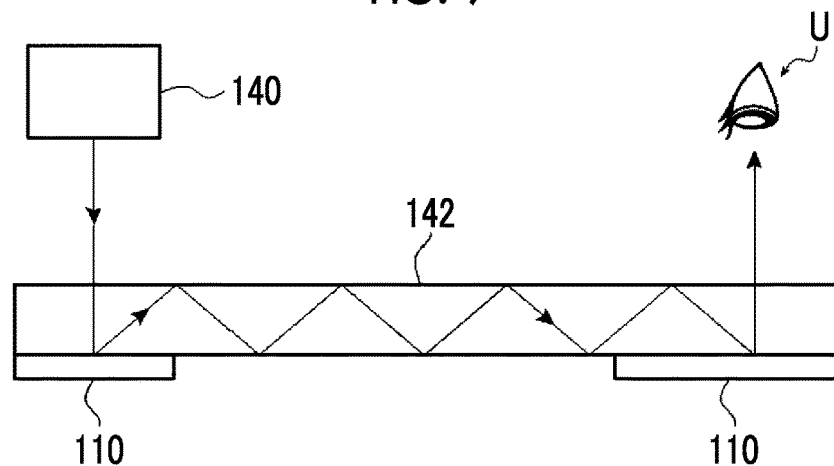
FIG. 9 is a diagram conceptually showing an example of AR glasses including the cholesteric liquid crystal layer according to the present invention.

In a preferable example, as conceptually shown in FIG. 9, optical elements 110 including the cholesteric liquid crystal layer according to the embodiment of the present invention are provided on a light guide plate 142 to be spaced from each other to configure a light guide element. In this light guide element, the optical element 110 including the cholesteric liquid crystal layer according to the embodiment of the present invention is used as an incidence diffraction element that guides light (projection image) emitted from a display 140 to the light guide plate 142 in the above-described AR glasses at a sufficient angle for total reflection and as an emission diffraction element that emits the light propagated in the light guide plate 142 from the light guide plate 142 to an observation position by a user U in the AR glasses. That is, in the optical element 110, the cholesteric liquid crystal layers are provided on the light guide plate to function as the incidence diffraction element and the emission diffraction element, respectively.

Here, in AR glasses shown in FIG. 9, in a case where the display 140 emits three color light components including red light, green light, and blue light, an optical element 100 includes three cholesteric liquid crystal layers according to the embodiment of the present invention corresponding to the respective colors. In other words, the optical element 100 includes a laminate including three cholesteric liquid crystal layers.

In this case, it is preferable that the single period $\Lambda$ of the liquid crystal alignment pattern of the cholesteric liquid crystal layer changes depending on the corresponding color. For example, in a case where a first cholesteric liquid crystal layer, a second cholesteric liquid crystal layer, and a third cholesteric liquid crystal layer are provided, in a case where the single period of the liquid crystal alignment pattern of the first cholesteric liquid crystal layer in the one in-plane direction is represented by $\Lambda 1$, the single period of the liquid crystal alignment pattern of the second cholesteric liquid crystal layer in the one in-plane direction is represented by $\Lambda 2$, and the single period of the liquid crystal alignment pattern of the third cholesteric liquid crystal layer in the one in-plane direction is represented by $\Lambda 3$, it is preferable that $\Lambda 1 < \Lambda 2 < \Lambda 3$ is satisfied.

In this case, in a case where a formation period of the bright portions and the dark portions in the cross-section of the first cholesteric liquid crystal layer is represented by P1, a formation period of the bright portions and the dark portions in the cross-section of the second cholesteric liquid crystal layer is represented by P2, and a formation period of the bright portions and the dark portions in the cross-section of the third cholesteric liquid crystal layer is represented by P3, it is preferable that $P1 < P2 < P3$ is satisfied.

In a case where light is diffracted using the optical element 110 (diffraction element) including three cholesteric liquid crystal layers having the same single period $\Lambda$ of the liquid crystal alignment pattern, the diffraction angles of light components having wavelengths of red light, green light, and blue light are different from each other, and a common field of view range of red light, green light, and blue light is narrowed. Therefore, in order to observe a three color image of blue light, green light, and red light as an appropriate color image in a wide field of view range, it is preferable to change the single periods $\Lambda$ of the liquid crystal alignment pattern in each of the cholesteric liquid crystal layers depending on the each of red light, green light, and blue light such that the red light, the green light, and the blue light are diffracted at substantially the same angle.

As described above, by using the cholesteric liquid crystal layer according to the embodiment of the present invention in which the single period $\Lambda$ of the liquid crystal alignment pattern changes, the optical element 110 (diffraction element) can reduce the wavelength dependence of the reflection diffraction angle. Therefore, red light, green light, and blue light emitted from the display 140 can be reflected in the same direction. Therefore, with one light guide plate 142, even in a case where red image, green image, and blue image are propagated, a full color image having a wide field of view can be emitted from the light guide plate to the observation position by the user U in the AR glasses. Accordingly, in the light guide element including the optical element 110 including the cholesteric liquid crystal layer according to the embodiment of the present invention, the light guide plate of the AR glasses can be made thin and light as a whole, and the configuration of the AR glasses can be simplified.

In addition, a light guide element including the optical element 110 including the cholesteric liquid crystal layer according to the embodiment of the present invention can also be suitably used for a head-up display mounted on an automobile or the like. In particular, by using the light guide element for a part of an imager of the head-up display, a space-saving imager that is thin as a whole can be provided.

As the wavelength of incidence light increases, the angle of reflected light from the above-described cholesteric liquid crystal layer with respect to the incidence light increases. For example, in a case where a plurality of cholesteric liquid crystal layers that reflect red light, green light, and blue light, respectively, are provided, a permutation of lengths of the formation periods of the bright portions and the dark portions in the cross-sections and a permutation of lengths of the single periods in the one in-plane direction match each other. That is, the length of the single period of the cholesteric liquid crystal layer that reflects red light is the longest, and the length of the single period of the cholesteric liquid crystal layer that reflects blue light is the shortest.

This way, in a case where a plurality of cholesteric liquid crystal layers are provided, a permutation of lengths of the formation periods of the bright portions and the dark portions and a permutation of lengths of the single periods in the one in-plane direction match each other such that light components having different wavelengths can be reflected in substantially the same direction.

The light guide element including the optical element 110 including the cholesteric liquid crystal layer according to the embodiment of the present invention is not limited to the configuration in which two optical elements 110 spaced from each other are provided on the light guide plate 142 as shown in FIG. 9.

For example, the light guide element may have a configuration in which only one optical element 110 is provided on the light guide plate for incidence or emission of light into or from the light guide plate 142. Alternatively, the light guide element may have a configuration in which three optical elements 110 are provided on the light guide plate 142 in order to widen the viewing zone (exit pupil expansion). That is, in the light guide element, the cholesteric liquid crystal layers may be disposed on the light guide plate to function as the incidence diffraction element, an intermediate diffraction element, the emission diffraction element, respectively. The intermediate diffraction element is provided for exit pupil expansion, and diffracts light that is diffracted by the incidence diffraction element guided into the light guide plate such that the traveling direction of the light is directed to the emission diffraction element.

In the above-described example, the optical element including the cholesteric liquid crystal layer according to the embodiment of the present invention is used as the optical element that includes the three cholesteric liquid crystal layers and reflects three light components including red light, green light, and blue light. However, the optical element including the cholesteric liquid crystal layer according to the embodiment of the present invention is not limited thereto, and various configurations can be used.

For example, the optical element including the cholesteric liquid crystal layer according to the embodiment of the present invention may also be configured to include three cholesteric liquid crystal layers having different selective reflection center wavelengths and to reflect not only light of one color or two or more colors selected from visible light such as red light, green light, or blue light but also infrared light and/or ultraviolet light or to reflect only light other than visible light.

Alternatively, the optical element including the cholesteric liquid crystal layer according to the embodiment of the present invention may also be configured to include four, five, or six cholesteric liquid crystal layers according to the embodiment of the present invention having different selective reflection center wavelengths and to reflect not only red light, green light, and blue light but also infrared light and/or ultraviolet light or to reflect only light other than visible light.

Alternatively, a configuration can also be used in which two or more light guide plates including the optical element including the cholesteric liquid crystal layer according to the embodiment of the present invention are combined.

Figure 10:
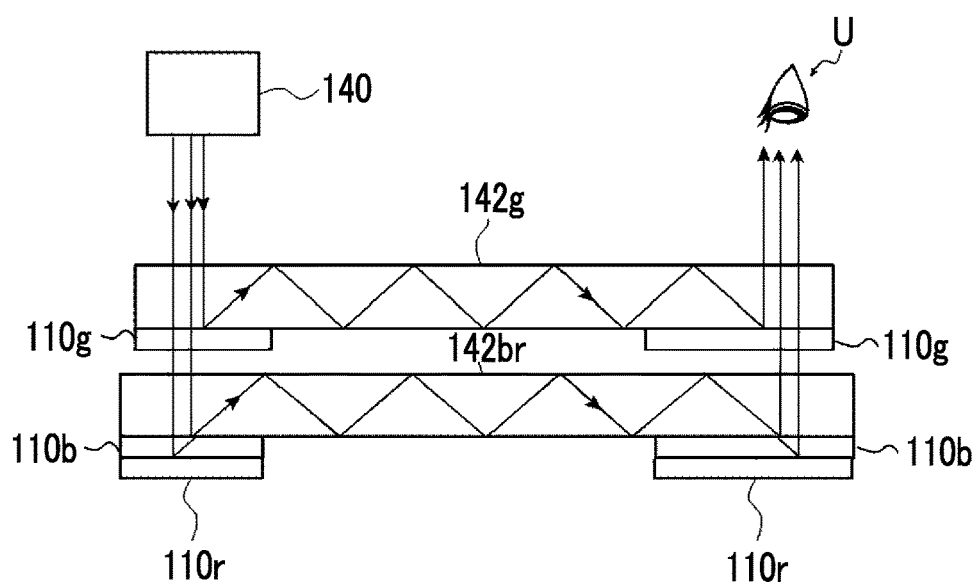
FIG. 10 is a diagram conceptually showing another example of the AR glasses including the cholesteric liquid crystal layer according to the present invention.

For example, as conceptually shown in FIG. 10, AR glasses having a configuration in which two light guide plates including a light guide plate 142g and a light guide plate 142br are provided can be used. In this configuration, for example, optical elements 110g that reflects green light is provided on the light guide plate 142g to be spaced from each other, and a laminate including optical elements 110b that reflects blue light and optical elements 110r that reflects red light is provided on the light guide plate 142br to be spaced from each other. As the optical element 110g, the cholesteric liquid crystal layer according to the embodiment of the present invention that selectively reflects green light is used. As the optical element 110b, the cholesteric liquid crystal layer according to the embodiment of the present invention that selectively reflects blue light is used. Further, as the optical element 110r, the cholesteric liquid crystal layer according to the embodiment of the present invention that selectively reflects red light is used.

The light guide element including the two light guide plates may also be configured to reflect not only light of one color selected from visible light such as red light, green light, or blue light but also infrared light and/or ultraviolet light or to reflect only light other than visible light.

Alternatively, the light guide element may include three light guide plates including a light guide plate for a red image, a light guide plate for a green image, and a light guide plate for a blue image.

The light guide element including the two light guide plates includes: a first light guide plate and a second light guide plate; a first light guide element including a first cholesteric liquid crystal layer and a third cholesteric liquid crystal layer that are provided on the first light guide plate; and a second cholesteric liquid crystal layer that is provided on the second light guide plate, in which in a case where the single period of the liquid crystal alignment pattern of the first cholesteric liquid crystal layer in the one in-plane direction is represented by Λ1, the single period of the liquid crystal alignment pattern of the second cholesteric liquid crystal layer in the one in-plane direction is represented by Λ2, and the single period of the liquid crystal alignment pattern of the third cholesteric liquid crystal layer in the one in-plane direction is represented by Λ3, it is preferable that Λ1<Λ2<Λ3 is satisfied.

In this case, in a case where a formation period of the bright portions and the dark portions in the cross-section of the first cholesteric liquid crystal layer is represented by P1, a formation period of the bright portions and the dark portions in the cross-section of the second cholesteric liquid crystal layer is represented by P2, and a formation period of the bright portions and the dark portions in the cross-section of the third cholesteric liquid crystal layer is represented by P3, it is preferable that P1<P2<P3 is satisfied.

For example, the first light guide element includes the first cholesteric liquid crystal layer that reflects blue light and the third cholesteric liquid crystal layer that reflects red light, the second light guide element includes the second cholesteric liquid crystal layer that reflects green light, and the single periods of the liquid crystal alignment patterns of the respective cholesteric liquid crystal layers in the one in-plane direction satisfy Λ1<Λ2<Λ3. As a result, blue light, green light, and red light can be reflected substantially in the same direction.

Alternatively, the optical element including the cholesteric liquid crystal layer according to the embodiment of the present invention may be configured to include one or two cholesteric liquid crystal layers according to the embodiment of the present invention and to reflect light of one color or two colors selected from red light, green light, and blue light.

An image display device according to the embodiment of the present invention includes: the above-described light guide element; and a display element that emits an image to the cholesteric liquid crystal layer (incidence diffraction element) of the light guide element (refer to FIGS. 9 and 10).

As described above, the cholesteric liquid crystal layer in the light guide element reflects circularly polarized light, and thus it is preferable that the image display element emits circularly polarized light.

In addition, in the example shown in FIGS. 9 and 10, the light guide element includes the diffraction element on each of the incidence side and the emission side. However, the present invention is not limited thereto, and an intermediate diffraction element may be provided between the diffraction element on the incidence side and the diffraction element on the emission side.

Figure 11:
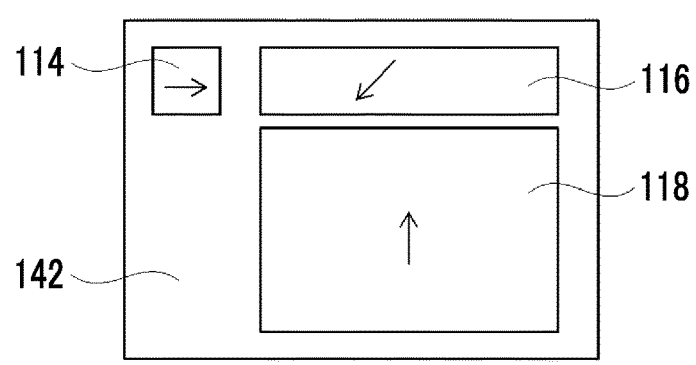
FIG. 11 is a diagram conceptually showing still another example of the AR glasses including the cholesteric liquid crystal layer according to the present invention.
Figure 12:
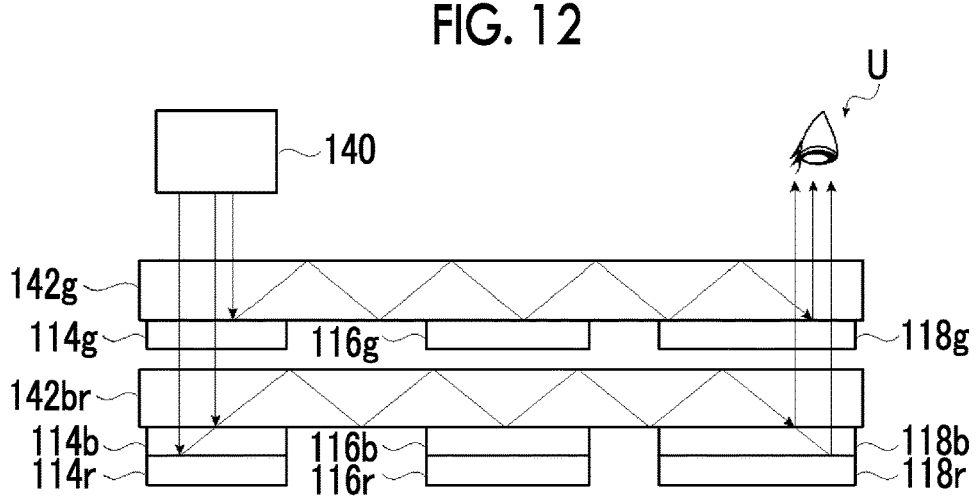
FIG. 12 is a diagram conceptually showing still another example of the AR glasses including the cholesteric liquid crystal layer according to the present invention.

FIG. 11 is a front view conceptually showing another example of the light guide element according to the embodiment of the present invention. FIG. 12 is a diagram conceptually showing one aspect of the light guide element shown in FIG. 11.

The light guide element shown in FIG. 11 includes a light guide plate 112, a first diffraction element 114, a second diffraction element 116, and a third diffraction element 118. In the light guide element shown in FIG. 11, as at least one of the first diffraction element 114, the second diffraction element 116, or the third diffraction element 118, the cholesteric liquid crystal layer or the laminate according to the embodiment of the present invention is used. In the example shown in the drawing, in a preferable aspect, the cholesteric liquid crystal layer according to the embodiment of the present invention or the laminate according to the embodiment of the present invention is used as all the diffraction elements.

In FIG. 11, arrows in the first diffraction element 114, the second diffraction element 116, and the third diffraction element 118 indicate directions of in-plane rotation periods in the cholesteric liquid crystal layers. The direction of the in-plane rotation period refers to the direction in which the direction of the optical axis 40A derived from the liquid crystal compound 40 in the cholesteric liquid crystal layer changes while continuously rotating in at least one in-plane direction.

The first diffraction element 114 diffracts light incident from the outside, for example, light emitted from the display 140 at an angle at which the light can be totally reflected in the light guide plate 112.

The second diffraction element 116 diffracts light that is incident into the light guide plate 112 at a position of the first diffraction element 114 and propagated in the light guide plate 112 such that a light traveling direction in the light guide plate 112 is bent to propagate the light to the third diffraction element 118.

The third diffraction element 118 diffracts light that is diffracted by the second diffraction element 116 and propagated in the light guide plate 112 at an angle where the light can be emitted from the light guide plate 112 to the outside such that the light is emitted to the observation position by the user U.

That is, in the light guide element shown in FIG. 11, light that is diffracted in the first diffraction element 114 for incidence and incident into the light guide plate 112 is diffracted by the intermediate second diffraction element 116 such that a light traveling direction is bent in the light guide plate 112, and then is diffracted by the third diffraction element 118 on the emission side to be emitted to the outside of the light guide plate 112.

With this configuration, exit pupil expansion can be performed in the second diffraction element 116 and/or the third diffraction element 118.

In this case, it is preferable that the optical element including the cholesteric liquid crystal layer according to the embodiment of the present invention or the laminate according to the embodiment of the present invention is used as the second diffraction element 116 and/or the third diffraction element 118 from the viewpoints that, for example, the amount of light to be expanded or an image having a small tint change depending on angles can be displayed.

The configuration including the second diffraction element (the intermediate diffraction element) is not particularly limited as long as an optical element including the cholesteric liquid crystal layer according to the embodiment of the present invention or the laminate according to the embodiment of the present invention is provided as at least one diffraction element, for example, as the first diffraction element 114 as described above, and various well-known diffraction elements in the related art such as a relief type diffraction element or a diffraction element using liquid crystal can be used as other diffraction elements.

In addition, in the configuration including the second diffraction element, as in the light guide element shown in FIG. 10, two light guide plates may be provided as conceptually shown in FIG. 12. In the example shown in FIG. 12, optical elements 114g, 116g, and 118g that selectively reflect (diffract) green light are provided on the light guide plate 142g, and a laminate including an optical element 114b that selectively reflects blue light and an optical element 114r that selectively reflects red light, a laminate including an optical element 116b that selectively reflects blue light and an optical element 116r that selectively reflects red light, a laminate including an optical element 118b that selectively reflects blue light and an optical element 118r that selectively reflects red light are provided on the light guide plate 142br.

In the configuration shown in FIG. 12, the optical element 114g, the optical element 114b, and the optical element 114r correspond to the first diffraction element 114, the optical element 116g, the optical element 116b, and the optical element 116r correspond to the second diffraction element 116, and the optical element 118g, the optical element 118b, and the optical element 118r correspond to the third diffraction element 118.

In addition, the cholesteric liquid crystal layer forming the light guide element according to the embodiment of the present invention can also be configured such that the helical pitch P in which the liquid crystal compound 40 is helically rotated once in the thickness direction increases.

In a case where the light guide element according to the embodiment of the present invention having the above-described configuration is used as an intermediate diffraction element that diffracts light propagated in a light guide plate or as a diffraction element that emits the light from the light guide plate in a light guide element used in a display device such as AR glasses, the diffraction efficiency can be changed to increase in the light propagation direction with respect to a specific wavelength. Therefore, even in a case where exit pupil expansion is performed the brightness (light amount) of light emitted from the light guide plate can be made uniform.

Figure 13:
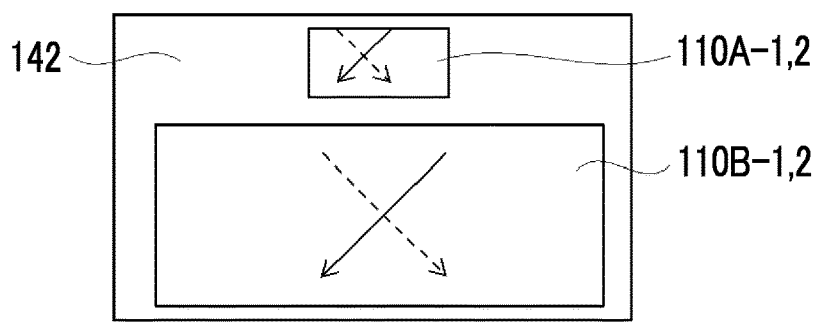
FIG. 13 is a diagram conceptually showing still another example of the AR glasses including the cholesteric liquid crystal layer according to the present invention.
Figure 14:
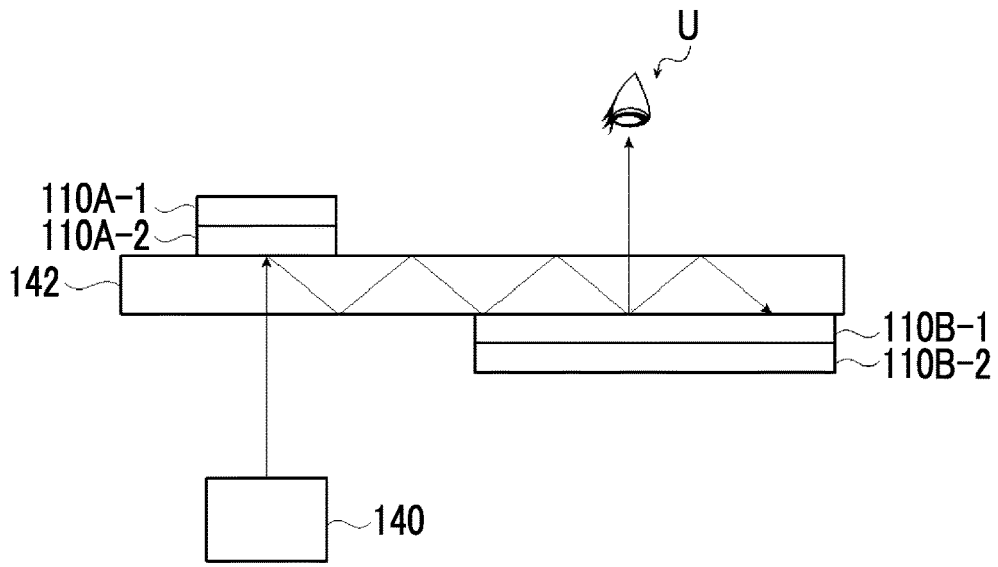
FIG. 14 is a diagram conceptually showing still another example of the AR glasses including the cholesteric liquid crystal layer according to the present invention.

FIG. 13 is a front view conceptually showing still another example of the light guide element according to the embodiment of the present invention. FIG. 14 is a conceptual diagram showing a cross-section of the light guide element shown in FIG. 13.

The light guide element shown in FIGS. 13 and 14 includes: a first diffraction element in which an optical element 110A-1 and an optical element 110A-2 including the cholesteric liquid crystal layer or the laminate according to the embodiment of the present invention are laminated; and a second diffraction element in which an optical element 110B-1 and an optical element 110B-2 including the cholesteric liquid crystal layer or the laminate according to the embodiment of the present invention are laminated.

In the first diffraction element and the second diffraction element, solid line arrows shown in the drawings indicate directions of the in-plane rotation periods in the cholesteric liquid crystal layers forming the optical element 110A-1 and the optical element 110B-1, and broken line arrows shown in the drawings indicate directions of the in-plane rotation periods in the cholesteric liquid crystal layers forming the optical element 110A-2 and the optical element 110B-2.

Here, the directions of the in-plane rotation periods in the cholesteric liquid crystal layers of the optical element 110A-1 and the optical element 110B-1 are parallel to each other, and the directions of the in-plane rotation periods in the cholesteric liquid crystal layers of the optical element 110A-2 and the optical element 110B-2 are parallel to each other.

In addition, the directions of the in-plane rotation periods in the cholesteric liquid crystal layers of the optical element 110A-1 and the optical element 110A-2 are different from each other, and the directions of the in-plane rotation periods in the cholesteric liquid crystal layers of the optical element 110B-1 and the optical element 110B-2 are different from each other. In addition, an angle between the directions of the in-plane rotation periods in the cholesteric liquid crystal layers of the optical element 110A-1 and the optical element 110A-2 is, for example, 90°, and an angle between the directions of the in-plane rotation periods in the cholesteric liquid crystal layers of the optical element 110B-1 and the optical element 110B-2 is, for example, 90°.

In the light guide element shown in FIGS. 13 and 14, light (image) emitted from the display 140 is diffracted and reflected by the optical element 110A-1 and the optical element 110A-2 forming the first diffraction element to be introduced into the light guide plate 142, and the light propagated in the light guide plate 142 is diffracted and reflected by the optical element 110B-1 and the optical element 110B-2 forming the second diffraction element to be emitted to the observation position by the user U.

Figure 15:
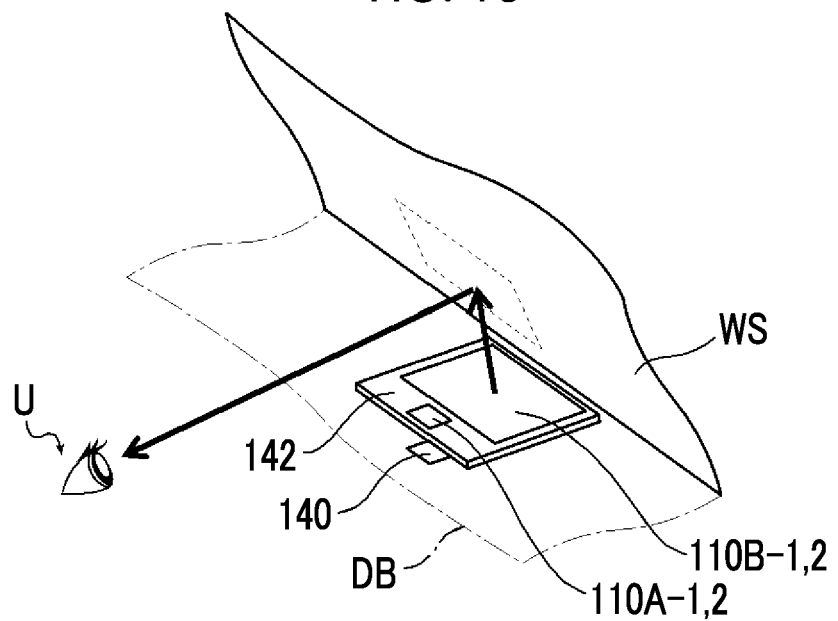
FIG. 15 is a diagram conceptually showing a head-up display including the cholesteric liquid crystal layer according to the present invention.

FIG. 15 schematically shows a method of using the light guide element according to the embodiment of the present invention shown in FIGS. 13 and 14 and the display 140 as an imager of a head-up display for an automobile.

The display 140 and the light guide element according to the embodiment of the present invention shown in FIGS. 13 and 14 are provided in a dashboard DB of an automobile indicated by a chain line (imaginary line) in the drawings. As described above, the light (image) emitted from the display 140 is diffracted and reflected by the first diffraction element (the optical element 110A-1 and the optical element 110A-2) to be introduced and propagated into the light guide plate 142. The light propagated in the light guide plate 142 is diffracted by the second diffraction element (the optical element 110B-1 and the optical element 110B-2) to be emitted from the light guide plate 142.

The light emitted from the light guide plate 142 penetrates into an automobile interior space from an opening of the dashboard DB (not shown), is reflected by a windshield WS, and is observed by the user U (driver).

Hereinabove, the cholesteric liquid crystal layer, the laminate, the light guide element, the image display device, the method of using the same, and the method of forming the cholesteric liquid crystal layer according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Alignment Film)

A glass substrate was used as the support.

The following alignment film-forming coating solution was applied to the support using a spin coater at 2500 rpm for 30 seconds (application step). The support on which the coating film of the alignment film-forming coating solution was formed was dried using a hot plate at 60° C. for 60 seconds (drying step). As a result, an alignment film was formed.

| Alignment Film-Forming Coating Solution | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

-Material for Photo-Alignment-

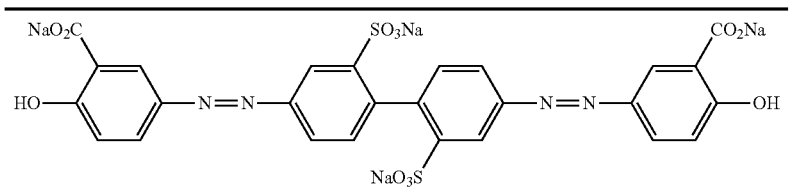

(Exposure of Alignment Film (Exposure Step))

The alignment film was exposed using the exposure device shown in FIG. 7 to form an alignment film P-1 having an alignment pattern.

In the exposure device, a laser that emits laser light having a wavelength (325 nm) was used as the laser. The exposure dose of the interference light was 300 mJ/cm$^2$. An intersecting angle (intersecting angle α) between the two beams was adjusted such that the single period Λ(the length over which the optical axis rotates by 180°) of an alignment pattern formed by interference of two laser beams was 0.025 μm.

(Formation of Cholesteric Liquid Crystal Layer)

As the liquid crystal composition forming the cholesteric liquid crystal layer, the following liquid crystal composition LC-1 was prepared.

| Liquid Crystal Composition LC-1 | |
|---|---|
| Liquid crystal compound L-1 | 100.00 parts by mass |
| Polymerization initiator (IRGACURE 907, manufactured by BASF SE) | 3.00 parts by mass |
| Photosensitizer (KAYACURE DETX-S, manufactured by Nippon Kayaku Co., Ltd.) | 1.00 part by mass |

| | |
|---|---|
| Chiral agent Ch-1 | 6.20 parts by mass |
| Methyl ethyl ketone | 330.60 parts by mass |

Liquid Crystal Compound L-1

[Chemical structures of Liquid Crystal Compound L-1, showing three components at 84%, 14%, and 2%, with R group defined]

The phase transition temperature of the liquid crystal compound L-1 was obtained by heating the liquid crystal compound on a hot stage and observing the texture with a polarizing microscope. As a result, the crystal-nematic phase transition temperature was 79° C., and the nematic-isotropic phase transition temperature was 144° C.

In addition, Δn of the liquid crystal compound L-1 was measured by pouring the liquid crystal compound into a wedge cell, emitting laser light having a wavelength of 550 nm, and measuring the refraction angle of the transmitted light. The measurement temperature was 60° C. Δn of the liquid crystal compound L-1 was 0.16.

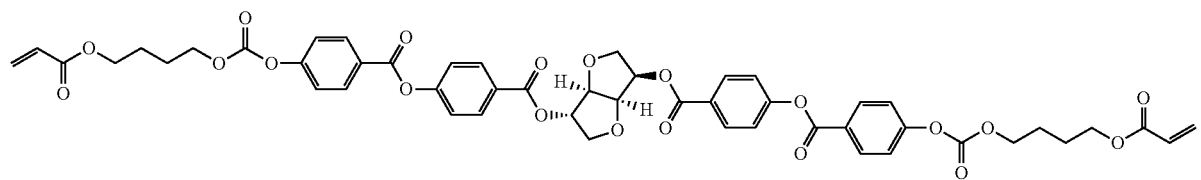

Chiral Agent Ch-1

The above-described liquid crystal composition LC-1 was applied to the alignment film P-1 using a spin coater at 800 rpm for 10 seconds (application step).

The coating film of the liquid crystal composition LC-1 was heated on a hot plate at 80° C. for 3 minutes (180 sec) (heating step).

Next, the coating film was irradiated with ultraviolet light having a wavelength of 365 nm at 80° C. at an irradiation dose of 300 mJ/cm$^2$ using a high-pressure mercury lamp in a nitrogen atmosphere (second exposure step). As a result, the liquid crystal composition LC-1 was cured, the alignment of the liquid crystal compound was immobilized, and a cholesteric liquid crystal layer was formed.

Thus, a liquid crystal diffraction element including the support, the alignment film, and the cholesteric liquid crystal layer was prepared.

It was verified using a polarizing microscope that the cholesteric liquid crystal layer had a periodically aligned surface as shown in FIG. 2.

The liquid crystal diffraction element was cut in a direction along the rotation direction of the optical axis, and a cross-section was observed with a SEM. By analyzing the SEM image, the thickness d of the cholesteric liquid crystal layer, the single period Λ of the liquid crystal alignment pattern, the length pitch P of one helical pitch, and the tilt (tilt angle θ1) of the bright portions and the dark portions with respect to the main surface were measured.

While changing the incidence angle of light to be measured, in-plane retardations Re (in-plane Re) in a fast axis plane and a slow axis plane were measured using "Axoscan" (manufactured by Axometrics, Inc.) as shown in FIG. 4. The measurement wavelength was set to 750 nm. In addition, the incidence angle of the light to be measured was set to a range of −70° to 70°.

Assuming that the average refractive index of the cholesteric liquid crystal layer was 1.5, the absolute value of the optical axis tilt angle q was obtained from "sin θ2=n·sin φ" based on the measured angle θ2 as the angle of the direction in which the in-plane retardation was minimum with respect to the normal line. As a result, the measured angle θ2 at which the in-plane retardation was minimum was present in a fast axis plane, and the absolute value of the optical axis tilt angle φ was 37°. As described above, the result shows that the major axis direction of each liquid crystal molecule was aligned to be tilted along the tilt angle of the helical period.

In addition, the refractive index anisotropy Δn was obtained from "Δn'(φ)=Re[φ]/(d·cos φ)" based on the in-plane retardation Re[φ] at the measured angle θ2 in which the in-plane retardation was minimum. As a result, the refractive index anisotropy Δn' [φ] was 0.006. As described above, the minimum value of the refractive index anisotropy Δn' with respect to the tilt in the fast axis plane being 0.005 or more represents that the tilt angle of the bright portions and the dark portions is not uniform.

Examples 2 to 6 and Comparative Examples 1, 3, and 4

Liquid crystal diffraction elements were prepared using the same method as that of Example 1, except that the intersecting angle α (single period Λ) during the alignment film exposure, the composition and thickness of the liquid crystal composition, and the heating temperature in the heating step and the exposure step were changed as shown in Table 1, and the same measurement was performed.

In Table 1, a liquid crystal compound L-2, an initiator I-2, a chiral agent Ch-2, and a leveling agent are as follows. In addition, a tilt controller was not used in Examples and Comparative Examples in Table 1 and thus will be described below.

<Measurement of Helical Twisting Power (HTP)>

The chiral agent Ch-2 was dissolved in ZLI-1132 (manufactured by Merck KGaA), and the initial HTP of the chiral agent Ch-2 was obtained with the Grandjean-Cano wedge method using a wedge cell.

In addition, the same measurement of the chiral agent Ch-2 was performed after causing a photoreaction to occur using an extra high pressure mercury lamp. In a case where the reaction (change in HTP) is in the steady state, the value was obtained as the HTP of the chiral agent Ch-2 after the photoreaction. These values were calculated based on "Molar Ratio chiral agent/ZLI-1 132".

As a result, in the chiral agent Ch-2, the initial HTP was 54 µm$^{-1}$, and the HTP after the photoreaction was 8 µm$^{-1}$.

Liquid Crystal Compound L-2

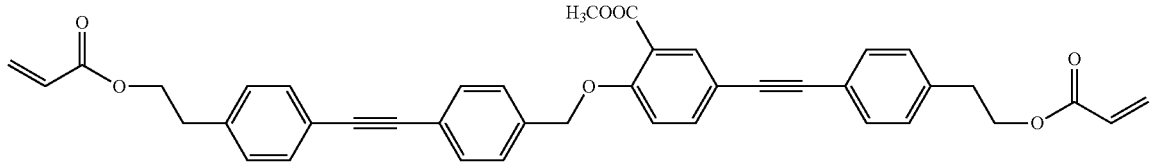

In a case where the phase transition temperature and Δn were measured using the same method as that of the liquid crystal compound L-1, in the liquid crystal compound L-2, the crystal-nematic phase transition temperature was 78° C., the nematic-isotropic phase transition temperature was 161° C., and Δn was 0.34.

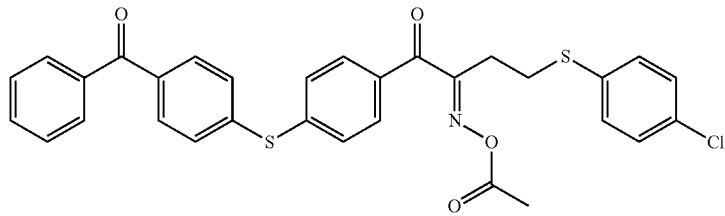

Initiator I-2

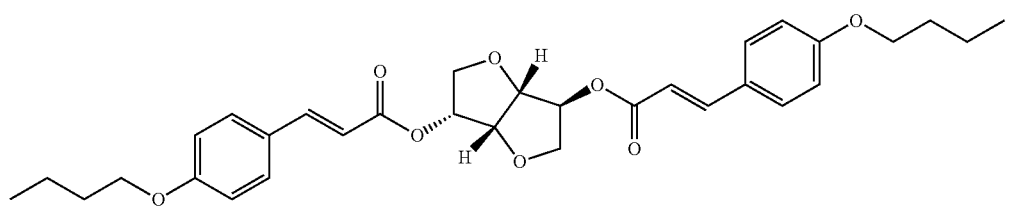

Chiral Agent Ch-2

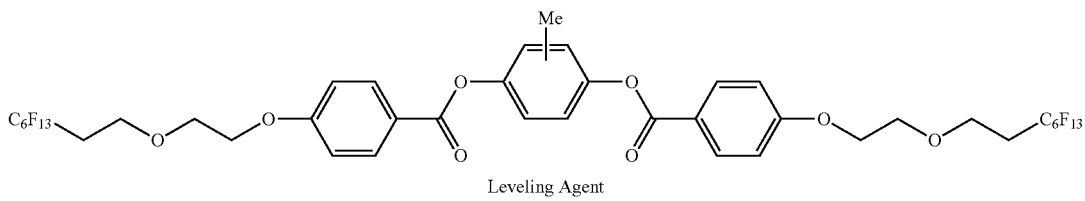

Leveling Agent

Example 7

A liquid crystal diffraction element was prepared using the same method as that of Example 6, except that the liquid crystal composition was exposed at 80° C. using a high-pressure mercury lamp through a long pass filter of 300 nm and a short pass filter of 350 nm in the first exposure step before the second exposure step for curing the liquid crystal composition, and the same measurement as that of Example 1 was performed.

The first exposure step was performed such that the light irradiation dose measured at a wavelength of 315 nm was 30 mJ/cm$^2$.

Example 8

A liquid crystal diffraction element was prepared using the same method as that of Example 7, except that the composition of the liquid crystal composition and the irradiation dose of the first exposure step were changed as shown in Table 1, and the same measurement was performed.

Comparative Example 2

The composition of the liquid crystal composition was changed as shown in Table 1.

A cholesteric liquid crystal layer was formed using the same method as that of Example 1, except that the cholesteric liquid crystal layer was formed by applying multiple layers of the liquid crystal composition to the alignment film P-1.

The application of the multiple layers refers to repetition of the following processes including: forming a first liquid crystal immobilized layer by applying the first layer-forming liquid crystal composition to the alignment film, heating the liquid crystal composition, and irradiating the liquid crystal composition with ultraviolet light for curing; and forming a second or subsequent liquid crystal immobilized layer by applying the second or subsequent layer-forming liquid crystal composition to the formed liquid crystal immobilized layer, heating the liquid crystal composition, and irradiating the liquid crystal composition with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

In order to form the first optically-anisotropic layer, the liquid crystal composition was applied to the alignment film P-1 using a spin coater at 3000 rpm. The coating film was heated using a hot plate at 80° C. for 3 minutes and was further irradiated at 80° C. with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized.

Regarding the second to 20th layers, the composition was applied to the first liquid crystal layer, and the applied composition was heated and irradiated with ultraviolet light for curing under the same conditions as described above. As a result, liquid crystal immobilized layers were prepared, and a liquid crystal diffraction element was formed.

Regarding the prepared liquid crystal diffraction element, the same measurement as that of Example 1 was performed.

[Measurement of Diffraction Efficiency]

The diffraction efficiency of the prepared liquid crystal diffraction element was measured using the following method.

Figure 8:
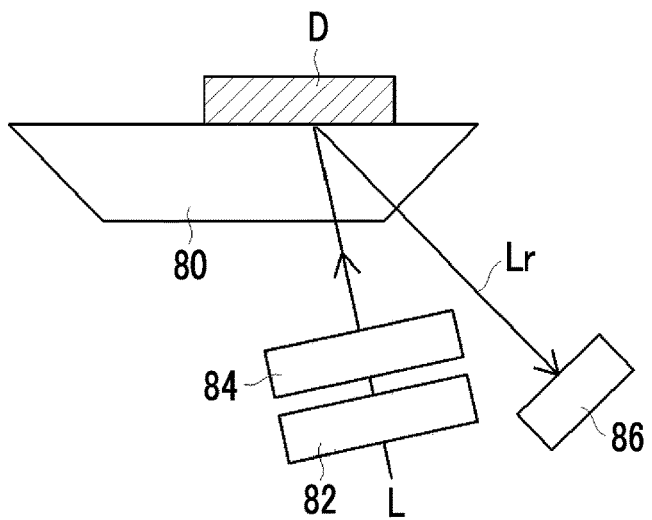
FIG. 8 is a diagram conceptually showing a method of measuring a diffraction efficiency.

As shown in FIG. 8, the prepared liquid crystal diffraction element D was disposed in a dove prism 80. As the dove prism 80, a dove prism having a refractive index of 1.517 and a slope angle of 45° was used.

In the dove prism 80, laser light L having a wavelength shown in Table 1 was caused to transmit through a linear polarizer 82 and a λ/4 plate 84 to be converted into right circularly polarized light, and the right circularly polarized light is caused to be incident into the surface of the liquid crystal diffraction element D with an angle that was set such that diffracted light was emitted vertically from the slope.

The intensity of emitted light Lr was measured using a measuring instrument 86 (Power Meter 1918-C, manufactured by Newport Corporation), and a ratio (Lr/Li×100 [%]) of the intensity of the emitted light Lr to the intensity of incidence light Li was obtained as a diffraction efficiency.

The results are shown in Table 1.

(Measurement of Diffraction Angle)

In a case where light was incident into the sample from the normal direction, the diffraction angle was measured.

The results are shown in Table 1.

TABLE 1

| | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|
| Alignment Film | | | | | | | | | | | | |
| Application Step | | | | | | | | | | | | |
| Rotation Speed [rpm] | 2500 | 2500 | 2500 | 2500 | 2500 | 2500 | 2500 | 2500 | 2500 | 2500 | 2500 | 2500 |
| Time [sec] | 30 | 30 | 30 | 30 | 30 | 30 | 30 | 30 | 30 | 30 | 30 | 30 |
| Drying Step | | | | | | | | | | | | |
| Temperature [° C.] | 60 | 60 | 60 | 60 | 60 | 60 | 60 | 60 | 60 | 60 | 60 | 60 |
| Time [sec] | 60 | 60 | 60 | 60 | 60 | 60 | 60 | 60 | 60 | 60 | 60 | 60 |
| Exposure Step | | | | | | | | | | | | |
| Laser Wavelength [nm] | 325 | 325 | 325 | 325 | 325 | 325 | 325 | 325 | 325 | 325 | 325 | 325 |
| Set Angle α [deg] | 81.1 | 47.9 | 13.3 | 9.8 | 81.1 | 81.1 | 81.1 | 81.1 | 81.1 | 9.8 | 81.1 | 81.1 |
| In-Plane Period Λ [μm] | 0.25 | 0.4 | 1.4 | 1.9 | 0.25 | 0.25 | 0.25 | 0.25 | 0.25 | 1.9 | 0.25 | 0.25 |
| Irradiation Dose [mJ/cm2] | 300 | 300 | 300 | 300 | 300 | 300 | 300 | 300 | 300 | 300 | 300 | 300 |
| Cholesteric Liquid Crystal Layer | | | | | | | | | | | | |
| Composition | | | | | | | | | | | | |
| Liquid Crystal Compound [Part(s) by Mass] | L-1 100 | L-1 100 | L-1 100 | L-1 100 | L-2 100 | L-1 100 | L-1 100 | L-1 100 | L-1 100 | L-1 100 | L-1 100 | L-1 100 |
| Polymerization Initiator [Part(s) by Mass] | Irgacure 907 | Irgacure 907 | Irgacure 907 | Irgacure 907 | 1-2 | Irgacure 907 | Irgacure 907 | Irgacure 907 | Irgacure 907 | Irgacure 907 | Irgacure 907 | Irgacure 907 |
| Photosensitizer [Part(s) by Mass] | 3 | 3 | 3 | 3 | 3 | 3 | 3 | 3 | 3 | 3 | 3 | 3 |
| Leveling Agent [Part(s) by Mass] | 1 | 1 | 1 | 1 | | 1 | 1 | 1 | 1 | 1 | 1 | 1 |
| Tilt Controller [Part(s) by Mass] | | | 0.08 | 0.08 | | | | | | 0.08 | | |
| Chiral Agent [Part(s) by Mass] | Ch-1 6.2 | Ch-1 4.5 | Ch-1 4.5 | Ch-1 4.5 | Ch-1 6.2 | Ch-2 7 | Ch-2 7 | Ch-1 4.5 Ch-2 2 | Ch-1 6.2 | Ch-1 4.5 | Ch-1 3 | Ch-2 4.6 |
| Solvent [Part(s) by Mass] | 330.60 | 253.17 | 253.35 | 162.87 | 327.60 | 333.00 | 333.00 | 331.50 | 330.60 | 3510.75 | 321.00 | 325.80 |
| Concentration of Solid Contents [mass %] | 25 | 30 | 30 | 40 | 25 | 25 | 25 | 25 | 25 | 3 | 25 | 25 |
| Application Step | | | | | | | | | | | | |
| Rotation Speed [rpm] | 800 | 800 | 800 | 800 | 800 | 800 | 800 | 800 | 800 | 3000 | 800 | 800 |
| Time [sec] | 10 | 10 | 10 | 10 | 10 | 10 | 10 | 10 | 10 | 10 | 10 | 10 |

TABLE 1-continued

| | Example 1 | Example 2 | Example 3 | Example 4 | Example 5 | Example 6 | Example 7 | Example | Comparative Example 1 | Comparative Example 2 | Comparative Example 3 | Comparative Example 4 |
|---|---|---|---|---|---|---|---|---|---|---|---|---|
| Heating Step | | | | | | | | | | | | |
| Temperature [° C.] | 80 | 80 | 80 | 80 | 80 | 80 | 80 | 80 | 50 | 50 | 50 | 50 |
| Time [sec] | 180 | 180 | 180 | 180 | 180 | 180 | 180 | 180 | 180 | 180 | 180 | 180 |
| First Exposure Step | | | | | | | | | | | | |
| Temperature [° C.] | | | | | | | 80 | 80 | | | | |
| Irradiation Dose [mj/cm2] | | | | | | | 30 | 100 | | | | |
| Environment (Atmosphere) | | | | | | | Air | Air | | | | |
| Second Exposure Step | | | | | | | | | | | | |
| Temperature [° C.] | 80 | 80 | 80 | 80 | 80 | BO | 80 | 80 | 25 | 25 | 25 | 25 |
| Irradiation Dose [mJ/cm2] | 300 | 300 | 300 | 300 | 300 | 300 | 300 | 300 | 300 | 300 | 300 | 300 |
| Environment (Atmosphere) | Nitrogen | Nitrogen | Nitrogen | Nitrogen | Nitrogen | Nitrogen | Nitrogen | Nitrogen | Nitrogen | Nitrogen | Nitrogen | Nitrogen |
| | | | | | SEM Image Analysis | | | | | | | |
| Thickness d [μm] | 2.5 | 3.0 | 3.0 | 4.0 | 2.5 | 2.5 | 2.5 | 2.5 | 2.5 | 2.00 | 2.5 | 2.5 |
| Single Period Λ of Liquid Crystal Alignment Pattern [μm] | 0.25 | 0.40 | 1.40 | 1.90 | 0.25 | 0.25 | 0.25 | 0.25 | — | 1.90 | — | — |
| Pitch P (One Helical Pitch) [μm] | 0.30 | 0.41 | 0.41 | 0.41 | 0.30 | 0.26 | 0.47 | 0.41 | | 0.41 | | |
| Tilt Angle θ1 of Bright Portions/Dark Portions [deg] | 37 | 31 | 8 | 6 | 37 | 32 | 69 | 55 | | 6 | | |
| d/Λ | 10.0 | 7.5 | 2.1 | 2.1 | 10.0 | 10.0 | 10.0 | 10.0 | | 0.1 | | |
| P/Λ | 1.2 | 1.0 | 0.3 | 0.2 | 1.2 | 1.1 | 1.9 | 1.6 | | 0.2 | | |
| In-Plane Re | | | | | | | | | | | | |
| Optical Axis Tilt Angle φ [deg] | 37 | 31 | 8 | 6 | 36 | 30 | 66 | 52 | | 1 | | |
| Refractive Index Anisotropy Δn' (φ) | 0.006 | 0.006 | 0.005 | 0.004 | 0.007 | 0.006 | 0.007 | 0.006 | | 0 | | |

TABLE 1-continued

| | Example 1 | Example 2 | Example 3 | Example 4 | Example 5 | Example 6 | Example 7 | Example | Comparative Example 1 | Comparative Example 2 | Comparative Example 3 | Comparative Example 4 |
|---|---|---|---|---|---|---|---|---|---|---|---|---|
| Diffraction Efficiency | | | | | | | | | | | | |
| Measurement Wavelength [nm] | 450 | 632 | 632 | 632 | 450 | 450 | 650 | 632 | | 632 | | |
| Diffraction Efficiency [%] | 78% | 75% | 80% | 92% | 90% | 84% | 67% | 70% | | 64% | | |
| Diffracted at Angle | Diffracted at Angle Exceeding Critical Angle | Diffracted at Angle Exceeding Critical Angle | 27 | 19 | Diffracted at Angle Exceeding Critical Angle | Diffracted at Angle Exceeding Critical Angle | Diffracted at Angle Exceeding Critical Angle | Diffracted at Angle Exceeding Critical Angle | | 19 | | |

In the table, the thickness of Comparative Example 2 is the total thickness of the 20 layers formed by multiple coating.

In Comparative Examples 1, 3, and 4, a clear liquid crystal alignment pattern was not able to be observed. In addition, in Comparative Examples 1, 3, and 4, light was not diffracted, and the in-plane retardation Re and the diffraction efficiency were not able to be measured.

In Examples 1, 2, and 5 to 8, Λ was lower than those of the other Examples. As a result, reflected light was diffracted at more than a critical angle on the air interface side. Therefore, the diffraction efficiency was lower than those of Examples 3 and 4 where the diffraction angle was not more than the critical angle.

As shown in Table 1, the liquid crystal diffraction element according to the embodiment of the present invention can diffract (reflect) light with a high diffraction efficiency.

In Comparative Example 2, the diffraction efficiency was 64%, which was lower than that of Example 4 where the in-plane period Λ was the same at 1.9 μm and the reflection wavelength was the same.

Example 9

A liquid crystal diffraction element was prepared using the same method as that of Example 1, except that the intersecting angle α (single period Λ) during the alignment film exposure and the composition and thickness of the liquid crystal composition were changed as shown in Table 2, and the same measurement was performed. The results are shown in Table 2.

Regarding this example and Examples 10 and 11 described below, the following goniospectral transmittance was measured.

[Measurement of Goniospectral Transmittance]

A gonio-spectrophotometer (GSP-1B, manufactured by Murakami Color Research Laboratory Co., Ltd.) was used, and assuming that the normal direction of the sample surface was 0°, a light source was disposed in a direction of 0°, and a light receiving portion was disposed in a direction of 180°. In this state, the transmittance was measured while changing an incidence angle β in a range of −40° to 40° in the tilt direction (in the one in-plane direction in which the optical axis of the liquid crystal compound rotates) of the periodic surface of the cholesteric liquid crystal layer.

In a region between the light source and the sample, the incidence light into the sample was caused to transmit through the linear polarizer and the λ/4 plate to be converted into right circularly polarized light. The measurement wavelength was set to 520 nm.

In this case, a half-width Δβ of the incidence angle dependence of the transmittance with respect to the incidence angle β at which the transmittance was minimum was 12°.

Example 10

A liquid crystal diffraction element was prepared using the same method as that of Example 9, except that the composition of the liquid crystal composition and the conditions in the application step and the exposure step were changed as shown in Table 2, and the same measurement was performed. In this example, "KAYACURE DETX-S" was used as the polymerization initiator. The results are shown in Table 2.

Regarding the cholesteric liquid crystal layer of the liquid crystal diffraction element according to Example 10, an image of a cross-section observed with a SEM was analyzed. As a result, a shape was observed in which the helical pitch P continuously increased and the tilt angle θ1 continuously increased in the thickness direction from the alignment film side to the side away from the alignment film. The tilt angle θ1 (tilt angle θ1 of the bright portions/the dark portions) refers to an angle of the bright portions or the dark portions with respect to the main surface of the cholesteric liquid crystal layer.

Assuming that the interface side of the alignment film was 0 μm, in a section of 0.2 to 1.0 μm in the thickness direction, the average helical pitch P was 0.31 μm, and the tilt angle θ1 was 30°. In a section of 1.5 μm to 3.4 μm, the average helical pitch P was 0.34 μm, and the tilt angle θ1 was 33°.

In addition, the half-width Δβ of the incidence angle dependence of the transmittance in the measurement of the goniospectral transmittance was 30°.

Example 11

A liquid crystal diffraction element was prepared using the same method as that of Example 9, except that the composition of the liquid crystal composition and the conditions in the application step and the exposure step were changed as shown in Table 2, and the same measurement was performed. The results are shown in Table 2.

Regarding the cholesteric liquid crystal layer of the liquid crystal diffraction element according to Example 11, an image of a cross-section observed with a SEM was analyzed. As a result, a shape was observed in which the helical pitch P and the tilt angle θ1 continuously increased in the thickness direction from the alignment film side to the side away from the alignment film and subsequently the helical pitch P and the tilt angle θ1 continuously decreased.

Assuming that the aligned film interface side was 0 μm, in a section of 0.2 to 0.7 μm in the thickness direction, the average helical pitch P was 0.31 μm, and the tilt angle θ1 was 30°. In a section of 1.0 μm to 2.5 μm, the average helical pitch P was 0.34 μm, and the tilt angle θ1 was 33°. In a section of 2.8 to 3.4 μm, the average helical pitch P was 0.31 μm, and the tilt angle θ1 was 30°.

In addition, the half-width Δβ of the incidence angle dependence of the transmittance in the measurement of the goniospectral transmittance was 30°.

Example 12

A liquid crystal diffraction element was prepared using the same method as that of Example 9, except that the intersecting angle α (single period Λ) during the alignment film exposure, the composition of the liquid crystal composition, and the conditions in the application step were changed as shown in Table 2, and the same measurement was performed. The results are shown in Table 2.

In this example, a tilt controller (alignment controller) for controlling the alignment of the liquid crystal compound was used. The tilt controller is as follows.

Tilt Controller

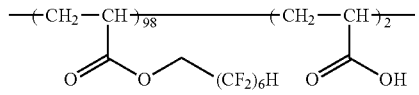

Examples 13 to 16

A liquid crystal diffraction element was prepared using the same method as that of Example 9, except that the intersecting angle α (single period Λ) during the alignment film exposure, the composition of the liquid crystal composition, and the conditions in the application step were changed as shown in Table 2, and the same measurement was performed. Note that, in the measurement of the diffraction efficiency, the wavelength of the light to be measured was 450 nm (blue light) in Example 13, the wavelength of the light to be measured was 532 nm (green light) in Example 14, and the wavelength of the light to be measured was 650 nm (red light) in Example 15. The wavelength of the light to be measured was 850 nm (infrared light) in Example 16.

The results are shown in Table 2.

TABLE 2

| | Example 9 | Example 10 | Example 11 | Example 12 | Example 13 | Example 14 | Example 15 | Example 16 |
|---|---|---|---|---|---|---|---|---|
| Alignment Film | | | | | | | | |
| Application Step | | | | | | | | |
| Rotation Speed [rpm] | 2500 | 2500 | 2500 | 2500 | 2500 | 2500 | 2500 | 2500 |
| Time [sec] | 30 | 30 | 30 | 30 | 30 | 30 | 30 | 30 |
| Drying Step | | | | | | | | |
| Temperature [° C.] | 60 | 60 | 60 | 60 | 60 | 60 | 60 | 60 |
| Time [sec] | 60 | 60 | 60 | 60 | 60 | 60 | 60 | 60 |
| Exposure Step | | | | | | | | |
| Laser Wavelength [nm] | 325 | 325 | 325 | 325 | 325 | 325 | 325 | 325 |
| Set Angle α [deg] | 63.2 | 63.2 | 63.2 | 82.4 | 61.0 | 49.2 | 42.3 | 31.4 |
| In-Plane Period Λ [μm] | 0.31 | 0.31 | 0.31 | 0.25 | 0.32 | 0.39 | 0.45 | 0.6 |
| Irradiation Dose [mJ/cm$^2$] | 300 | 300 | 300 | 300 | 3000 | 3000 | 3000 | 3000 |
| Cholesteric Liquid Crystal Layer | | | | | | | | |
| Composition | | | | | | | | |
| Liquid Crystal Compound [Part(s) by Mass] | L-1 100 | L-1 100 | L-1 100 | L-1 100 | L-1 100 | L-1 100 | LA 100 | L-1 100 |
| Polymerization Initiator [Part(s) by Mass] | 1-2 3 | KAYACURE DETX-S 1 | 1-2 3 | 1-2 3 | 1-2 3 | 1-2 3 | 1-2 3 | 1-2 3 |
| Photosensitizer [Part(s) by Mass] | 1 | | | | | | | |
| Leveling Agent [Part(s) by Mass] | | | | | | | | |
| Tilt Controller [Part(s) by Mass] | | | | | 0.2 | | | |
| Chiral Agent [Part(s) by Mass] | C h-1 4.5 | Ch-1 5 | Ch-1 5 | Ch-1 3 | Ch-1 5.4 | Ch-I 4.4 | Ch-1 3.5 | Ch-1 2.35 |
| | | Ch-2 1 | Ch-2 1 | Ch-2 1 | Ch-2 1 | Ch-2 1 | Ch-2 1 | Cb-2 1 |
| Solvent [Part(s) by Mass] | 201.50 | 198.71 | 202.43 | 199.09 | 203.17 | 201.31 | 199.64 | 159.53 |
| Concentration of Solid Contents [mass%] | 35 | 35 | 35 | 35 | 35 | 35 | 35 | 40 |
| Application Step | | | | | | | | |
| Rotation Speed [rpm] | 800 | 1000 | 1000 | 1000 | 1000 | 1000 | 1000 | 600 |
| Time [sec] | 10 | 10 | 10 | 10 | 10 | 10 | 10 | 10 |
| Heating Step | | | | | | | | |
| Temperature [° C.] | 80 | 80 | 80 | 80 | 80 | 80 | 80 | 80 |
| Time [sec] | 180 | 180 | 18D | 180 | 180 | 180 | 180 | 180 |
| First Exposure Step | | | | | | | | |
| Temperature [° C.] | | 80 | 80 | | | | | |
| Irradiation Dose [mJ/cm$^2$] | | 10 | 10 | | | | | |
| Environment (Atmosphere) | | Nitrogen | Air | | | | | |

TABLE 2-continued

|  | Example 9 | Example 10 | Example 11 | Example 12 | Example 13 | Example 14 | Example 15 | Example 16 |
|---|---|---|---|---|---|---|---|---|
| Second Exposure Step | | | | | | | | |
| Temperature [° C.] | 80 | 80 | 80 | 80 | 80 | 80 | 80 | 80 |
| Irradiation Dose [mJ/cm$^2$] | 300 | 300 | 300 | 300 | 300 | 300 | 300 | 300 |
| Environment (Atmosphere) | Nitrogen | Nitrogen | Nitrogen | Nitrogen | Nitrogen | Nitrogen | Nitrogen | Nitrogen |
| SEM Image Analysis | | | | | | | | |
| Thickness d [μm] | 3.5 | 3.5 | 3.5 | 3.5 | 3.5 | 3.5 | 3.5 | 6.0 |
| Single Period Λ of Liquid Crystal Alignment Pattern [μm] | 0.31 | 0.31 | 0.31 | 0.25 | 0.32 | 0.39 | 0.45 | 0.60 |
| Pitch P (One Helical Pitch) [μm] | 0.34 | 0.31 to 0.34 | 0.31 to 0.34 | 0.46 | 0.30 | 0.35 | 0.42 | 0.57 |
| Tilt Angle θ1 of Bright Portions/Dark Portions [deg] | 33 | 30 to 33 | 30 to 33 | 70 | 28 | 27 | 28 | 28 |
| d/Λ | 11.3 | 11.3 | 9.8 to 8.6 | 14.0 | 10.9 | 9.0 | 7.8 | 10.0 |
| P/Λ | 1.1 | 1.0 to 1.1 | 1.0 to 1.1 | 1.9 | 0.9 | 0.9 | 0.9 | 0.9 |
| In-Plane Re | | | | | | | | |
| Optical Axis Tilt Angle φ [deg] | 33 | 31 | 31 | 68 | 28 | 27 | 28 | 28 |
| Refractive Index Anisotropy Δn' (φ) | 0.006 | 0.006 | 0.006 | 0.007 | 0.006 | 0.006 | 0.006 | 0.006 |
| Diffraction Efficiency | | | | | | | | |
| Measurement Wavelength [nm] | 520 | 520 | 520 | 520 | 450 | 532 | 650 | 850 |
| Diffraction Efficiency [%] | 92% | 88% | 88% | 70% | 95% | 88% | 81% | 90% |
| Diffraction Angle | Diffracted at Angle Exceeding Critical Angle | Diffracted at Angle Exceeding Critical Angle | Diffracted at Angle Exceeding Critical Angle | Diffracted at Angle Exceeding Critical Angle | Diffracted at Angle Exceeding Critical Angle | Diffracted at Angle Exceeding Critical Angle | Diffracted at Angle Exceeding Critical Angle | Diffracted at Angle Exceeding Critical Angle |

In the cholesteric liquid crystal layers according to Examples 10 and 11, the structure of the helical pitch continuously changed in the thickness direction was formed using the chiral agent in which the helical twisting power decreased due to light irradiation. As a result, the performance in which the incidence angle dependence of the transmittance was wider than that of Example 9 was able to be obtained.

An angle range where the transmittance decreases corresponds to an angle range where incidence light is diffracted. Accordingly, by using the diffraction element in which the incidence angle dependence of the transmittance is wide, for example, for an element for incidence or emission of a light guide plate of AR glasses, AR glasses having a wide field of view can be obtained.

In the cholesteric liquid crystal layer according to Example 12 to which the tilt controller (alignment controller) was added, the tilt angle θ1 of the bright portions/the dark portions was 70°, and the tilt was large.

Example 17

A liquid crystal diffraction element was prepared using the same method as that of Example 10, except that the composition of the liquid crystal composition and the conditions in the application step and the exposure step were changed as shown in Table 3, and the same measurement was performed. In this example, Ch-3 was used as the chiral agent.

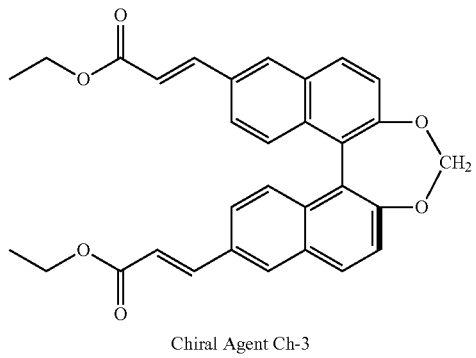 [SMILES: CCOC(=O)/C=C/c1ccc2c3c(ccc2c1)OCOc1ccc2cc(/C=C/C(=O)OCC)ccc2c1-3]

Chiral Agent Ch-3

The results are shown in Table 3.

Regarding the cholesteric liquid crystal layer of the liquid crystal diffraction element according to Example 17, an image of a cross-section observed with a SEM was analyzed.

As a result, a shape was observed in which the helical pitch P continuously increased and the tilt angle θ1 continuously increased in the thickness direction from the alignment film side to the side away from the alignment film.

Assuming that the interface side of the alignment film was 0 μm, in a section of 0 to 0.4 μm in the thickness direction, the average helical pitch P was 0.28 μm, and the tilt angle θ1 was 19°. In a section of 3.0 to 3.5 μm in the thickness direction, the average helical pitch P was 0.37 μm, and the tilt angle θ1 was 25°. Further, in a section of 6.0 to 7.0 μm in the thickness direction, the average helical pitch P was 0.52 μm, and the tilt angle θ1 was 37°.

In addition, the measurement of the diffraction efficiency was performed at three wavelengths of the light to be measured of 450 nm, 532 nm, and 650 nm, the diffraction efficiencies were 85%, 80%, and 80%, respectively, and a high diffraction efficiency was exhibited at any wavelength.

Examples 18 to 20

Liquid crystal diffraction elements were prepared using the same method as that of Example 17, except that the composition of the liquid crystal composition and the conditions in the application step and the exposure step were changed as shown in Table 3, and the same measurement was performed. In this example, Ch-3 was also used as the chiral agent.

The results are also shown in Table 3.

TABLE 3

| | | | Example 17 | Example 18 | Example 19 | Example 20 |
|---|---|---|---|---|---|---|
| Alignment Film | Application Step | Rotation Speed [rpm] | 2500 | 2500 | 2500 | 2500 |
| | | Time [sec] | 30 | 30 | 30 | 30 |
| | Drying Step | Temperature [° C.] | 60 | 60 | 60 | 60 |
| | | Time [sec] | 60 | 60 | 60 | 60 |
| | Exposure Step | Laser Wavelength [nm] | 325 | 325 | 325 | 325 |
| | | Set Angle α [deg] | 43.9 | 54.5 | 36.8 | 43.9 |
| | | In-Plane Period Λ [μm] | 0.435 | 0.355 | 0.515 | 0.435 |
| | | Irradiation Dose [mJ/cm$^2$] | 3000 | 3000 | 3000 | 3000 |
| Cholesteric Liquid Crystal Layer | Composition | Liquid Crystal Compound [Part(s) by Mass] | L-1 100 | L-1 100 | L-1 100 | L-1 100 |
| | | Polymerization Initiator [Part(s) by Mass] | KAYACURE DETX-S 1 | KAYACURE DETX-S 1 | KAYACURE DETX-S 1 | KAYACURE DETX-S 1 |
| | | Chiral Agent [Part(s) by Mass] | Ch-3 4 | Ch-3 4 | Ch-3 4 | Ch-3 4 |
| | | Solvent [Part(s) by Mass] | 142.06 | 142.06 | 142.06 | 420.00 |
| | | Concentration of Solid Contents [mass %] | 42.5 | 42.5 | 42.5 | 20 |
| | Application Step | Rotation Speed [rpm] | 500 | 500 | 500 | 1000 |
| | | Time [sec] | 10 | 10 | 10 | 10 |
| | Heating Step | Temperature [° C.] | 80 | 80 | 80 | 80 |
| | | Time [sec] | 180 | 180 | 180 | 180 |
| | First Exposure Step | Temperature [° C.] | 100 | 100 | 100 | 100 |
| | | Irradiation Dose [mJ/cm$^2$] | 9 | 9 | 9 | 9 |
| | | Environment (Atmosphere) | Nitrogen | Nitrogen | Nitrogen | Nitrogen |
| | Second Exposure Step | Temperature [° C.] | 100 | 100 | 100 | 100 |
| | | Irradiation Dose [mJ/cm$^2$] | 1000 | 1000 | 1000 | 1000 |
| | | Environment (Atmosphere) | Nitrogen | Nitrogen | Nitrogen | Nitrogen |
| SEM Image Analysis | | Thickness d [μm] | 7.0 | 7.0 | 7.0 | 1.4 |
| | | Single Period Λ of Liquid Crystal Alignment Pattern [μm] | 0.435 | 0.355 | 0.515 | 0.435 |
| | | Pitch P (One Helical Pitch) [μm] | 0.28 to 052 | 0.28 to 052 | 0.28 to 052 | 0.28 to 052 |
| | | Tilt Angle θ1 of Bright Portions/Dark Portions [deg] | 19 to 37 | 23 to 47 | 16 to 32 | 19 to 37 |
| In-Plane Re | | Optical Axis Tilt Angle φ [deg] | 25 | 31 | 22 | 25 |
| | | Refractive Index Anisotropy Δn' (φ) | 0.006 | 0.006 | 0.006 | 0.002 |
| Diffraction Efficiency | | Measurement Wavelength [nm] | 450, 532, 650 | 450, 532, 650 | 450, 532, 650 | 450, 532, 650 |
| | | Diffraction Efficiency [%] | 85%, 80%, 80% | 85%, 80%, 80% | 85%, 80%, 80% | 15%, 20%, 15% |

Examples 21 to 26

A liquid crystal diffraction element was prepared using the same method as that of Example 13, except that the intersecting angle α (single period Λ) during the alignment film exposure, the composition of the liquid crystal composition, and the conditions in the application step were changed as shown in Table 4, and the same measurement was performed.

The results are shown in Table 4.

TABLE 4

| | | | Example 21 | Example 22 | Example 23 | Example 24 | Example 25 | Example 26 |
|---|---|---|---|---|---|---|---|---|
| Alignment Film | Application Step | Rotation Speed [rpm] | 2500 | 2500 | 2500 | 2500 | 2500 | 2500 |
| | | Time [sec] | 30 | 30 | 30 | 30 | 30 | 30 |
| | Drying Step | Temperature [° C.] | 60 | 60 | 60 | 60 | 60 | 60 |
| | | Time [sec] | 60 | 60 | 60 | 60 | 60 | 60 |

TABLE 4-continued

|  |  |  | Example 21 | Example 22 | Example 23 | Example 24 | Example 25 | Example 26 |
|---|---|---|---|---|---|---|---|---|
|  | Exposure Step | Laser Wavelength [nm] | 325 | 325 | 325 | 325 | 325 | 325 |
|  |  | Set Angle α [deg] | 91.8 | 72.2 | 61.4 | 61.0 | 49.2 | 42.3 |
|  |  | In-Plane Period Λ [μm] | 0.23 | 0.28 | 0.32 | 0.32 | 0.39 | 0.45 |
|  |  | Irradiation Dose [mJ/cm$^2$] | 3000 | 3000 | 3000 | 3000 | 3000 | 3000 |
| Cholesteric | Composition | Liquid Crystal Compound | L-1 | L-1 | L-1 | L-1 | L-1 | L-1 |
| Liquid |  | [Part(s) by Mass] | 100 | 100 | 100 | 100 | 100 | 100 |
| Crystal |  | Polymerization Initiator | I-2 | I-2 | I-2 | I-2 | I-2 | I-2 |
| Layer |  | [Part(s) by Mass] | 3 | 3 | 3 | 3 | 3 | 3 |
|  |  | Chiral Agent [Part(s) by | Ch-1 | Ch-1 | Ch-1 | Ch-1 | Ch-1 | Ch-1 |
|  |  | Mass] | 4.6 | 3.6 | 3.0 | 5.4 | 4.4 | 3.5 |
|  |  |  | Ch-2 | Ch-2 | Ch-2 | Ch-2 | Ch-2 | Ch-2 |
|  |  |  | 1 | 1 | 1 | 1 | 1 | 1 |
|  |  | Solvent [Part(s) by Mass] | 977.40 | 968.90 | 963.00 | 984.60 | 975.60 | 967.50 |
|  |  | Concentration of Solid Contents [mass %] | 10 | 10 | 10 | 10 | 10 | 10 |
|  | Application | Rotation Speed [rpm] | 1000 | 1000 | 1000 | 1000 | 1000 | 1000 |
|  | Step | Time [sec] | 10 | 10 | 10 | 10 | 10 | 10 |
|  | Heating Step | Temperature [° C.] | 80 | 80 | 80 | 80 | 80 | 80 |
|  |  | Time [sec] | 180 | 180 | 180 | 180 | 180 | 180 |
|  | First Exposure | Temperature [° C.] | — | — | — | — | — | — |
|  | Step | Irradiation Dose [mJ/cm$^2$] | — | — | — | — | — | — |
|  |  | Environment (Atmosphere) | — | — | — | — | — | — |
|  | Second | Temperature [° C.] | 80 | 80 | 80 | 80 | 80 | 80 |
|  | Exposure Step | Irradiation Dose [mJ/cm$^2$] | 300 | 300 | 300 | 300 | 300 | 300 |
|  |  | Environment (Atmosphere) | Nitrogen | Nitrogen | Nitrogen | Nitrogen | Nitrogen | Nitrogen |
| SEM Image | Thickness d [μm] |  | 0.6 | 0.6 | 0.6 | 0.6 | 0.6 | 0.6 |
| Analysis | Single Period Λ of Liquid Crystal Alignment Pattern [μm] |  | 0.23 | 0.28 | 0.32 | 0.32 | 0.39 | 0.45 |
|  | Pitch P (One Helical Pitch) [μm] |  | 0.34 | 0.41 | 0.48 | 0.30 | 0.35 | 0.42 |
|  | Tilt Angle θ1 of Bright Portions/Dark Portions [deg] |  | 49 | 48 | 48 | 28 | 27 | 28 |
| Diffraction | Optical Axis Tilt Angle φ [deg] |  | 49 | 48 | 48 | 28 | 27 | 28 |
| Efficiency | Measurement Wavelength [nm] |  | 450 | 532 | 650 | 450 | 532 | 650 |
|  | Diffraction Efficiency [%] |  | 24% | 22% | 21% | 29% | 27% | 25% |

Example 27

(Application 1 to AR Glasses)

By using the optical element including the cholesteric liquid crystal layer according to any one of Examples 13 to 15 as diffraction elements for incidence and emission of light from and to a light guide plate of AR glasses, the effect of the display on the AR glasses shown in FIG. 9 was verified.

As the light guide plate, glass (refractive index: 1.80, thickness: 0.50 mm) was used.

As can be seen from the measurement result of the diffraction efficiency, the cholesteric liquid crystal layer according to Example 13 reflected blue light. In addition, the cholesteric liquid crystal layer according to Example 14 selectively reflected green light. Further, the cholesteric liquid crystal layer according to Example 15 selectively reflected red light.

These cholesteric layers were laminated and bonded in order of B, G, and R from the light guide plate. As a result, an optical element (diffraction element) was obtained.

In addition, as a display device portion (display 140) of the AR glasses, an LCOS projector was used.

This way, the effect of the display on the AR glasses was verified. As a result, it was verified that the colors of RGB can be displayed.

Example 28

(Application 2 to AR Glasses)

As in Example 16, the effect of the display of the display on AR glasses was verified using the following method, the AR glasses including two light guide plates shown in FIG. 10 including the cholesteric liquid crystal layers according to any one of Examples 13 to 15.

The cholesteric liquid crystal layer according to Example 14 that selectively reflected green light was bonded to one light guide plate (the light guide plate 142g in FIG. 10). Further, a laminate including the cholesteric liquid crystal layer according to Example 13 that selectively reflected blue light and the cholesteric liquid crystal layer according to Example 15 that selectively reflected red light was bonded to another light guide plate (the light guide plate 142br in FIG. 10) such that the cholesteric layer according to Example 13 was close to the light guide plate.

Using the two light guide plates, AR glasses having the configuration shown in FIG. 10 were prepared, and the effect of the display was verified. As a result, it was verified that the colors of RGB can be displayed.

Example 29

(Application 3 to AR Glasses)

The effect of the display on the AR glasses shown in FIGS. 11 and 12 was verified.

The optical elements including the cholesteric liquid crystal layers according to Examples 13, 14, and 15 were used as the optical elements 114b, 114g, and 114r, respectively. The optical elements including the cholesteric liquid crystal layers according to Examples 20, 21, and 22 were used as the optical elements 116b, 116g, and 116r, respectively. Further, the optical elements including the cholesteric liquid crystal layers according to Examples 23, 24, and 25 were used as the optical elements 118b, 118g, and 118r, respectively.

As shown in FIG. 12, the optical elements 114g, 116g, and 118g were provided on the light guide plate 142g. In addition, a laminate including the optical element 114b and the optical element 114r, a laminate including the optical element 116b and the optical element 116r, and a laminate including the optical element 118b and the optical element 118r were provided on the light guide plate 142br.

The optical elements were set such that an angle between the direction of the in-plane rotation period of the optical elements 114b, 114g, and 114r and the direction of the in-plane rotation period of the optical elements 116b, 116g, and 116r was 45° and such that an angle between the direction of the in-plane rotation period of the optical elements 114b, 114g, and 114r and the direction of the in-plane rotation period of the optical elements 118b, 118g, and 118r was 90°.

Using the two light guide plates, AR glasses having the configuration shown in FIGS. 11 and 12 were prepared, and the effect of the display was verified. As a result, it was verified that the colors of RGB can be displayed.

Example 30

(Application 4 to AR Glasses)

By using the optical element including the cholesteric liquid crystal layer according to Example 17 as diffraction elements (optical element 110), for incidence and emission of light from and to the light guide plate 142 of AR glasses, the AR glasses shown in FIG. 9 were prepared.

As the light guide plate 142, glass (refractive index: 1.90, thickness: 0.50 mm) was used. As a display device portion (display 140) of the AR glasses, an LCOS projector was used.

This way, the effect of the display on the AR glasses was verified. As a result, it was verified that the colors of RGB can be displayed.

Example 31

(Application 5 to AR Glasses)

By using the optical element including the cholesteric liquid crystal layer according to Example 18 as diffraction elements (optical element 110), for incidence and emission of light from and to the light guide plate 142, the light guide element shown in FIG. 9 was prepared as a light guide element A.

In addition, by using the optical element including the cholesteric liquid crystal layer according to Example 19 as diffraction elements (optical element 110), for incidence and emission of light from and to the light guide plate 142, the light guide element shown in FIG. 9 was prepared as a light guide element B.

The light guide element A and the light guide element B were laminated to prepare AR glasses shown in FIG. 10.

As the light guide plate 142, glass (refractive index: 1.90, thickness: 0.50 mm) was used. As a display device portion (display 140) of the AR glasses, an LCOS projector was used.

This way, the effect of the display on the AR glasses was verified. As a result, it was verified that the colors of RGB can be displayed.

Example 32

(Application 6 to AR Glasses)

The effect of the display on the AR glasses shown in FIGS. 13 and 14 was verified.

The optical element including the cholesteric liquid crystal layer according to Example 17 was used as the optical element 110A-1 and the optical element 110A-2. In addition, the optical element including the cholesteric liquid crystal layer according to Example 20 was used as the optical element 110B-1 and the optical element 110B-2.

Using this diffraction element, a light guide element was prepared as shown in FIGS. 13 and 14, and AR glasses were prepared.

As described above, in the optical elements 110A-1 and the optical element 110B-1, the directions of the in-plane rotation periods of the cholesteric liquid crystal layers were parallel to each other. In addition, in the optical elements 110A-2 and the optical element 110B-2, the directions of the in-plane rotation periods of the cholesteric liquid crystal layers were parallel to each other.

In the optical elements 110A-1 and the optical element 110A-2, an angle between the directions of the in-plane rotation periods of the cholesteric liquid crystal layers 90°. In addition, in the optical elements 110B-1 and the optical element 110B-2, an angle between the directions of the in-plane rotation periods of the cholesteric liquid crystal layers 90°.

As the light guide plate 142, glass (refractive index: 1.90, thickness: 0.50 mm) was used. As a display device portion (display 140) of the AR glasses, an LCOS projector was used.

This way, the effect of the display on the AR glasses was verified. As a result, it was verified that the colors of RGB can be displayed.

Example 33

(Application to Head-Up Display)

By using the light guide element prepared in Example 32 as an imager of the head-up display shown in FIG. 15, the display of an image was verified.

It was verified that, with this configuration, a thin imager where a space required for projection is reduced can be provided.

As can be seen from the above results, the effects of the present invention are obvious.

INDUSTRIAL APPLICABILITY

The present invention is suitably applicable to various uses where light is reflected in an optical device, for example, a diffraction element that causes light to be incident into a light guide plate of AR glasses or emits light to the light guide plate.

EXPLANATION OF REFERENCES

10: liquid crystal diffraction element
12: support
14: alignment film
16: cholesteric liquid crystal layer
40: liquid crystal compound
40A: optical axis
60: exposure device
62: laser
64: light source
65: λ/2 plate
68: polarization beam splitter
70A, 70B: mirror
72A, 72B: λ/4 plate
110, 110g, 110b, 110r, 110A-1, 110A-2, 110B-1, 110B-2, 114g, 114b, 114r, 116g, 116b, 116r, 118g, 118b, 118r: optical element
114: first diffraction element
116: second diffraction element 118: third diffraction element
140: display
142, 142g, 142br: light guide plate
WS: windshield
DB: dashboard
U: user
R: right circularly polarized light
M: laser light
MA, MB: beam
$P_O$: linearly polarized light
$P_R$: right circularly polarized light
$P_L$: left circularly polarized light

What is claimed is:

1. A cholesteric liquid crystal layer that is obtained by immobilizing a cholesteric liquid crystalline phase,
wherein the cholesteric liquid crystal layer has a liquid crystal alignment pattern in which a direction of an optical axis derived from a liquid crystal compound changes while continuously rotating in at least one in-plane direction,
in a cross-section of the cholesteric liquid crystal layer observed with a scanning electron microscope, bright portions and dark portions derived from the cholesteric liquid crystalline phase are tilted with respect to a main surface of the cholesteric liquid crystal layer,
in a case where an in-plane retardation is measured from a direction tilted with respect to a normal direction and a normal line, a measured angle as an angle of a direction in which the in-plane retardation is minimum in any one of a slow axis plane or a fast axis plane with respect to the normal line is represented by $\theta2$, and an average refractive index of the cholesteric liquid crystal layer is represented by n,
an absolute value of an optical axis tilt angle $\varphi$ represented by $\sin \theta2 = n \cdot \sin \varphi$ is 5° or more.

2. The cholesteric liquid crystal layer according to claim 1,
wherein the optical axis tilt angle $\varphi$ is 15° or more.

3. The cholesteric liquid crystal layer according to claim 1,
wherein in a case where an angle between the main surface of the cholesteric liquid crystal layer and the bright portions and the dark portions in the cross-section of the cholesteric liquid crystal layer is represented by a tilt angle $\theta1$, an absolute value of a value obtained by subtracting the tilt angle $\theta1$ from the optical axis tilt angle $\varphi$ is 5° or less.

4. The cholesteric liquid crystal layer according to claim 1,
wherein in a case where a thickness of the cholesteric liquid crystal layer is represented by d and a minimum value of the in-plane retardation is represented by $Re[\varphi]$, a refractive index anisotropy $\Delta n'(\varphi)$ represented by the following expression $\Delta n'(\varphi) = Re[\varphi]/(d \cdot \cos \varphi)$ is 0.003 or more.

5. The cholesteric liquid crystal layer according to claim 1,
wherein in a case where a length over which the direction of the optical axis derived from the liquid crystal compound in the liquid crystal alignment pattern rotates by 180° in an in-plane direction is set as a single period $\Lambda$, the single period $\Lambda$ is 1.6 μm or less.

6. The cholesteric liquid crystal layer according to claim 1,
wherein a region where a formation period of the bright portions and the dark portions in the cross-section of the cholesteric liquid crystal layer varies depending on positions in a thickness direction is provided.

7. The cholesteric liquid crystal layer according to claim 3,
wherein a region where the tilt angle $\theta1$ varies depending on positions in a thickness direction is provided.

8. A laminate comprising:
a plurality of cholesteric liquid crystal layers according to claim 1,
wherein in the cross-sections of the plurality of cholesteric liquid crystal layers observed with a scanning electron microscope, formation periods of the bright portions and the dark portions are different from each other.

9. A laminate comprising:
a plurality of cholesteric liquid crystal layers according to claim 1,
wherein in the plurality of cholesteric liquid crystal layers, single periods $\Lambda$ as lengths over which the direction of the optical axis in the liquid crystal alignment pattern rotates by 180° in the one in-plane direction are different from each other.

10. A laminate comprising:
a plurality of cholesteric liquid crystal layers according to claim 1,
wherein in the plurality of cholesteric liquid crystal layers, formation periods of the bright portions and the dark portions in the cross-sections of the cholesteric liquid crystal layers are different from each other, single periods of the liquid crystal alignment patterns in the one in-plane direction are different from each other, and a permutation of lengths of the formation periods of the bright portions and the dark portions in the cross-sections and a permutation of lengths of the single periods in the one in-plane direction match each other.

11. A light guide element comprising:
a light guide plate; and
at least one of the cholesteric liquid crystal layer according to claim 1 that is provided on the light guide plate.

12. A light guide element comprising:
a light guide plate; and
a first cholesteric liquid crystal layer, a second cholesteric liquid crystal layer, and a third cholesteric liquid crystal layer according to claim 1 that are provided on the light guide plate,
wherein in a case where a single period of a liquid crystal alignment pattern of the first cholesteric liquid crystal layer in the one in-plane direction is represented by $\Lambda1$,
a single period of a liquid crystal alignment pattern of the second cholesteric liquid crystal layer in the one in-plane direction is represented by $\Lambda2$, and a single period of a liquid crystal alignment pattern of the third cholesteric liquid crystal layer in the one in-plane direction is represented by $\Lambda3$, $$\Lambda1 < \Lambda2 < \Lambda3$$

is satisfied.

13. A light guide element comprising:
a first light guide plate and a second light guide plate;
a first light guide element including a first cholesteric liquid crystal layer and a third cholesteric liquid crystal layer according to claim 1 that are provided on the first light guide plate; and a second light guide element including a second cholesteric liquid crystal layer according to claim 1 that is provided on the second light guide plate, wherein in a case where a single period of a liquid crystal alignment pattern of the first cholesteric liquid crystal layer in the one in-plane direction is represented by $\Lambda 1$, a single period of a liquid crystal alignment pattern of the second cholesteric liquid crystal layer in the one in-plane direction is represented by $\Lambda 2$, and a single period of a liquid crystal alignment pattern of the third cholesteric liquid crystal layer in the one in-plane direction is represented by $\Lambda 3$, $$\Lambda 1 < \Lambda 2 < \Lambda 3$$

is satisfied.

14. The light guide element according to claim 11, wherein the cholesteric liquid crystal layers provided on the light guide plate are disposed to function as an incidence diffraction element and an emission diffraction element, respectively.

15. The light guide element according to claim 11, wherein the cholesteric liquid crystal layers provided on the light guide plate are disposed to function as an incidence diffraction element, an intermediate diffraction element, and an emission diffraction element, respectively.

16. An image display device comprising:
the light guide element according to claim 11; and
a display element that emits an image to the cholesteric liquid crystal layer of the light guide element.

17. A light guide element comprising:
a light guide plate; and
at least one of the cholesteric liquid crystal layer according to the laminate according to claim 8 that is provided on the light guide plate.

* * * * *